(12) United States Patent
Thomsen et al.

(10) Patent No.: US 11,249,462 B2
(45) Date of Patent: Feb. 15, 2022

(54) INDUSTRIAL DATA SERVICES PLATFORM

(71) Applicant: Rockwell Automation Technologies, Inc., Mayfield Heights, OH (US)

(72) Inventors: Joachim Thomsen, Krefeld (DE); Stephen C Briant, Wexford, PA (US); Manuel Sukerman, Burr Ridge, IL (US); Juergen K Weinhofer, Mayfield Heights, OH (US); Sujeet Chand, Milwaukee, WI (US); Scott A Miller, Mayfield Heights, OH (US); Noel Henderson, Houston, FL (US); Bruce E Hammon, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 59 days.

(21) Appl. No.: 16/734,714

(22) Filed: Jan. 6, 2020

(65) Prior Publication Data
US 2021/0208571 A1 Jul. 8, 2021

(51) Int. Cl.
*G06F 17/00* (2019.01)
*G05B 19/418* (2006.01)
(Continued)

(52) U.S. Cl.
CPC ... *G05B 19/4183* (2013.01); *G05B 19/41875* (2013.01); *G06F 16/25* (2019.01);
(Continued)

(58) Field of Classification Search
CPC .......... G05B 19/4183; G05B 19/41875; G06F 16/283; G06F 16/25; G06Q 50/04;
(Continued)

(56) References Cited

U.S. PATENT DOCUMENTS 6,202,038 B1   3/2001 Wegerich et al.
6,421,571 B1*  7/2002 Spriggs ................. G05B 15/02
                                                345/629
(Continued)

FOREIGN PATENT DOCUMENTS

CN   103217935 A   7/2013
CN   103685442 A   3/2014
(Continued)

OTHER PUBLICATIONS

Extended European Search Report received for EP Patent Application Serial No. 17175165.4 dated Aug. 10, 2017, 9 pages.
(Continued)

*Primary Examiner* — Greta L Robinson
(74) *Attorney, Agent, or Firm* — Amin, Turocy & Watson, LLP

(57) ABSTRACT

A cloud-based industrial data services (IDS) architecture leverage smart tags, asset models, and data service applications to facilitate secure transaction and exchange of contextualized factory data between different parties as part of a combined technology and commerce platform, or to perform provide asset owners with insights into operation of their industrial assets. The IDS platform supports a set of services that connect providers of smart industrial devices to plant floor and systems owned by the end users of these devices. The cloud-based platform allows asset providers to publish data service applications for purchase and use by end users of their assets, and allows equipment owners to control remote access to selected sets of their industrial data via the cloud platform.

20 Claims, 38 Drawing Sheets

(51) Int. Cl.
*G06F 16/25* (2019.01)
*G06F 16/28* (2019.01)
*G06Q 10/06* (2012.01)
*G06Q 50/04* (2012.01)
*H04L 9/32* (2006.01)
*G06Q 50/00* (2012.01)

(52) U.S. Cl.
CPC ..... *G06F 16/283* (2019.01); *G06Q 10/06395* (2013.01); *G06Q 50/04* (2013.01); *H04L 9/3263* (2013.01); *G06Q 50/00* (2013.01)

(58) Field of Classification Search
CPC .. G06Q 50/00; G06Q 10/06395; G06Q 10/06; G06Q 10/10; H04L 9/3263
See application file for complete search history.

(56) References Cited

U.S. PATENT DOCUMENTS

| | | | |
|---|---|---|---|
| 8,031,638 B2 | 10/2011 | Ackermann et al. | |
| 8,616,134 B2 | 12/2013 | King et al. | |
| 8,674,993 B1 | 3/2014 | Fleming et al. | |
| 8,812,684 B1 | 8/2014 | Hood et al. | |
| 8,967,051 B2 | 3/2015 | King et al. | |
| 9,152,632 B2 | 10/2015 | Smith et al. | |
| 9,329,751 B2 | 5/2016 | Bardhan | |
| 9,346,371 B2 | 5/2016 | King et al. | |
| 9,411,864 B2 | 8/2016 | Glinder et al. | |
| 9,645,979 B2 | 5/2017 | Shinzato | |
| 9,760,601 B2 | 9/2017 | Burke et al. | |
| 9,771,000 B2 | 9/2017 | King et al. | |
| 9,866,635 B2* | 1/2018 | Maturana | G06F 9/5072 |
| 9,958,860 B2 | 5/2018 | Rischar et al. | |
| 10,048,995 B1 | 8/2018 | Dikhit et al. | |
| 10,112,777 B2 | 10/2018 | King et al. | |
| 10,442,637 B2 | 10/2019 | Huang et al. | |
| 10,459,832 B2 | 10/2019 | Branson et al. | |
| 10,528,700 B2* | 1/2020 | Thomsen | G06F 40/117 |
| 10,740,298 B2* | 8/2020 | Watson | H04L 67/1095 |
| 2002/0029205 A1 | 3/2002 | Pedraza et al. | |
| 2002/0077711 A1 | 6/2002 | Nixon et al. | |
| 2005/0187643 A1 | 8/2005 | Sayyar-Rodsar et al. | |
| 2006/0161597 A1* | 7/2006 | Ougarov | G06Q 10/06 |
| 2007/0094181 A1 | 4/2007 | Tayebnejab et al. | |
| 2007/0208549 A1 | 9/2007 | Blevins et al. | |
| 2008/0077512 A1* | 3/2008 | Grewal | G06F 16/29 |
| | | | 705/28 |
| 2008/0082297 A1 | 4/2008 | Lundeberg et al. | |
| 2008/0114474 A1 | 5/2008 | Campbell et al. | |
| 2009/0089032 A1 | 4/2009 | Sturrock et al. | |
| 2009/0228176 A1 | 9/2009 | Mintah et al. | |
| 2010/0031199 A1 | 2/2010 | Birzer et al. | |
| 2010/0050097 A1 | 2/2010 | Mcgreevy et al. | |
| 2010/0292825 A1 | 11/2010 | Taylor et al. | |
| 2011/0261049 A1 | 10/2011 | Cardno et al. | |
| 2012/0022849 A1 | 1/2012 | Wang et al. | |
| 2012/0054650 A1 | 3/2012 | Bliss et al. | |
| 2012/0078432 A1 | 3/2012 | Weatherhead et al. | |
| 2013/0124465 A1 | 5/2013 | Pingel et al. | |
| 2013/0211555 A1 | 8/2013 | Lawson et al. | |
| 2013/0211870 A1 | 8/2013 | Lawson et al. | |
| 2013/0212420 A1 | 8/2013 | Lawson et al. | |
| 2014/0047107 A1 | 2/2014 | Maturana et al. | |
| 2014/0121789 A1 | 5/2014 | Brandes et al. | |
| 2014/0180644 A1 | 6/2014 | Maturana et al. | |
| 2014/0222522 A1 | 8/2014 | Chait | |
| 2014/0226460 A1 | 8/2014 | Kretschmann et al. | |
| 2014/0278312 A1 | 9/2014 | Nixon et al. | |
| 2014/0297244 A1 | 10/2014 | Maturana et al. | |
| 2014/0335480 A1 | 11/2014 | Asenjo et al. | |
| 2014/0336785 A1 | 11/2014 | Asenjo et al. | |
| 2014/0336786 A1 | 11/2014 | Asenjo et al. | |
| 2014/0337000 A1 | 11/2014 | Asenjo et al. | |
| 2014/0337429 A1 | 11/2014 | Asenjo et al. | |

| | | | |
|---|---|---|---|
| 2015/0120009 A1 | 4/2015 | Kilian | |
| 2015/0134400 A1 | 5/2015 | Kashi | |
| 2015/0199224 A1 | 7/2015 | Mihnev | |
| 2015/0277404 A1 | 10/2015 | Maturana et al. | |
| 2015/0277406 A1 | 10/2015 | Maturana et al. | |
| 2015/0281319 A1 | 10/2015 | Maturana et al. | |
| 2015/0281355 A1 | 10/2015 | Maturana et al. | |
| 2015/0281356 A1 | 10/2015 | Maturana et al. | |
| 2015/0281453 A1 | 10/2015 | Maturana et al. | |
| 2015/0316904 A1 | 11/2015 | Govindaraj et al. | |
| 2016/0087933 A1* | 3/2016 | Johnson | H04L 67/34 |
| | | | 709/245 |
| 2016/0132595 A1 | 3/2016 | Bliss et al. | |
| 2016/0112283 A1 | 4/2016 | Maturana et al. | |
| 2016/0179599 A1 | 6/2016 | Deshpande et al. | |
| 2016/0234186 A1* | 8/2016 | Leblond | H04L 63/08 |
| 2016/0274553 A1 | 9/2016 | Strohmenger et al. | |
| 2016/0274558 A1 | 9/2016 | Strohmenger et al. | |
| 2016/0299999 A1 | 10/2016 | James et al. | |
| 2016/0330291 A1 | 11/2016 | Asenjo et al. | |
| 2017/0102694 A1 | 4/2017 | Enver et al. | |
| 2017/0126843 A1 | 5/2017 | Pantea et al. | |
| 2017/0192414 A1 | 7/2017 | Mukkamala et al. | |
| 2017/0208151 A1 | 7/2017 | Gil et al. | |
| 2017/0236067 A1 | 8/2017 | Tjiong | |
| 2017/0249129 A1 | 8/2017 | McDaniel | |
| 2017/0337226 A1 | 11/2017 | Bliss et al. | |
| 2017/0351226 A1 | 12/2017 | Bliss et al. | |
| 2017/0351241 A1 | 12/2017 | Bowers et al. | |
| 2018/0054376 A1 | 2/2018 | Hershey et al. | |
| 2018/0188704 A1 | 7/2018 | Cella et al. | |
| 2018/0210436 A1 | 7/2018 | Burd et al. | |
| 2018/0285234 A1 | 10/2018 | Degaonkar et al. | |
| 2018/0300437 A1 | 10/2018 | Thomsen et al. | |
| 2018/0357823 A1 | 12/2018 | Koniki et al. | |
| 2019/0014180 A1 | 1/2019 | Lawson et al. | |
| 2019/0041845 A1 | 2/2019 | Cella et al. | |
| 2019/0042987 A1 | 2/2019 | Heubach et al. | |
| 2019/0062062 A1 | 2/2019 | King et al. | |
| 2019/0078950 A1 | 3/2019 | Huang et al. | |
| 2019/0087900 A1 | 3/2019 | Crowley et al. | |
| 2019/0121340 A1 | 4/2019 | Celia et al. | |
| 2019/0393813 A1 | 12/2019 | Huang et al. | |
| 2020/0050181 A1 | 2/2020 | McDaniel | |
| 2020/0151479 A1 | 5/2020 | Cordell et al. | |

FOREIGN PATENT DOCUMENTS

| | | | |
|---|---|---|---|
| EP | 2 592 812 A2 | 5/2013 | |
| EP | 2 595 112 A1 | 5/2013 | |
| EP | 2 801 935 A1 | 11/2014 | |
| EP | 3 018 596 A1 | 5/2016 | |
| EP | 3 070 547 A1 | 9/2016 | |
| EP | 3 255 590 A1 | 12/2017 | |
| EP | 3 410 245 A1 | 12/2018 | |
| EP | 3 726 320 A1 | 10/2020 | |
| WO | 01/69329 A2 | 9/2001 | |
| WO | 2018/144897 A1 | 9/2018 | |
| WO | WO-2019080086 A1 * | 5/2019 | G06N 7/005 |

OTHER PUBLICATIONS

Extended European Search Report received for EP Patent Application Serial No. 17175166.2 dated Aug. 14, 2017, 9 pages.
Feddersen, Charles., "Real-Time Event Processing with Microsoft Azure Stream Analytics", Reference Architecture, Jan. 2015, 31 pages.
Non-Final Office Action received for U.S. Appl. No. 15/609,301 dated Dec. 13, 2018, 35 pages.
Non-Final Office Action received for U.S. Appl. No. 15/609,323 dated Dec. 31, 2018, 34 pages.
Communication pursuant to Article 94(3) received for EP Patent Application Serial No. 17175165.4 dated Jan. 18, 2019, 8 pages.
Communication pursuant to Article 94(3) received for EP Patent Application Serial No. 17175166.2 dated Dec. 20, 2018, 10 pages.
Non-Final Office Action received for U.S. Appl. No. 15/489,091 dated Feb. 25, 2019, 26 pages.

(56) References Cited

OTHER PUBLICATIONS

Final Office Action received for U.S. Appl. No. 15/609,301 dated May 22, 2019, 35 pages.
Final Office Action received for U.S. Appl. No. 15/609,323 dated May 23, 2019, 32 pages.
Non-Final Office Action received for U.S. Appl. No. 15/609,301 dated Sep. 3, 2019, 35 pages.
Notice of Allowance received for U.S. Appl. No. 15/609,323 dated Aug. 12, 2019, 37 pages.
Non-Final Office Action received for U.S. Appl. No. 15/936,870 dated Jul. 10, 2019, 51 pages.
Non-Final Office Action received for U.S. Appl. No. 15/936,940 dated Sep. 9, 2019, 65 pages.
First Office Action received for Chinese Patent Application Serial No. 201710432617.4 dated Jun. 20, 2019, 19 pages.
First Office Action received for Chinese Patent Application Serial No. 201710433517.3 dated Jun. 21, 2019, 20 pages.
Notice of Allowance received for U.S. Appl. No. 15/609,301 dated Nov. 21, 2019, 43 pages.
Summons to attend oral proceedings pursuant to Rule 115(1) EPC received for EP Patent Application Serial No. 17175165.4 dated Nov. 21, 2019, 32 pages.
Wikipedia, "Modularity", URL: https://en.wikipedia.org/w/index.php?title=Modularity&oldid=714646548, Apr. 11, 2016, pp. 1-10.
Wikipedia, "Modular design", URL: https://en.wikipedia.org/w/index.php?title=Modular design&oldid=721647382, May 23, 2016, pp. 1-4.
Wikipedia, "Modular programming", URL: https://en.wikipedia.org/w/index.php?title=Modular_programming&oldid=723013178, May 31, 2016, pp. 1-5.
Final Office Action received for U.S. Appl. No. 15/936,940 dated Jan. 14, 2020, 43 pages.
Second Office Action received for Chinese Patent Application Serial No. 201710432617.4 dated Jan. 15, 2020, 24 pages (Including English Translation).
Second Office Action received for Chinese Patent Application Serial No. 201710433517.3 dated Feb. 3, 2020, 23 pages (Including English Translation).
European Search Report received for EP Patent Application Serial No. 20169524.4 dated Aug. 19, 2020, 9 pages.
Final Office Action received for U.S. Appl. No. 16/677,088 dated Nov. 20, 2020, 38 pages.
Non-Final Office Action received for U.S. Appl. No. 16/384,106 dated Dec. 15, 2020, 97 pages.
Leitao, et al. "Integration Patterns for Interfacing Software Agents with Industrial Automation Systems" IEEE 2018 #978-1-5090-6684-1/18 pp. 2908-2913. (Year: 2018).
Communication pursuant to Rule 69 EPC for EP Patent Application Serial No. 20169524.4 dated Oct. 26, 2020, 2 pages.
Non-Final Office Action received for U.S. Appl. No. 16/677,088 dated Mar. 1, 2021, 36 pages.
Non-Final Office Action received for U.S. Appl. No. 16/030,257 dated Feb. 11, 2021, 148 pages.
Popovics et al., "Automatic simulation model generation based on PLC codes and MES stored data" 2012, 45th CIRPConference on Manufacturing Systems 2012, 6 pages (Year: 2012).
Schroeder et al., "Visualizing the digital twin using web services and augmented reality," 2016, 2016 IEEE 14th International Conference on Industrial Informatics, pp. 522-527 (Year: 2016).
MMLITE., "MagneMover LITE User Manual", 382 pages. Mar. 2016.
Non-Final Office Action received for U.S. Appl. No. 15/936,835 dated Apr. 9, 2020, 79 pages.
Non-Final Office Action received for U.S. Appl. No. 15/936,940 dated Apr. 16, 2020, 40 pages.
Notification of Grant of Patent for Invention received for Chinese Patent Application Serial No. 201710432617 dated Jul. 28, 2020, 08 pages.
Non-Final Office Action received for U.S. Appl. No. 16/677,088 dated Aug. 6, 2020, 50 pages.
Final Office Action received for U.S. Appl. No. 15/936,940 dated Aug. 21, 2020, 48 pages.
Communication pursuant to Rule 69 EPC received for EP Patent Application Serial No. 20157116.3 dated Aug. 24, 2020, 2 pages.
European Search Report received for EP Patent Application Serial No. 20157116.3 dated Jul. 15, 2020, 8 pages.
Extended European Search Report received for European Patent Application Serial No. 20166639.3 dated Mar. 2, 2021, 09 pages.
Extended European Search Report received for European Patent Application Serial No. 20166935.5 dated Feb. 22, 2021, 07 pages.
Extended European Search Report received for European Patent Application Serial No. 20166933.0 dated Mar. 1, 2021, 07 pages.
Communication pursuant to Rule 69 EPC received for European Patent Application Serial No. 20166639.3 dated Apr. 7, 2021, 2 pages.
Communication pursuant to Rule 69 EPC received for European Patent Application Serial No. 20166933.0 dated Apr. 7, 2021, 2 pages.
Communication pursuant to Rule 69 EPC received for European Patent Application Serial No. 20166935.5 dated Apr. 7, 2021, 2 pages.
Non-Final Office Action received for U.S. Appl. No. 15/936,940 dated Mar. 23, 2021, 48 pages.
Notice of Allowance received for U.S. Appl. No. 16/030,257 dated May 27, 2021, 36 pages.
Final Office Action received for U.S. Appl. No. 16/677,088 dated Jun. 9, 2021, 55 pages.
Non-Final Office Action received for U.S. Appl. No. 16/807,288 dated Aug. 17, 2021, 107 pages.
Non-Final Office Action received for U.S. Appl. No. 16/588,118 dated Jun. 28, 2021, 89 pages.
Zhang et al., "A big data analytics architecture for cleaner manufacturing and maintenance processes of complex products", ELSEVIER Journal of Cleaner Production, 2017, pp. 625-641.
Extended European Search report received for European application No. 20216463.8 dated Jun. 4, 2021, 9 pages.
Communication pursuant to Rule 69 EPC received for European application No. 20216463.8 dated Jul. 12, 2021, 2 pages.
Final Office Action received for U.S. Appl. No. 16/588,118 dated Oct. 8, 2021, 80 pages.
Non-Final Office Action received for U.S. Appl. No. 16/905,130 dated Sep. 30, 2021, 99 pages.

* cited by examiner

CONTEXTUALIZED DATA AGAINST A DESIGN MODEL

FIG. 16

INDUSTRIAL DATA SERVICES PLATFORM

BACKGROUND

The subject matter disclosed herein relates generally to industrial automation systems, and, for example, to provision of industrial data services.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a registration component configured to store, on a cloud platform, registration information relating to an industrial asset, the registration information comprising at least an identity of the industrial asset, an asset model defined for the industrial asset, and one or more data service applications available for the industrial asset, wherein the asset model models the industrial asset in terms of hierarchical elements, and the asset model references data tags defined on one or more industrial devices of the industrial asset; an application delivery component configured to receive, from a client device associated with an end user entity registered as an owner of the industrial asset, selection of a data service application, of the one or more data service applications, to be used to process industrial data generated by the industrial asset; a gateway interface component configured to collect, from the gateway device, industrial data collected by the gateway device from the data tags defined by the asset model; and an analytic component configured to apply processing to the industrial data in accordance with the data service application.

Also, one or more embodiments provide a method, comprising registering, by a system comprising a processor on a cloud-based industrial data services platform, an identity of an industrial asset, an asset model defined for the industrial asset, and one or more data service applications available for the industrial asset, wherein the asset model models the industrial asset in terms of hierarchical elements, and the asset model references data tags defined on one or more industrial devices of the industrial asset; rendering, by the system on a client device associated with an end user entity registered as an owner of the industrial asset, an indication of the one or more data service applications available for the industrial asset; receiving, by the system from the client device, selection of a data service application, of the one or more data service applications, to be used to process industrial data generated by the industrial asset; initiating, by the system in accordance with the data service application, collection of industrial data from the gateway device and obtained from the data tags defined by the asset model; and processing, by the system, the industrial data in accordance with the data service application.

Also, according to one or more embodiments, a non-transitory computer-readable medium is provided having stored thereon instructions that, in response to execution, cause a system to perform operations, the operations comprising registering, on a cloud-based industrial data services platform, an identity of an industrial asset, an asset model defined for the industrial asset, and one or more data service applications available for the industrial asset, wherein the asset model defines hierarchical groupings of data tags defined on one or more industrial devices of the industrial asset; rendering, on a client device associated with an end user entity registered on the cloud-based industrial data services platform as an owner of the industrial asset, an indication of the one or more data service applications; receiving, from the client device, selection of a data service application, of the one or more data service applications, to be used to process industrial data generated by the industrial asset; collecting, in accordance with the data service application, industrial data from the gateway device, wherein the industrial data is collected from the data tags defined by the asset model by the gateway device; and processing the industrial data in accordance with the data service application.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 16 is a screen shot of an example data presentation that can be generated by a presentation component of an application server system based on an aggregated plant model.

DETAILED DESCRIPTION

Figure 1:
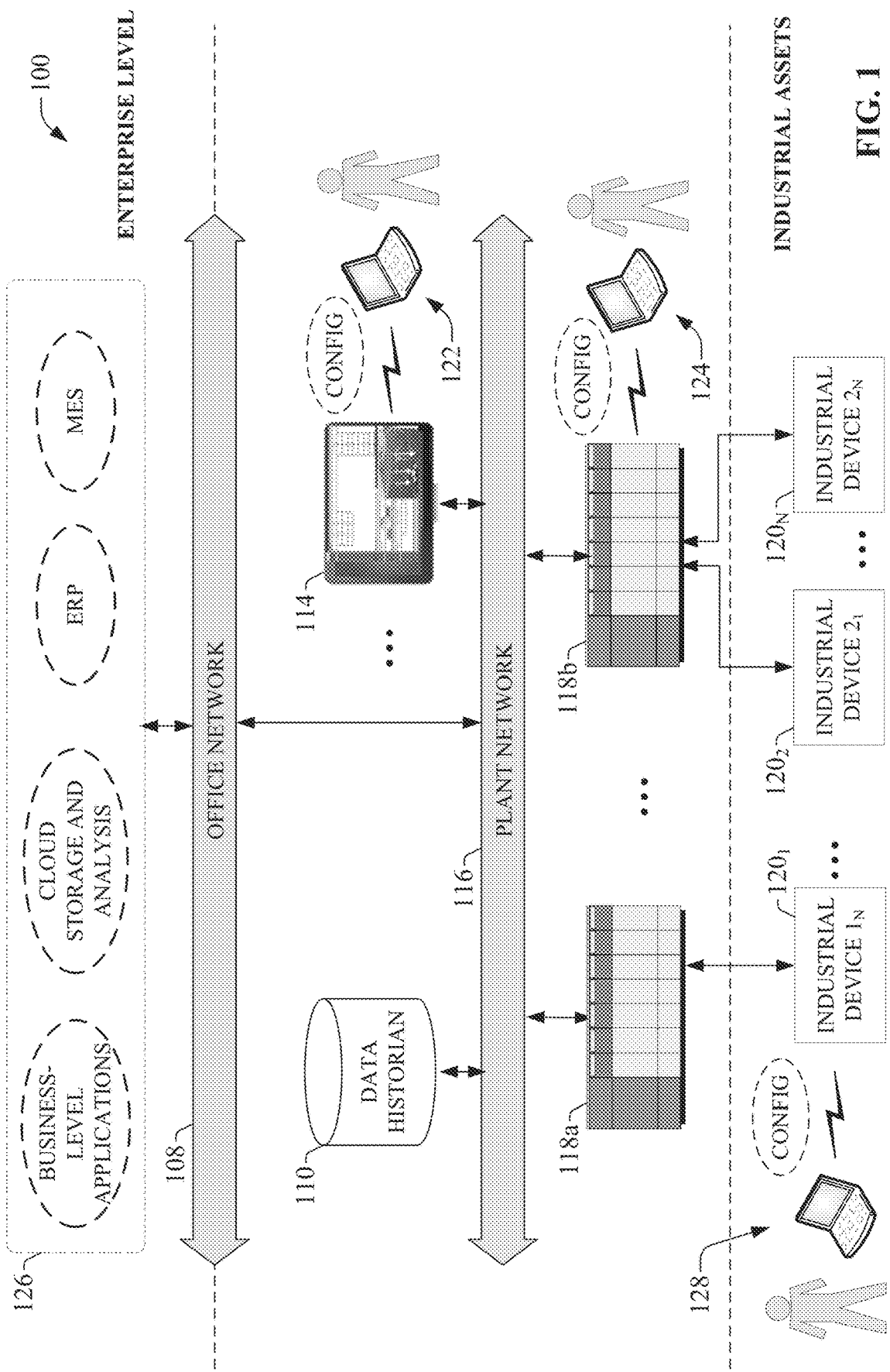
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

Figure 2:
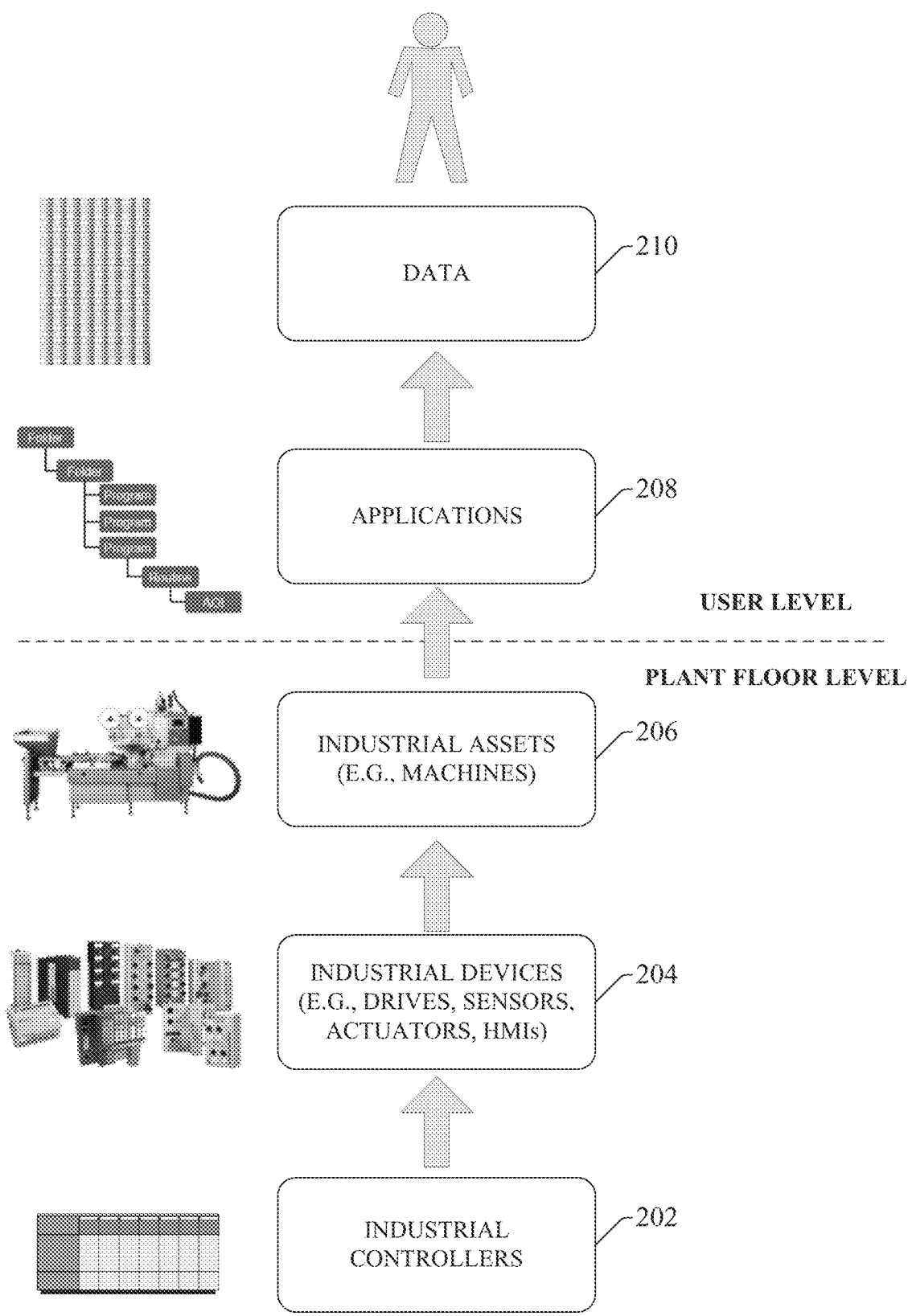
FIG. 2 is a conceptual diagram illustrating the flow of industrial data across various information levels in a typical industrial environment.

Industrial assets and their associated industrial assets can generate large amounts of information during operation. FIG. 2 is a conceptual diagram illustrating the flow of industrial data across various information levels in a typical industrial environment. On the plant floor level, industrial assets 206—e.g., industrial machines, production lines, industrial robots, etc.—carry out respective tasks in connection with manufacture, packaging, or handling of a product; control of an industrial process; or other such industrial functions. These industrial assets 206 are directly monitored and controlled by industrial devices 204. For example, various statuses and metrics of the industrial assets 206 (e.g., actuator positions, motor speeds, temperatures, flows, pressures, human presence, etc.) can be monitored using proximity switches, telemetry devices, photo-sensors, or other such monitoring devices. Industrial devices that facilitate control of the industrial assets 206 can include, for example, motor drives, pneumatic actuators, remote I/O devices, or other such equipment. Industrial devices 204 can also include HMIs (e.g., HMIs 114).

Industrial controllers 202 perform supervisory monitoring and control of the industrial assets 206 via industrial devices 204. In this regard, industrial devices 204 serve as inputs and outputs for industrial controllers 202, which control their output industrial devices in accordance with user-defined control routines (e.g., ladder logic programs, sequential function chart programs, etc.) and the current values and statuses of the input industrial devices. Data generated by industrial devise 204 reflect the current statuses of the industrial assets 206. This data is read by industrial controllers 202, which can generate additional data (e.g., calculated supplemental data, aggregated values, etc.) based on these industrial device statues and values.

At the user level, customized applications—e.g., reporting applications, visualization applications, enterprise resource planning applications, manufacturing execution systems, etc.—can collect selected subsets of information available in industrial controllers 202 and present this information as formatted data 210 to a user in accordance with data presentation formats defined in the applications 208.

Collecting and delivering some or all of this information to a user in meaningful presentation formats can offer valuable insights into past, current, and future operation of the industrial assets 202. However, the highly distributed nature of data available across many industrial devices associated with various industrial machines or systems that make up an industrial enterprise presents a challenge with regard to collection and formatting of the data for a common presentation that can be delivered to a user's client device. Moreover, much of the information available on a given set of industrial devices comprises uncontextualized, unstructured data (e.g., integer, real, or discrete values stored on the data table of an industrial controller) whose meaning must be defined by the applications 208 used to present the data. This places a burden on the developers of such applications 208, who must designate the meaning of each item of unstructured data received and rendered by these applications so that the data will have meaning to the viewer (e.g., a product count, a production rate, a system temperature or pressure, a historical trend, etc.).

To address these and other issues, one or more embodiments of the present disclosure provide an industrial data presentation system that support the use of structured data types in connection with generating and delivering meaningful presentations of industrial data. In one or more embodiments, industrial devices and/or controllers are configured to support structured data types—referred to herein as basic information data types (BIDTs)—comprising a finite set of structured information data types. In an example implementation, the basic information data types can comprise structured information data types representing, for example a rate, states, an odometer, and events. Within an industrial device or controller configuration, a user can define associations between respective physical assets (e.g., a machine, a production line, etc.) and one or more of the basic information data types. This can include, for example, defining one or more data tags representing a metric or status of the physical asset and associating each tag with one of the basic information data types. Each basic information data type has associated metadata that can be configured by a user to customize the data tag for a given industrial application (e.g., maximum and minimum values for rate data types, roll-over values for odometer data types, event or state names for event and state data types, any parent-child relationships between data tags, etc.).

Once configured in an industrial device or controller, the BIDTs are discoverable by external data collection and/or visualization systems, including local systems sharing a network with the industrial device or remote cloud-based systems. For example, a gateway device can be configured with one or more asset models that reference BIDT data tags on the industrial devices. The asset models assign groups of BIDT data tags to respective hierarchical elements of the asset models (e.g., a production facility, a production area or line, and industrial asset, a unit of equipment, an industrial device, etc.). The gateway device can retrieve industrial data from the BIDT data tags, as well as the associated user-defined metadata for each tag. Then either the gateway device or a separate application server system can generate a graphical presentation of the industrial data based on a selected one of the asset models and the BIDT metadata.

BIDTs can also facilitate simplified integration of an automation model of an industrial asset with a non-automation model of the asset (e.g., a mechanical model, a financial model, a thermal model, etc.) by providing a common nomenclature by which both models can reference selected items of real-time or historical asset data. In this way, automation-domain properties of the automation model can be linked to corresponding properties of the non-automation model (e.g., machine domain properties of a mechanical model) by virtue of a common data source referencing.

Figure 3:
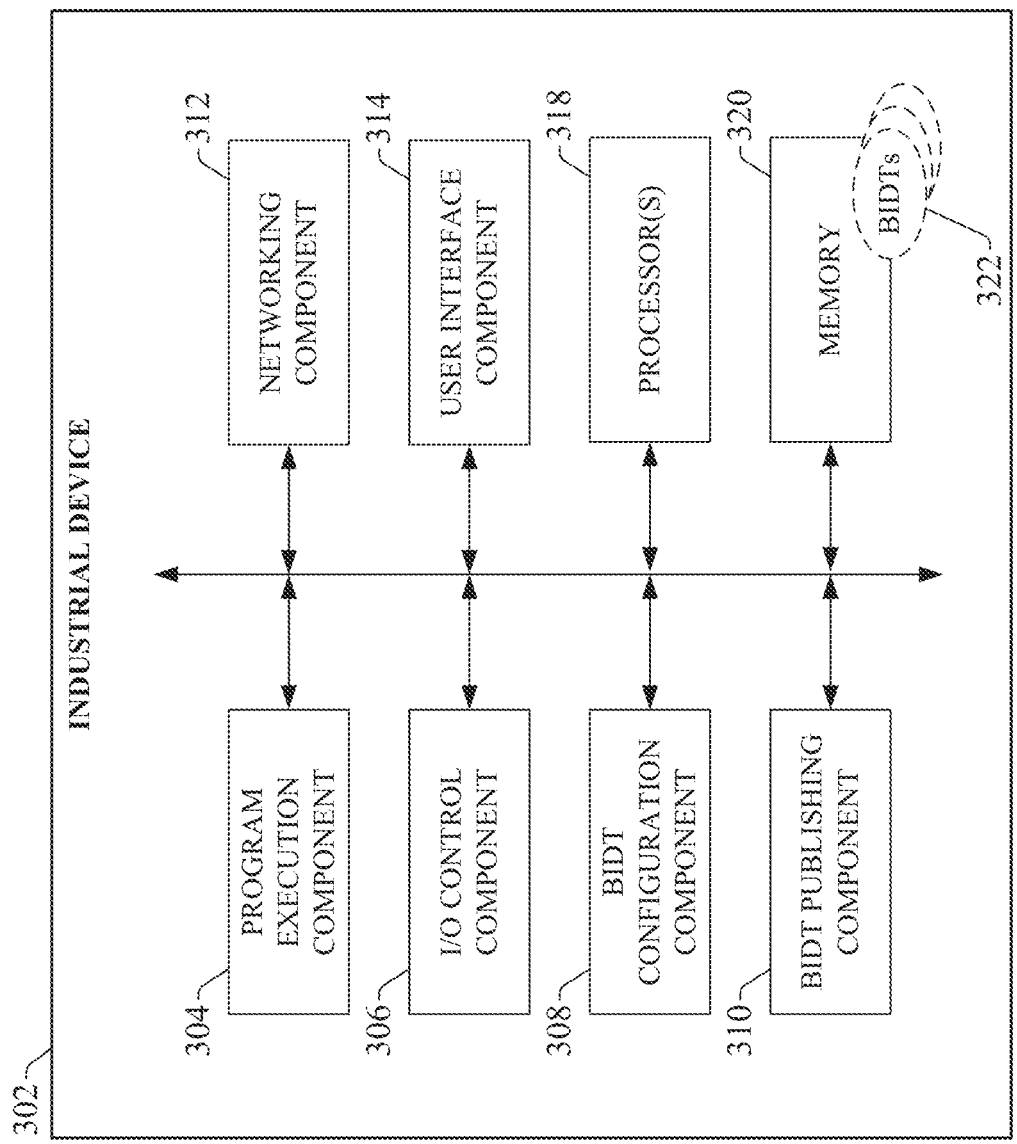
FIG. 3 is a block diagram of an example industrial device that supports basic information data types (BIDTs).

FIG. 3 is a block diagram of an example industrial device 302 that supports basic information data types according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial device 302 can comprise substantially any type of data-generating industrial device, including but not limited to an industrial controller, a motor drive, an HMI terminal, a vision system, an industrial optical scanner, or other such device or system. Industrial device 302 can include a program execution component 304, an I/O control component 306, a BIDT configuration component 308, a BIDT publishing component 310, a networking component 312, a user interface component 314, one or more processors 318, and memory 320. In various embodiments, one or more of the program execution component 304, I/O control component 306, BIDT configuration component 308, BIDT publishing component 310, networking component 312, user interface component 314, the one or more processors 318, and memory 320 can be electrically and/or communicatively coupled to one another to perform one or more of the functions of the industrial device 302. In some embodiments, components 304, 306, 308, 310, 312, and 314 can comprise software instructions stored on memory 320 and executed by processor(s) 318. Industrial device 302 may also interact with other hardware and/or software components not depicted in FIG. 3. For example, processor(s) 318 may interact with one or more external user interface devices, such as a keyboard, a mouse, a display monitor, a touchscreen, or other such interface devices.

Program execution component 304 can be configured to compile and execute a user-defined control program. In various embodiments, the control program can be written in any suitable programming format (e.g., ladder logic, sequential function charts, structured text etc.) and downloaded to the industrial device 302. Typically, the control program uses data values read by the industrial device's analog and digital inputs as input variables, and sets values of the industrial device's analog and digital outputs in accordance with the control program instructions based in part on the input values. I/O control component 306 can be configured to control the electrical output signals of the industrial device's digital and analog electrical outputs in accordance with the control program outputs, and to convert electrical signals on the industrial device's analog and digital inputs to data values that can be processed by the program execution component 304.

BIDT configuration component 308 can be configured to set metadata values associated with BIDT data tags defined for the industrial device 302 based on metadata configuration input data. As will be described in more detail below, in addition to standard general data types (e.g., real, analog, digital, etc.), industrial device 302 is configured to support industrial-specific data types referred to herein as basic information data types (BIDTs). Data tags associated with these basic information data types have associated metadata that can be configured by the user via BIDT configuration component 308 in order to customize the data tags for a given industrial application. For convenience, data tags that are associated with a basic information data type are referred to herein as "BIDTs." BIDTs 322 defined by the user are stored in memory 320 (e.g., in the industrial device's tag database together other defined data tags of other data types).

BIDT publishing component 310 is configured to expose defined BIDTs 322 to external systems, allowing the BIDTs 322 to be discovered by such systems over a local and/or remote network. Networking component 312 can be configured to exchange data with one or more external devices over a wired or wireless network using any suitable network protocol. User interface component 314 can be configured to receive user input and to render output to the user in any suitable format (e.g., visual, audio, tactile, etc.). In some embodiments, user interface component 314 can be configured to communicatively interface with a development application that executes on a client device (e.g., a laptop computer, tablet computer, smart phone, etc.) that is communicatively connected to the industrial device 302 (e.g., via a hardwired or wireless connection). The user interface component 314 can then receive user input data and render output data via the development application. In other embodiments, user interface component 314 can be configured to generate and serve suitable graphical interface screens to a client device, and exchange data via these graphical interface screens. Input data that can be received via user interface component 314 can include, but is not limited to, user-defined control programs or routines, data tag definitions, BIDT metadata configuration data, or other such data.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
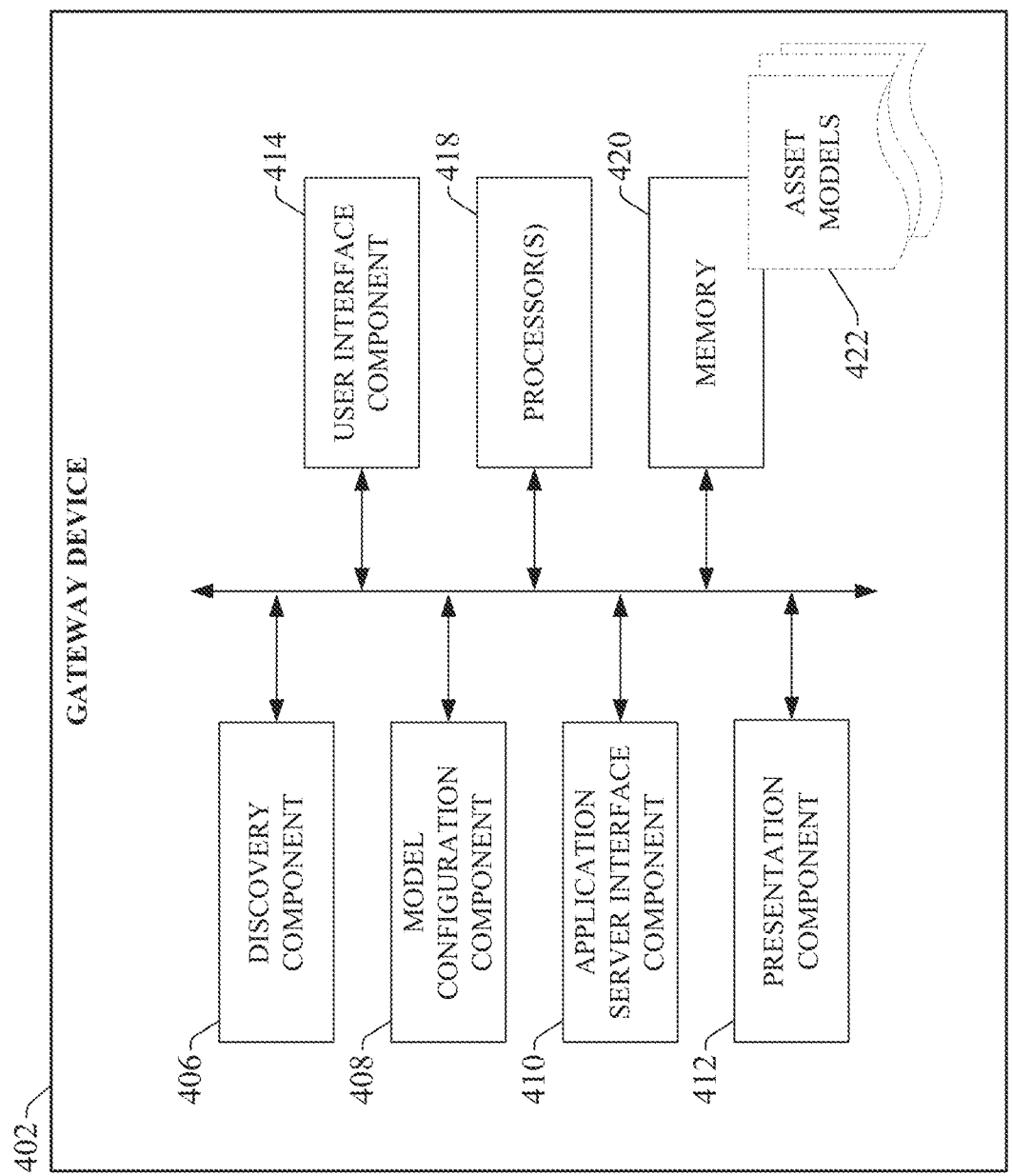
FIG. 4 is a block diagram of a gateway device capable of discovering BIDTs on one or more industrial devices and formatting a presentation of associated data in accordance with a user-defined asset model.

FIG. 4 is a block diagram of a gateway device 402 capable of discovering BIDTs on one or more industrial devices and formatting a presentation of associated data in accordance with a user-defined asset model. Gateway device 402 can include a discovery component 406, a model configuration component 408, an application server interface component 410, a presentation component 412, a user interface component 314, one or more processors 418, and memory 420. In various embodiments, one or more of the discovery component 406, model configuration component 408, application server interface component 410, presentation component 412, user interface component 314, the one or more processors 418, and memory 420 can be electrically and/or communicatively coupled to one another to perform one or more of the functions of the gateway device 402. In some embodiments, components 404, 406, 408, 410, 412, and 414 can comprise software instructions stored on memory 420 and executed by processor(s) 418. Gateway device 402 may also interact with other hardware and/or software components not depicted in FIG. 4. For example, processor(s) 418 may interact with one or more external user interface devices, such as a keyboard, a mouse, a display monitor, a touchscreen, or other such interface devices.

Discovery component 406 can be configured to discover BIDTs (e.g., BIDTs 322) defined on industrial devices (e.g., industrial device 302) that are communicatively connected to the gateway device 402. Discovery component 406 can also be configured to retrieve data and metadata associated with the BIDTs for use in generating industrial data presentations. Model configuration component 408 can be configured to create and store one or more asset models 422 in accordance with user-defined asset model definitions. These asset models 422 can represent an industrial asset or collection of industrial assets in terms of hierarchical elements of an industrial facility or collection of facilities, where these hierarchical element can include, but are not limited to, a plant, a production area or line, an industrial machine or other industrial asset, a unit of equipment that makes up an industrial asset, an industrial device (e.g., a controller, a motor drive, a vision system device, a safety device, etc.) associated with an industrial asset, or other such elements. Asset models 422 can also assign groups of BIDTs to respective elements of the hierarchical model. Asset models 422 can be customized to suit the information requirements of various types of information consumers (e.g., line operators, engineers, plant managers, etc.).

Application server interface component 410 can be configured to expose asset models 422 and industrial data collected from industrial devices (e.g., industrial device 302) to an application server (e.g., application server system 502 discussed below), which can aggregate multiple asset models 422 into a larger aggregate plant or enterprise model and generate graphical presentations of the industrial data based on the plant model. Presentation component 412 can be configured to generate a data presentation—e.g., in the form of a graphical display layout, a collection of widgets, etc.—that renders selected subsets of industrial data received from the discovery component 406 in accordance with one or more of the asset models 422. In some embodiments, presentation component 412 can be configured to render data associated with a BIDT using a suitable BIDT-specific widget (or other graphical display element) selected from a set of predefined widgets.

User interface component 414 can be configured to receive user input and to render output to the user in any suitable format (e.g., visual, audio, tactile, etc.). In some embodiments, user interface component 414 can be configured to communicatively interface with a client application that executes on a client device (e.g., a laptop computer, tablet computer, smart phone, etc.) that is communicatively connected to the gateway device 402 (e.g., via a hardwired or wireless connection). The user interface component 414 can then receive user input data and render output data via the client application. In other embodiments, user interface component 414 can be configured to generate and serve suitable graphical interface screens to a client device, and exchange data via these graphical interface screens. Input data that can be received via user interface component 414 can include, but is not limited to, asset model definitions that are saved as asset models 422, or other such data.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
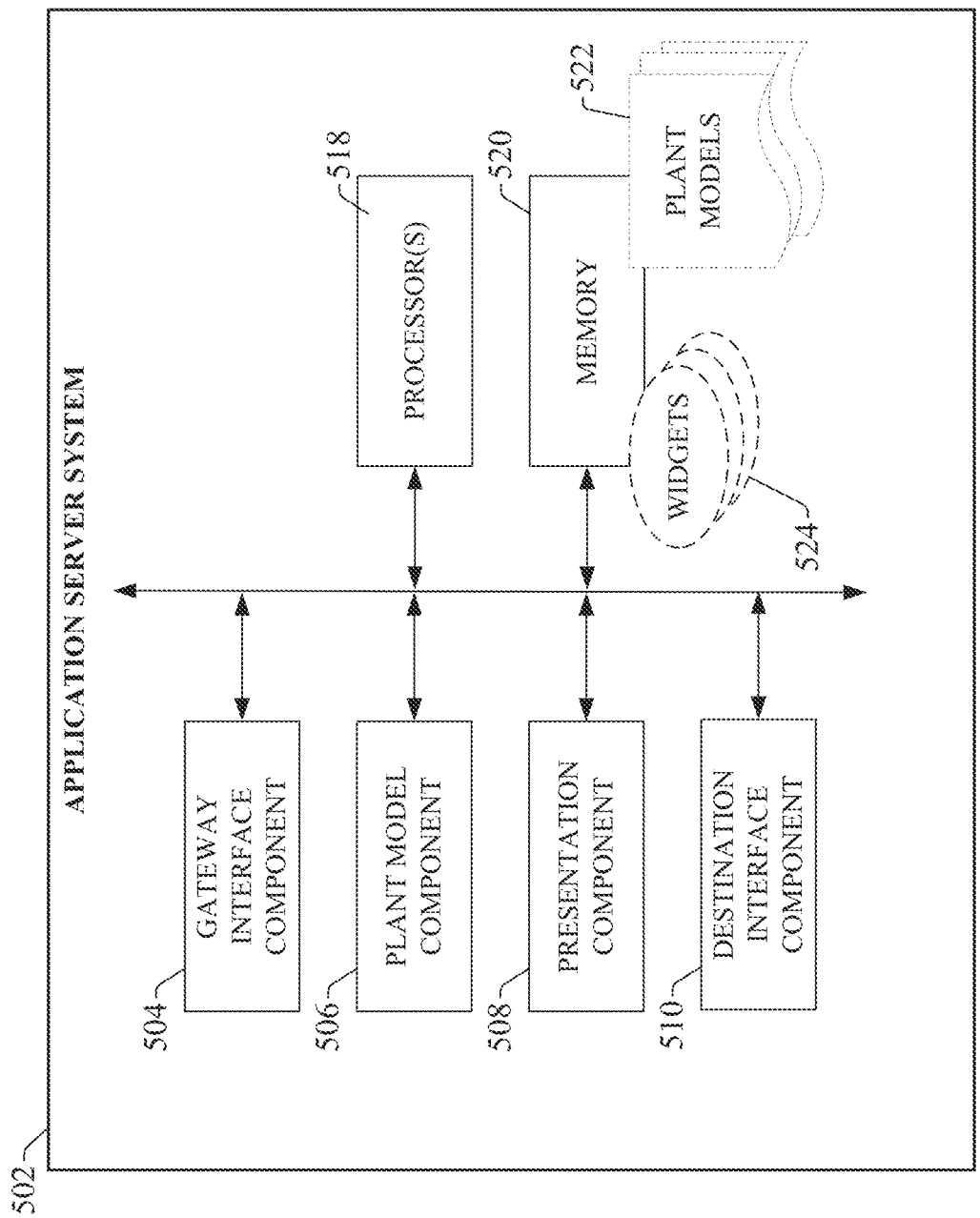
FIG. 5 is a block diagram of an application server system capable of aggregating asset models from gateway devices into one or more plant models and formatting a presentation of associated data received from the gateway devices in accordance with the aggregated plant models.

FIG. 5 is a block diagram of an application server system 502 capable of aggregating asset models 422 from gateway devices (e.g., gateway device 402) into one or more plant models 522 and formatting a presentation of associated data received from the gateway devices 402 in accordance with the aggregated plant models 522. Application server system 502 can include a gateway interface component 504, a plant model component 506, a presentation component 508, a destination interface component 510, one or more processors 518, and memory 520. In various embodiments, one or more of the gateway interface component 504, plant model component 506, presentation component 508, destination interface component 510, the one or more processors 518, and memory 520 can be electrically and/or communicatively coupled to one another to perform one or more of the functions of the application server system 502. In some embodiments, components 504, 506, 508, and 510 can comprise software instructions stored on memory 520 and executed by processor(s) 518. Application server system 502 may also interact with other hardware and/or software components not depicted in FIG. 5. For example, processor(s) 518 may interact with one or more external user interface devices, such as a keyboard, a mouse, a display monitor, a touchscreen, or other such interface devices.

Gateway interface component 504 can be configured to exchange data with one or more gateway devices (e.g., gateway device 402) over a wired or wireless network. In some embodiments, application server system 502 can be an on-premise device that resides on the plant floor, and the gateway interface component 504 can exchange data with the gateway devices 402 over a local plant and/or office network. In other embodiments, application server system 502 can reside on a cloud platform. In such embodiments, the gateway interface component 504 can exchange data with the gateway devices 402 over a combination of a public network (e.g., an Internet layer) and a private network (e.g., a plant or office network at the industrial facility).

The plant model component 506 can be configured to discover asset models 422 maintained on one or more gateway devices 402, and to aggregate these discovered asset models 422 into an overall plant model 522 for an industrial facility or enterprise. The plant model 522 can define hierarchical relationships between industrial assets of a given plant facility, or between assets distributed across geographically diverse plant facilities. The plant model 522 also defines relationships between BIDT data items associated with the respective industrial assets by assigning groups of BIDTs defined in industrial devices associated with the industrial assets to respective hierarchical elements of the plant model 522 (e.g., production lines, industrial asset identifiers, units of equipment, industrial devices, etc.). By defining relationships between assets that make up an industrial facility or enterprise, the plant models 522 similarly define relationships between data items associated with those assets. The hierarchical relationships defined by the plant models 522 can be leveraged by the application server system 502 to present information about the assets to a user in a structured fashion.

Presentation component 508 can be configured to generate a data presentation—e.g., in the form of a graphical display layout, a collection of widgets 524, etc.—that renders selected subsets of data received from the gateway devices 402 in accordance with one or more of the plant models 522. In some embodiments, presentation component 508 can be configured to render data associated with a basic information data type tag using a suitable BIDT-specific widget (or other graphical display element) selected from a set of predefined widgets 524. Destination interface component 510 can be configured to exchange data with one or more destination client devices over a wired or wireless network (e.g., a private plant or office network, a cloud platform, or a public network such as the Internet). This can include delivering the graphical data presentations to a client device in accordance with one or more of the plant models 522.

The one or more processors 518 can perform one or more of the functions described herein with reference to the systems and/or methods disclosed. Memory 520 can be a computer-readable storage medium storing computer-executable instructions and/or information for performing the functions described herein with reference to the systems and/or methods disclosed.

Figure 6:
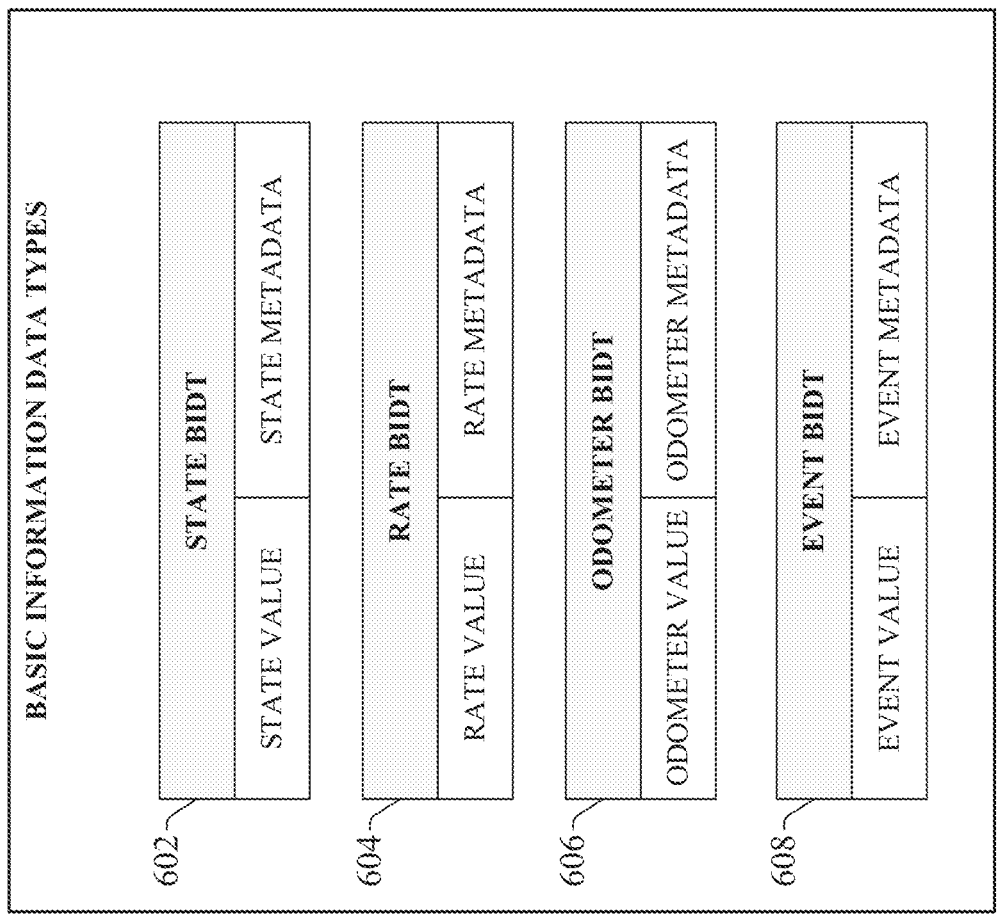
FIG. 6 is an illustration of four example BIDTs that can be supported by one or more embodiments of an industrial device.

FIG. 6 is an illustration of four example basic information data types that can be supported by one or more embodiments of industrial device 302. These data types can supplement other standard data types that are typically supported by industrial controllers or other industrial devices (e.g., integer, real, Boolean, string, floating point etc.). In general, data tags are data structures defined within an industrial device that reference a memory location within the device (e.g., an input value, an output value, or an internal data register) and correspond to respective data items. A data tag can be configured to be (or may be an instance of) of a specified data type, such as Boolean, floating point, integer, double integer, string, etc. During development, controller tags can be created and maintained in a tag database of the industrial device. The BIDTs described herein are additional data types that are catered to industrial automation applications, and that supplement conventional data types.

In the illustrated example, the basic information data types comprise a finite set of four structured information data types—a State BIDT 602, a Rate BIDT 604, an Odometer BIDT 606, and an Event BIDT 608. Although the examples described herein assume that the supported BIDTs comprise these four data types, it is to be appreciated that some embodiments may include other BIDT data types without departing from the scope of this disclosure.

Each BIDT includes a field for storing the current value of the BIDT (e.g., a state value, a rate value, an Odometer value, and an Event value) as well as one or more metadata fields configured to store user-defined configuration data for that BIDT. The metadata values for each BIDT can customize management and presentation of the associated BIDT data value in accordance with the particular industrial asset or industrial application with which the BIDT is associated.

The value contained in a State BIDTs 602 can represent a current state of an industrial asset or device (e.g., a machine, a production line, a motor drive, etc.). The state data contained in a State BIDT 602 can represent one of a set of predefined states representative of a current state or status of the associated industrial asset or device. For example, the State BIDT may convey an S88 state, a Packaging Machine Language state, a current state of a state machine defined for the asset, a state of a valve (e.g., OPEN or CLOSED), a state of a motor (e.g., RUNNING, IDLE, FAULTED, etc.), or other types of states.

User-configurable metadata associated with the State BIDT 602 (which can be configured by BIDT configuration component 308 in accordance with user input received via user interface component 314) may define a state machine representing available states of the associated asset, where each defined state is configured to be invoked in response to a detected condition. For example, each defined state may be linked via the metadata to one or more other related data tags defined in the industrial device 302 (e.g., a data tag representing a state of a sensor or switch indicative of the defined state), such that the current state indicated by the State BIDT 602 is a function of the current values of the related data tags.

The value contained in a Rate BIDT 604 can represent an integer or real value of a measured rate of a metric associated with the industrial asset or device. The rate value may be an instantaneous rate or a value representing a rate of change of the metric over time. For example, the rate value contained in the Rate BIDT 604 can represent a temperature, a pressure, a velocity (e.g., a velocity of a conveyor or other motor-driven machine component), an overall equipment effectiveness (OEE), or other such metric.

User-configurable metadata associated with the Rate BIDT 604 can define maximum and minimum values for the corresponding rate value, such that the value contained in the Rate BIDT 604 will not deviate outside the window defined by the maximum and minimum value metadata. The metadata can also identify one or more data sources (e.g., one or more other data tags or input addresses) that determine the event. For example, the metadata for the Rate BIDT 604 can define whether the corresponding rate value is an aggregation of multiple other values contained in other defined data tags. In this regard, the user can define the rate value to be an average or a sum of two or more identified data tags, or an integral of a data tag over time. Another metadata field can be used to designate an engineering unit to be associated with the rate.

The value contained in the Odometer BIDT 606 can represent a cumulative quantity associated with an industrial asset. For example, the Odometer BIDT 606 can be configured to represent cumulative quantity with a rollover value, such as a part count associated with the industrial asset. In such cases, the metadata associated with the Odometer BIDT 606 can include a definition of the rollover value. The Odometer BIDT 606 may also be configured to represent a quantity over a defined time interval, such as an energy consumption associated with the asset. In the case of quantities over a defined time interval, the metadata associated with the Odometer BIDT 606 can include a definition of the time interval, which may be defined in terms of daily start and end times, in terms of a start time and a defined duration of the time interval, or as another time definition format. The metadata associated with the Odometer BIDT 606 can also define one or more data sources that drive the odometer value. For example, the metadata may define a data tag associated with a Cycle Complete event, such that the odometer value will increment when the Cycle Complete data tag goes high. The odometer value may also be defined to be an aggregation of multiple values. In such cases, the metadata may identify two or more data tags whose values are to be aggregated or summed to yield the odometer value. The metadata can also define a unit of measure associated with the odometer value (e.g., bottles filled, operating cycles, megawatt-hours, etc.).

The value contained in the Event BIDT 608 can represent an instantaneous or persistent event associated with an industrial asset. For example, an Event BIDT 608 may represent an instantaneous event such as a push-button event (e.g., "Service Button Pushed"), a sensor event (e.g., "Part Present," "Person Detected," etc.), a safety device event (e.g., "Light Curtain Broken"), or another such instantaneous event. Persistent events that can be represented by Event BIDT 608 can include, but are not limited to, events associated with an alarm status (e.g., "Alarm Unacknowledged," "Alarm Acknowledged," etc.). Other examples of persistent events that can be represented by an Event BIDT 608 can include persistent events with an identifier and a state. For example, events associated with a batch process can include a batch number (an identifier) and an associated event (e.g., "Starting," "Executing," "Complete," etc.). User-configurable metadata associated with the Event BIDT 610 can include identifiers of other data tags whose states, in aggregation, determine the event to be represented by the Event BIDT 610. Alternatively, if the event represented by Event BIDT 608 is a function of only a single input (e.g., a push-button input), the metadata can identify the appropriate input address of the industrial device.

In addition to the metadata described above for each basic information data type, the BIDTs may also include configurable metadata fields that define communication or discovery parameters for the respective BIDTs. For example, each BIDT may include an Update Rate metadata parameter that allows the user to set the rate or frequency at which the BIDT sends its data to a gateway device in order to update a corresponding data presentation. Such metadata fields may allow the user to set the update period for the BIDT (e.g., a 60 second period, which causes the BIDT to send updated values every 60 seconds), or to specify that the BIDT is to send its updated value substantially continuously (e.g., every 5 milliseconds to 10 seconds).

It is to be appreciated that the BIDTs described above in connection with FIG. 6 are intended to be exemplary, and that other types of BIDTs are also within the scope of one more embodiments of this disclosure.

Figure 7:
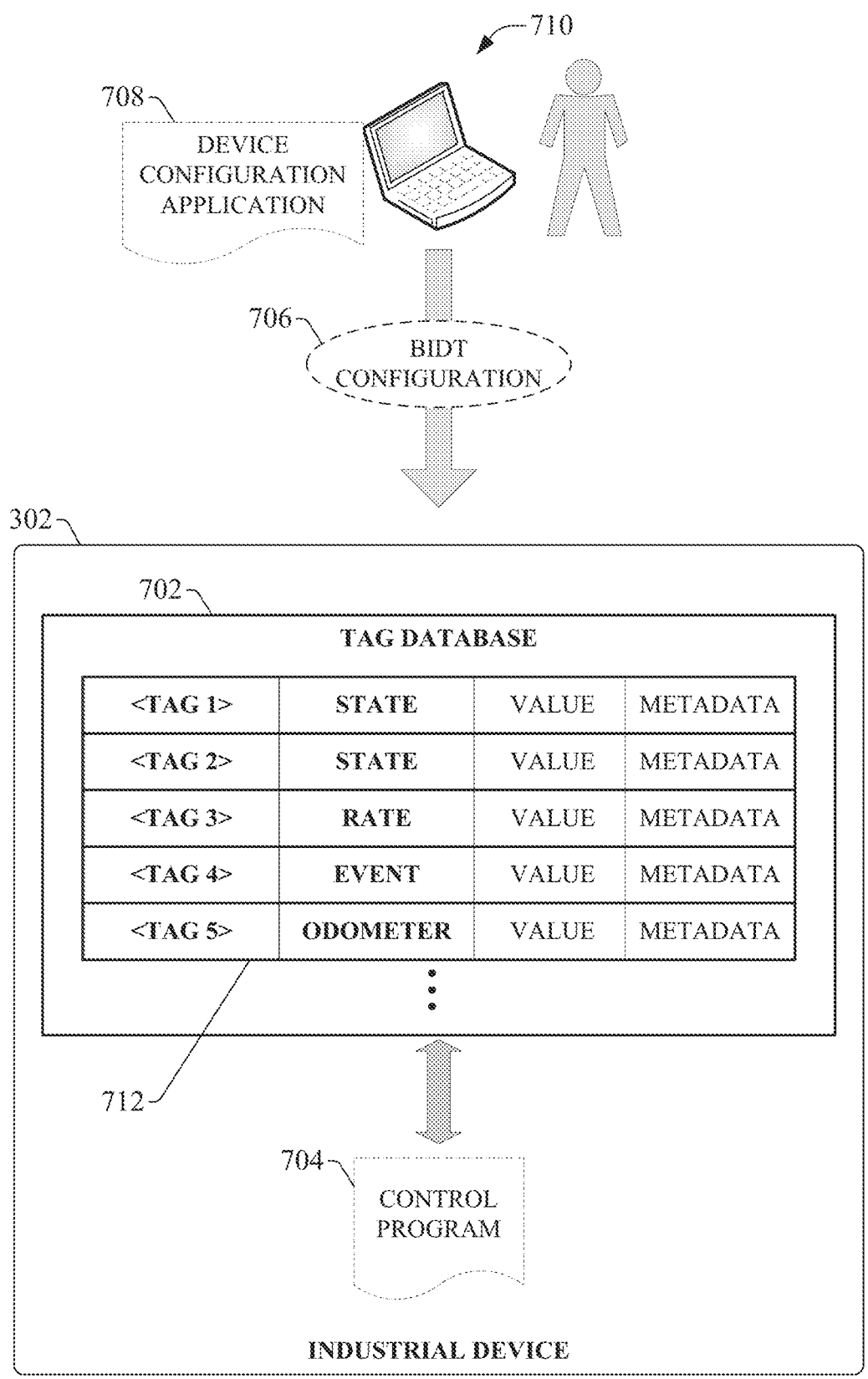
FIG. 7 is a diagram illustrating development of BIDTs in a tag database of an industrial device.

In an example scenario, a user can configure BIDTs in an industrial controller or other industrial device during control program development, along with other data tags to be used by the control program. FIG. 7 is a diagram illustrating configuration of BIDTs in a tag database 702 of an industrial device 302 that supports BIDTs. Industrial device 302 may be, for example, an industrial controller (e.g., a programmable logic controller or other type of programmable automation controller) configured to execute an industrial control program 704 to facilitate monitoring and control of an industrial machine or process. Industrial device 302 includes a tag database 702 that stores data tag definitions. The data tag definitions are configured by a user in tandem with development of control program 704 (e.g., a ladder logic program, a sequential function chart program, etc.), and define data tags 712 of various data types that are used to store and identify analog and digital data values generated and consumed by the control program 704. Example standard data types that can be represented by data tags 712 can include, for example, integer data types, real data types, Boolean data types, etc. In addition to these standard data types, one or more of the data tags 712 can include BIDTs (e.g., BIDTs 602, 604, 606, and 608) associated with the basic information data types described herein. These BIDTs are also referred to as smart tags.

In this example scenario, a user can configure both the control program 704 and the data tag definitions using a device configuration application 708 that executes on a client device 710 (e.g., a laptop computer, a desktop computer, a tablet computer, etc.) that is communicatively interfaced to the industrial device 302. In various embodiments, client device 710 can interface with the industrial device 302 over a hard-wired connection (e.g. a universal serial bus connection, an Ethernet connection, a serial connection, etc.) or over a wireless connection (e.g., near-field, WiFi, etc.) supported by user interface component 314. Device configuration application 708 can execute a program development environment that can be used to develop control program 704 and its associated data tags 712, including any BIDTs to be associated with one or more industrial assets to be controlled using control program 704.

During development, BIDT configuration component 308 of the industrial device 302 can create BIDTs corresponding to any of the BIDT types described above (state, rate, odometer, and event, or other supported BIDT types) in accordance with BIDT configuration input 706 downloaded to industrial device 302 by client device 710. Using device configuration application 708, the user can also configure the metadata associated with each BIDT in order to customize the BIDTs for a given industrial application. For example, for a State BIDT 602 associated with a bottle filling machine to be controlled by industrial device 302, the user may specify the various states to be represented by the tag (e.g., Running, Home, Abnormal, Idle, etc.). In some embodiments, the BIDT configuration component 308 can support a number of pre-defined states that can be selected by the user and associated with a given State BIDT. In addition or alternatively, the user can define the names of one or more of the states to be associated with the State BIDT.

For a Rate BIDT 604 representing a velocity of a conveyor that feeds bottles to the filling machine, the user can specify maximum and minimum values for the velocity value. Accordingly, the Rate BIDT 604 will not generate a velocity value that is outside the range defined by the defined maximum and minimum values, and may generate an error or alarm output if the measured velocity value exceeds the defined maximum or falls below the defined minimum. Another Rate BIDT 604 representing an average temperature may be configured to average multiple analog temperature input values specified by the user in the metadata. For an Odometer BIDT 606 representing a product count (e.g., the number of filled bottles output by the filling machine), the user can configure the associated metadata to define the data tag that triggers an increment of the odometer value (e.g., an input tag or another BIDT representing a "fill cycle complete" event), as well as daily shift start and shift end times between which the value of the Odometer BIDT 606 will increment before being reset to zero. Metadata of an Event BIDT 608 associated with a component of the filling machine can define an input address or data tag representing a state of a device (e.g., a push-button, a photo-sensor, etc.) that determines the event, or an alarm data tag corresponding to an alarm whose state (e.g., Abnormal, Normal, Acknowledged, Unacknowledged, etc.) determines the event.

Figure 8:
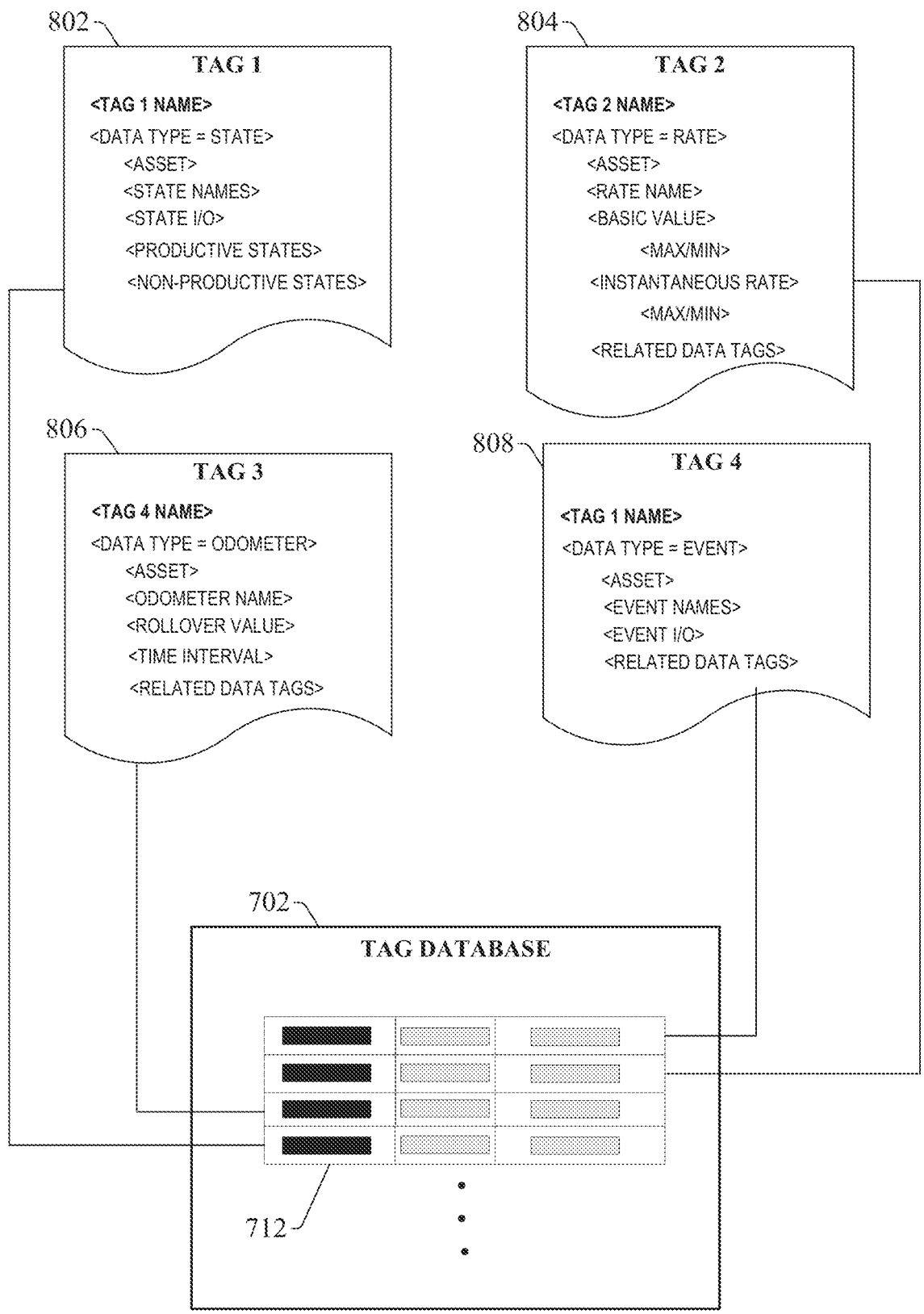
FIG. 8 is a diagram illustrating storage of BIDTs in a tag database.

Once the data tags (both standard and BIDTs) are configured, the tag database 702 stores the configured data tags 712 on memory 320 of industrial device 302, where the data tags 712 are accessible by control program 704. FIG. 8 is a diagram illustrating storage of BIDTs in tag database 702, which shows example data fields for respective types of BIDTs. In the example depicted in FIG. 8, data tag 1 802 is a State BIDT with metadata fields for a name of an industrial asset associated with the tag (e.g., a name of a bottle filling machine, a die cast furnace, a stamping press, etc.), names of the states represented by the tag 802, identification of one or more device inputs or other data tags that determine the states, identification of productive and non-productive states, etc.

Data tag 2 804 is a rate BIDT with metadata fields for an industrial asset name, a name of the rate represented by the rate value (e.g., Line 3 Conveyor Velocity), maximum and minimum values for a basic rate value and/or for an instantaneous rate, related data tags whose values are aggregated to obtain the rate value, a unit for the rate value, or other such metadata fields. Data tag 3 806 is an Odometer BIDT with metadata fields for an asset name, a name of the odometer value (e.g., Bottles Filled, #4 Die Cast Energy Consumption, etc.), a rollover value representing a value of the odometer value at which the value will return to zero, a time interval during which the odometer value is to be incremented (e.g., a start and end time corresponding to a work shift), one or more related data tags that trigger an increment of the odometer value, a unit associated with the odometer value, or other such metadata fields. Data tag 4 808 is an Event BIDT with metadata fields for an asset name, names one or more events represented by the Event BIDT, identification of one or more inputs or data tags that determine the event, or other such metadata data fields.

It is to be appreciated that the metadata fields described above in connection with FIG. 8 are only intended to be exemplary, and that the metadata for a BIDT can have any suitable set of data fields that allow the user to align the BIDT with the industrial application carried out by the industrial device 302.

Figure 9:
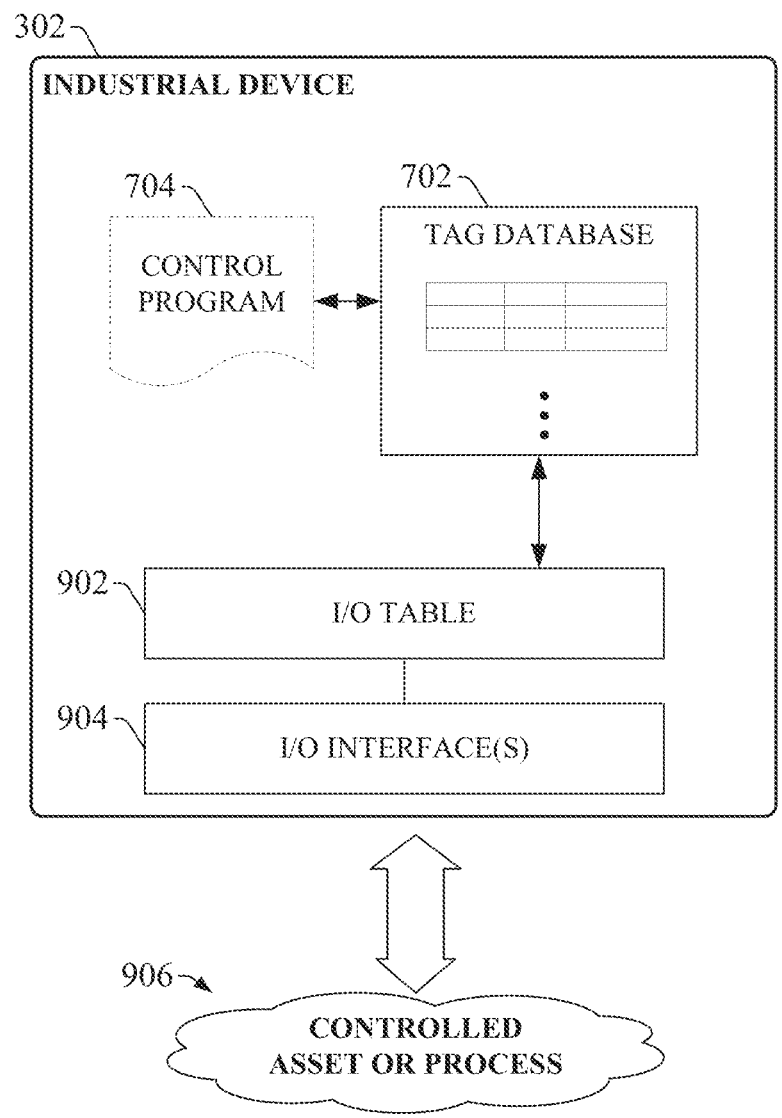
FIG. 9 is a diagram illustrating runtime operation of an example industrial device that supports BIDTs.

After industrial device 302 has been programed and configured (including creation of any BIDTs to be used by the control program 704), the industrial device 302 can be deployed on the plant floor to facilitate control of one or more industrial assets or processes. FIG. 9 is a diagram illustrating runtime operation of an example industrial device 302 that supports BIDTs. In this example, industrial device 302 is assumed to be an industrial controller (e.g., a PLC or other type of programmable automation controller). Controlled asset or process 906 can represent any industrial machine, production line, process, or operation under the control of industrial device 302. Controlled asset or process 906 can have a number of associated input and output devices (e.g., industrial devices 204 of FIG. 2) that receive command signals from or send telemetry data to industrial device 302 over any suitable combination of hardwired or networked connectivity to regulate a controlled operation. Industrial device 302 can also include one or more I/O interfaces 904 that provide hardwired or networked connectivity to the controlled equipment and industrial devices associated with the controlled asset or process 906. These I/O interfaces 904 can include, for example, digital and/or analog input modules, digital and/or analog output modules, networking modules, or the like.

An I/O table 902 within the industrial device's memory 320 can maintain current analog and digital values of the various inputs and outputs read from or written to the I/O interfaces 904. That is, data signals read from field devices by I/O interfaces 904 (e.g., analog or digital input modules) can be written to the I/O table 902 (e.g., by I/O control component 306). Some or all of these input values can be linked to respective data tags (standard or BIDT data tags) maintained in tag database 702, which can be read by control program 704 or by external applications. These input values can then be read from the appropriate data tags by control program 704, which updates its control variables accordingly. Similarly, output values generated by the control program 704 can be written to output data tags defined in tag database 702, causing the corresponding output registers of I/O data table 902 to be updated. The I/O control component 306 then generates appropriate analog or digital output signals at the output points of I/O interfaces 904 in accordance with the updated output values. It is to be appreciated that this overview of industrial controller functionality is only intended to be exemplary, and that the BIDTs described herein can be implemented on other types of industrial controllers having different data update processes, or on different classes of industrial devices.

Figure 10:
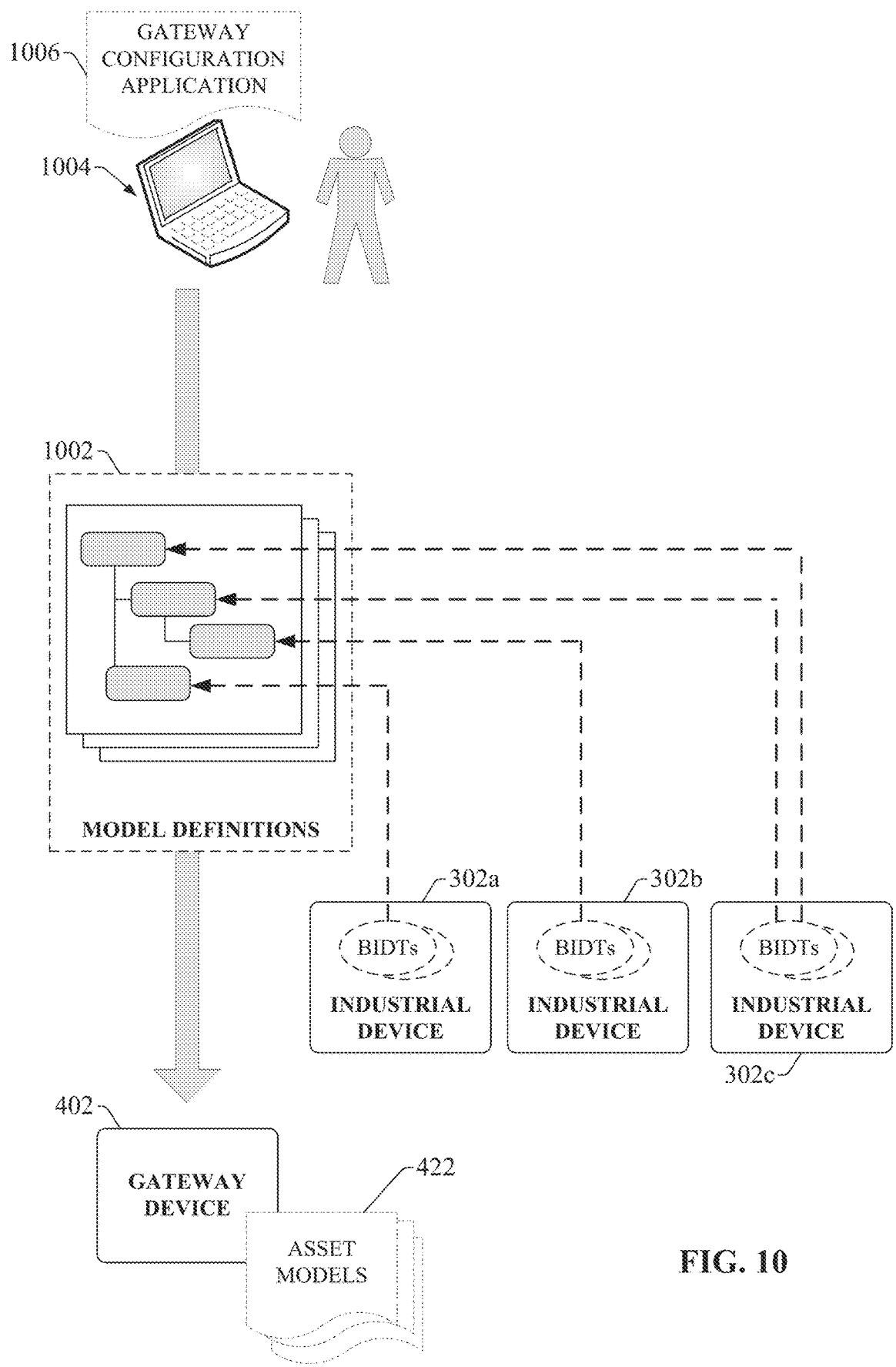
FIG. 10 is a diagram illustrating configuration of a gateway device with one or more asset model definitions.

BIDTs in tag database 702 are discoverable by external systems, so that the BIDT data—with associated metadata customized in accordance with the industrial application carried out by industrial device 302—can be retrieved and organized by those external systems in accordance with user-defined asset and/or plant models. In one or more embodiments, a gateway device 402 can be used to collect, format, and present data from one or more BIDT-capable industrial devices 302. FIG. 10 is a diagram illustrating configuration of a gateway device 402 with one or more asset model definitions. Gateway device 402 can be configured using a gateway configuration application 1006 that executes on a client device 1004 (e.g., a laptop computer, a desktop computer, a tablet computer, etc.). In some embodiments, gateway configuration application 1006 can be an integrated tool of device configuration application 708 used to program and configure industrial device 302.

Gateway configuration application 1006 allows a user to define an asset structure or model of an industrial automation application or a collection of industrial automation applications being monitored and controlled by one or more BIDT-capable industrial devices 302. These asset models define hierarchical relationships between industrial assets, associated industrial devices, production lines or areas, and data generated by the various devices associated with the industrial applications. Using gateway configuration application 1006, a user can define these asset models as model definitions 1002, which can be downloaded to and stored on gateway device 402 as asset models 422.

To facilitate creation of the model definitions 1002, gateway configuration application 1006 can be configured to generate and render suitable configuration screens on client device 1004 that guide the user through the process of defining these asset models 422 for their own industrial applications. The model definitions 1002 can be defined to reference the BIDT data tags defined on one or more industrial devices 302. In particular, the model definitions 1002 can define, as nodes of the hierarchy, hierarchical elements of an industrial asset or collection of assets, and assign selected groups of BIDT data tags to respective elements with which the BIDT data tags are associated (e.g., a node associated with an industrial asset, a unit of equipment associated with the asset, or an industrial device associated with the asset). The asset models 422 are thereby configured by the user to associate the respective BIDTs with selected industrial machines, devices, production lines, and/or plant facilities, as well as to define hierarchical relationships between these elements.

In embodiments in which gateway configuration application 1006 is an integrated tool of device configuration application 708, model building tools of the gateway configuration application 1006 can allow the user to build the model definitions 1002 by browsing to selected BIDTs defined in one or more industrial device configuration files (e.g., the configuration files that are downloaded to the industrial devices 302, and which define the control program 704 and tag database 702). The user can create nodes representing an industrial facility, production lines or areas within the industrial facility, industrial assets (e.g., industrial machine, industrial robots, etc.) within each production line, units of equipment associated with a given industrial asset (e.g., a loader, a pusher, a machining station, etc.), and/or industrial devices (e.g., controllers, drives, etc.) associated with each industrial asset. Selected BIDTs defined on respective industrial devices 302a, 302b, and 302c can then be associated with respective nodes defined in the model definitions 1002 to yield an asset model 422, which can be downloaded to gateway device 402. The asset model 422 allows the user to define a hierarchical asset or plant architecture, and to group BIDTs within the framework in association with selected nodes representing plant production areas or production lines, industrial assets, and/or equipment and devices associated with the assets.

Figure 11:
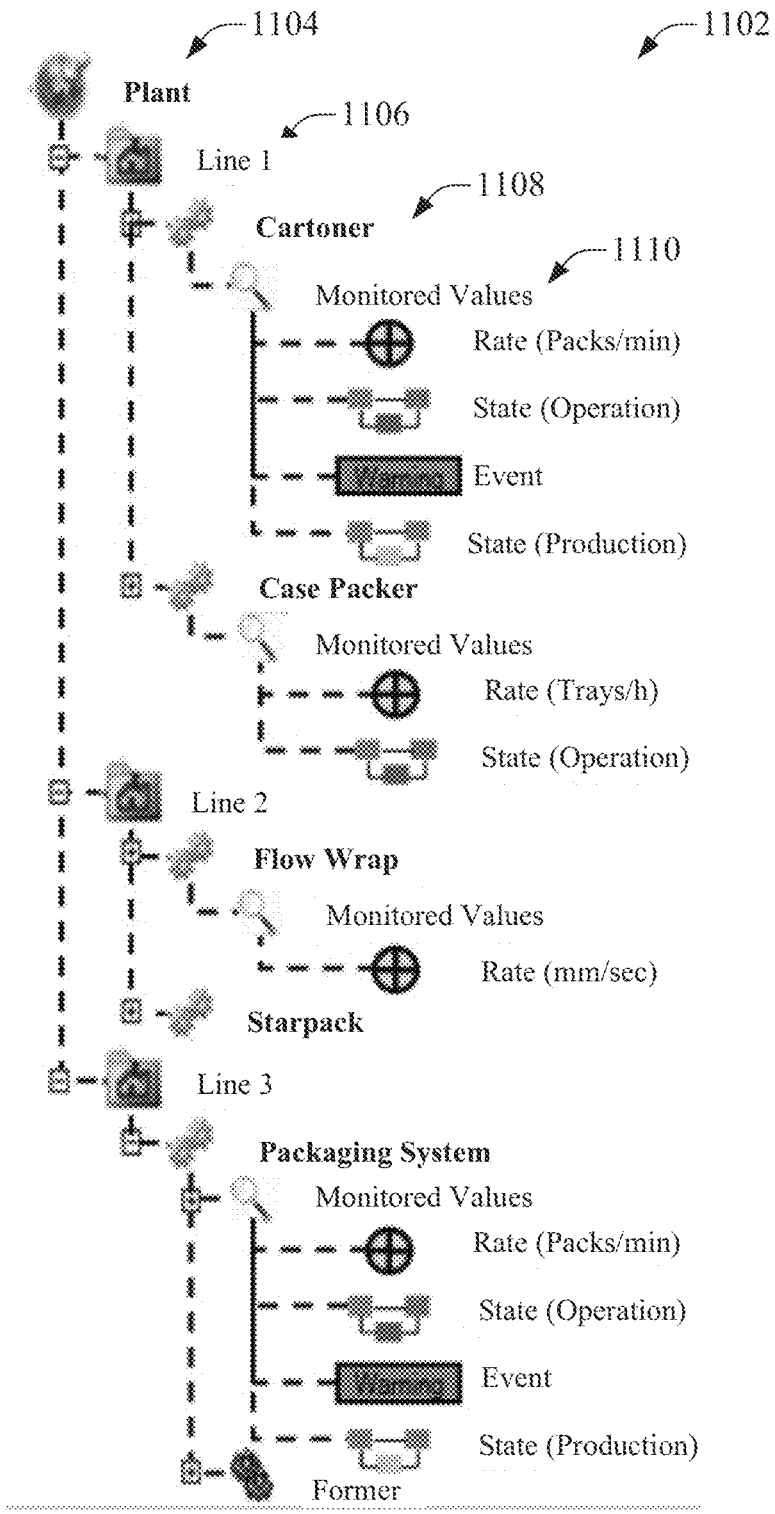
FIG. 11 is a graphical representation of an example asset model formatted as a production model.

Asset models 422 defined on gateway device 402, working in conjunction with the BIDTs defined on industrial devices 302, contextualize data generated by industrial applications and facilitate generation of contextualized data presentations. For a given industrial application, multiple asset models 422 can be created and maintained on gateway device 402, where each asset model 422 can represent a different view of the industrial application. The different views represented by the asset models 422 can be customized to the needs of a particular user role. For example, one asset model 422 for a given industrial application may represent a production model view of the industrial application. FIG. 11 is a graphical representation of an example asset model formatted as a production model 1102. Example production model 1102 has a single plant node 1104, below which are multiple line nodes 1106 (Line 1, Line 2, and Line 3), which are child nodes relative to plant node 1104. Line nodes 1106 represent various production lines within the plant represented by plant node 1104. Each line node 1106 has a number of child machine nodes 1108 representing machines deployed on the line represented by the associated line node 1106 (e.g., Cartoner, Case Packer, Flow Wrap, Packaging System). Each machine node 1108 is associated with a number of monitored values 1110, which are data values obtained from corresponding BIDTs configured on an industrial device 302. The monitored values 1110 may correspond to production and operation statistics, such as a production rate (obtained from a Rate BIDT), operation and production states (obtained from State BIDTs), or line events (obtained from Event BIDTs). As can be seen in FIG. 11, various groups of BIDT data tags—represented by the monitored values 1110—are respectively assigned to a selected machine and line within the plant, as defined by the asset model definition. This example production model 1102 yields a view of the industrial facility (comprising Lines 1, 2, and 3) that may be suitable for an operator or shift manager responsible for daily operation of the lines.

Figure 12:
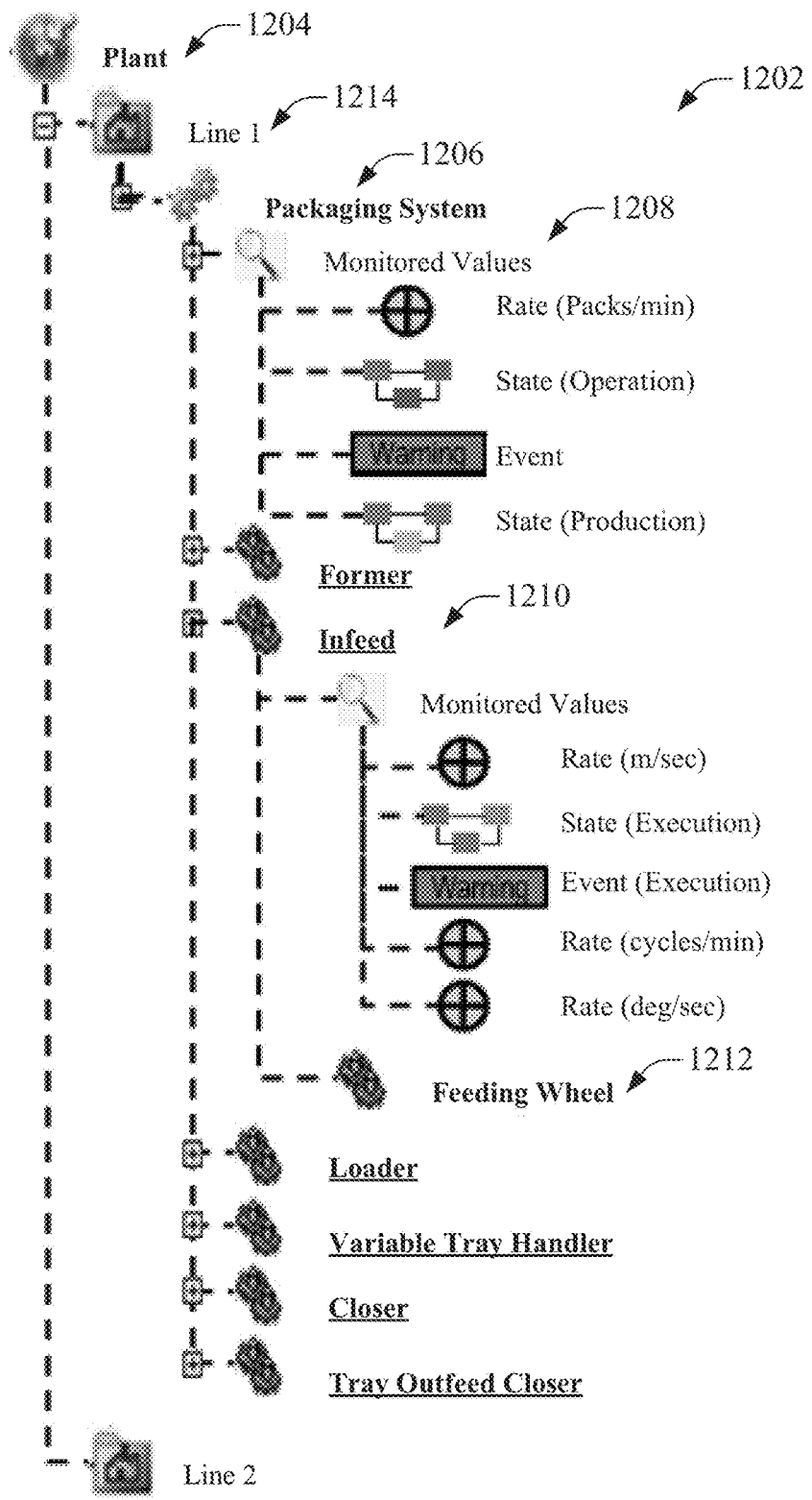
FIG. 12 is a graphical representation of an example asset model formatted as a design model.

FIG. 12 is a graphical representation of an example asset model formatted as a design model 1202. Design model 1202 is configured to present a view of data from the industrial application in a contextualized manner suitable for a plant engineer, original equipment manufacturer (OEM), or system designer. Similar to production model 1102, design model includes a plant node 1204 with a number of child line nodes 1214. In this example, child nodes for each line node 1214 can include machine nodes 1206 (e.g., Packaging System) representing a machine of the line represented by the line node 1214, as well as stage nodes 1210 representing individual stages of the machine (e.g., Former, Infeed, Loader, etc.). Each machine node 1206 can be associated with monitored values 1208 (obtained from BIDTs configured on relevant industrial device 302) relating to production and operation of the machine. Each stage node 1210 can be associated with monitored values (also obtained from respective BIDTs) representing current operating statistics for that stage of the machine. Some stage nodes 1210 may also have child nodes representing individual equipment components of that stage (e.g., equipment node 1212, which represents a finding wheel that is a part of the infeed). As with the production model 1102 depicted in FIG. 11, a user can configure design model 1202 by defining the various hierarchical nodes of the model, and assigning selected groups of BIDT tags (the monitored values) to selected nodes of the model. The system allows the user to define the nodes of the model according to any user-defined hierarchical plant or enterprise structure, where the structure can comprise hierarchical levels defined by the user (e.g., production lines, production cells, production stations, etc.).

It is to be appreciated that the production model 1102 and design model 1202 described above are only intended to be exemplary, and that the asset models described herein are not limited to these two types of views. In general, any suitable user-defined asset model 422 that leverages data from the BIDTs to present a contextualized view of industrial asset data is within the scope of one or more embodiments of this disclosure.

As can be seen in the example asset structure models of FIGS. 11 and 12, the BIDTs are properties of their associated parent nodes. For example, the monitored values 1110 of the Cartoner machine—which are obtained from respective BIDT data tags on one or more industrial devices 302—are properties of the Cartoner product node 1108. During model development, the user can define the various plant nodes, line nodes, product nodes, equipment nodes, or other types of nodes that make up an industrial enterprise as a whole, or a particular set of industrial applications within the industrial enterprise, and define the hierarchical relationships between these nodes. The user can then assign selected BIDTs to their appropriate nodes to yield the asset model, which can be downloaded and stored on the gateway device 402.

The BIDT publishing component 310 of each industrial device 302 exposes the BIDTs of the industrial device 302 to the asset models 422 defined on the gateway device 402. Thus, when the gateway device 402 is deployed on a plant network or on a cloud platform having secured remote access to the industrial devices 302, the asset models 422 can cause the gateway device 402 to retrieve data from the respective BIDTs as well as the metadata parameters associated with each BIDT in order to generate contextualized presentations of the industrial application data in accordance with the asset models 422.

Figure 13:
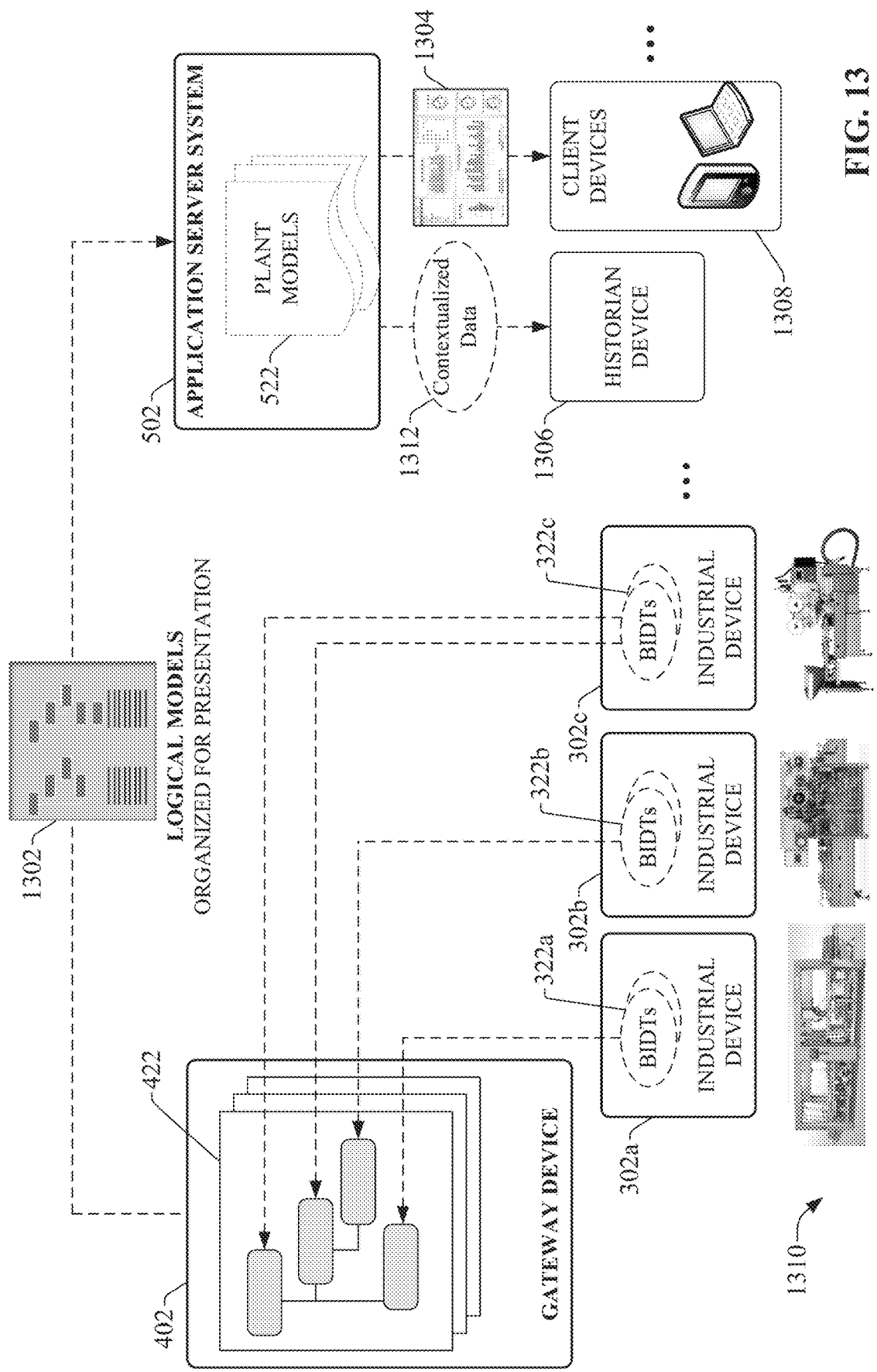
FIG. 13 is a diagram illustrating the flow of BIDT data from industrial devices to an application server system that delivers contextualized presentations of the BIDT data.

FIG. 13 is a diagram illustrating the flow of BIDT data from industrial devices 302 to an application server system 502 that delivers contextualized presentations of the BIDT data. In this example, multiple industrial devices 302 (e.g., 302a, 302b, and 302c) have been programmed to control respective industrial assets 1310 (e.g., industrial machines, production lines, etc.). Each industrial device 302 has been configured with a number of BIDTs 322 (or smart tags), as described above in connection with FIGS. 6-9. A gateway device 402 has been configured with a number of asset models 422, as described above in connection with FIGS. 10-12. Asset models 422 define respective customized views of the BIDT data.

During operation, industrial devices 302a-302c monitor and control their respective industrial assets 1310 (e.g., via respective input and output devices associated with the respective industrial assets 1310). Gateway device 402 is networked to the respective industrial devices 302*a*-302*c*. For example, gateway device 402 may be an on-premise device that resides on the same plant network as industrial devices 302*a*-302*c*. In another implementation, gateway device 402 may reside on a cloud platform and is capable of securely accessing the plant network from the cloud platform (e.g., through a firewall device).

The BIDT publishing component 310 of each industrial device 302 exposes the data and metadata associated with each configured BIDT 322 to the gateway device 402, rendering the BIDT data and metadata accessible and retrievable by the discovery component 406 of the gateway device 402. For each model 422 defined on gateway device 402, the model configuration component 408 of the gateway device 402 retrieves the data and metadata for each BIDT referenced by the model 422 (as specified by the user-defined model definitions 1002) and creates a logical model 1302 of the data based on the model 422 and the BIDT data and metadata. Logical model 1302 organizes the data from the BIDTs in accordance with the hierarchical asset models 422 defined by the user.

Gateway device 402 includes an application server interface component 410 (see FIG. 4) that communicatively connects the gateway device 402 to an application server system 502. Although application server system 502 is depicted in FIG. 13 as being a separate system relative to gateway device 402, in some embodiments the application server system 502 can be an integrated application of the gateway device 402. Application server system 502 is configured to receive the logical model 1302 from gateway device 402 and serve data display presentations 1304 to authorized client devices 1308. For example, the presentation component 508 of application server system 502 can generate an application view of the BIDT data based on the logical model and associated BIDT data and metadata received from the gateway device 402, and the destination interface component 510 of the application server system 502 sends this application view to one or more client devices 1308 as data display presentation 1304. In some scenarios, application server system 502 can also store selected subsets of the contextualized data 1312 in a historian device 1306 that is integrated with or communicatively connected to application server system 502.

Figure 14:
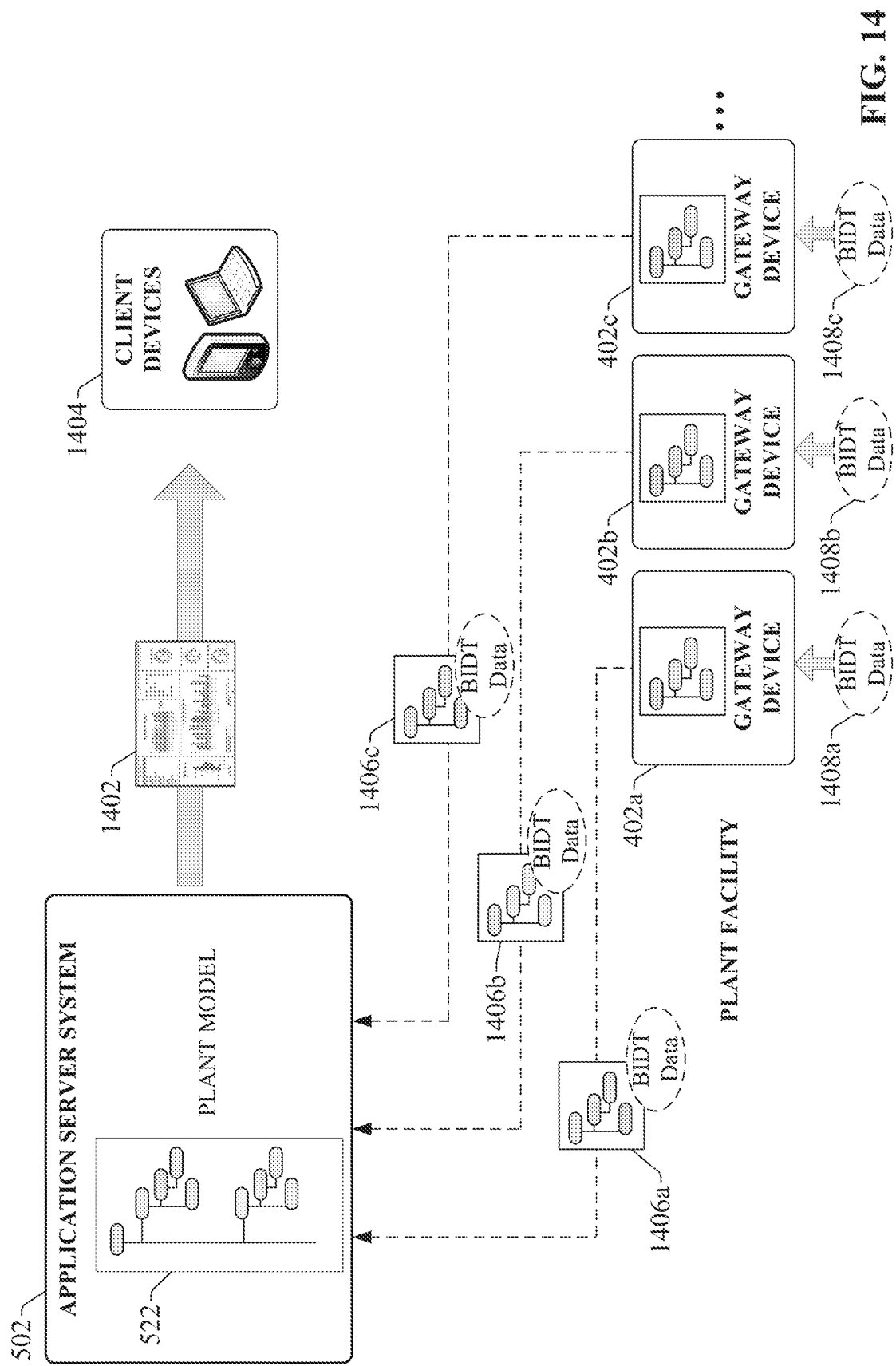
FIG. 14 is a diagram illustrating collection and integration of logical asset models into a common plant model by an application server system.

Data display presentations 1304 can present the contextualized data from the BIDTs in a format that generally aligns with the plant and asset hierarchy defined by the asset models 422. In the example depicted in FIG. 13, the application server system 502 is depicted as receiving logical models 1302 and BIDT data and metadata from a single gateway device 402 that receives and contextualizes BIDT data from multiple industrial devices 302*a*-302*c*. As illustrated in FIG. 14, in some embodiments application server system 502 can be configured to collect logical models 1302 and BIDT data and metadata from multiple gateway devices (e.g., gateway devices 402*a*-402*c*), and integrate the logical models 1302 into a common plant model 522. In an example implementation, gateway devices 402*a*-402*c* may reside at different areas of a given plant facility, and application server system 502 can be either an on-premise device or a cloud-based system that receives the defined asset models 1406*a*-1406*c* from the respective gateway devices 402*a*-402*c*, together with the data and metadata from the BIDTs defined on each gateway device 402*a*-402*c*. In another example implementation, gateway devices 402*a*-402*c* may reside at different geographically diverse industrial facilities whose plant and/or office networks are linked to a cloud platform on which application server system 502 executes.

Gateway devices 402*a*-402*c* collect BIDT data 1408*a*-1408*c* from respective industrial devices (not shown in FIG. 14), as described in previous examples. Each of the gateway devices 402*a*-402*c* is configured with one or more asset models 1406*a*-1406*b*, as also discussed above. The application server system 502 retrieves the asset models 1406*a*-1406*c* from the respective gateway devices 402*a*-402*c*, and the plant model component 506 of the application server system 502 integrates the asset models 1406*a*-1406*c* into an aggregate plant model 522, which is used as the basis for formatting and presenting the BIDT data via data presentations 1402.

Figure 15:
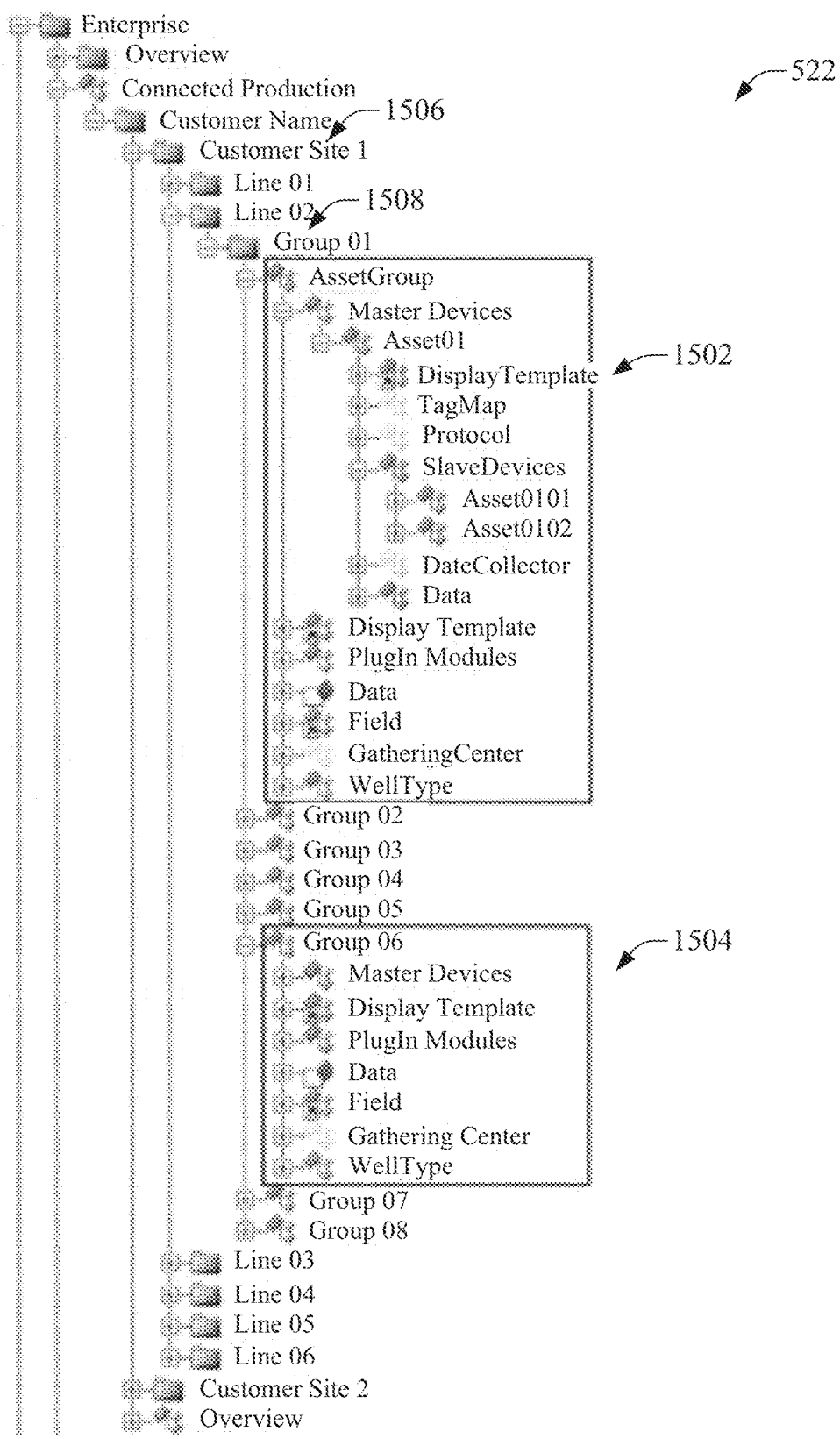
FIG. 15 is an example plant model generated by an application server system by integrating multiple asset models received from respective multiple gateway devices.

FIG. 15 is an example plant model 522 generated by application server system 502 by integrating multiple asset models received from respective multiple gateway devices 402. In this example, the gateway interface component 504 of application server system 502 has discovered two new asset models 1502 and 1504 residing on respective two gateway devices 402, and has integrated models 1502 and 1504 into the larger plant model 522. Asset model 1502 corresponds to an asset group named Group 01, which resides at a plant facility indicated by plant node 1506 (Customer Site 1). Accordingly, the plant model component 506 of application server system 502 has inserted asset model 1502 under an appropriate asset group node 1508 (Group 01) below the plant node 1506. The plant model component 506 can determine the appropriate location at which to connect the asset model 1502 within the plant model 522 based on user-defined context information associated with the asset model 1502 (e.g., an explicit definition of the plant facility and production area within which the asset represented by asset model 1502 resides). As shown in FIG. 15, asset model 1502 defines a master device (Asset01) and a number of slave devices (Asset0101, Asset0102) that make up the asset.

Asset model 1504 represents a second asset located in the same plant facility, customer site, and production line (Line 02). Accordingly, asset model 1504 has been inserted under the same plant node 1506 and production line node (Line 02).

Figure 16:
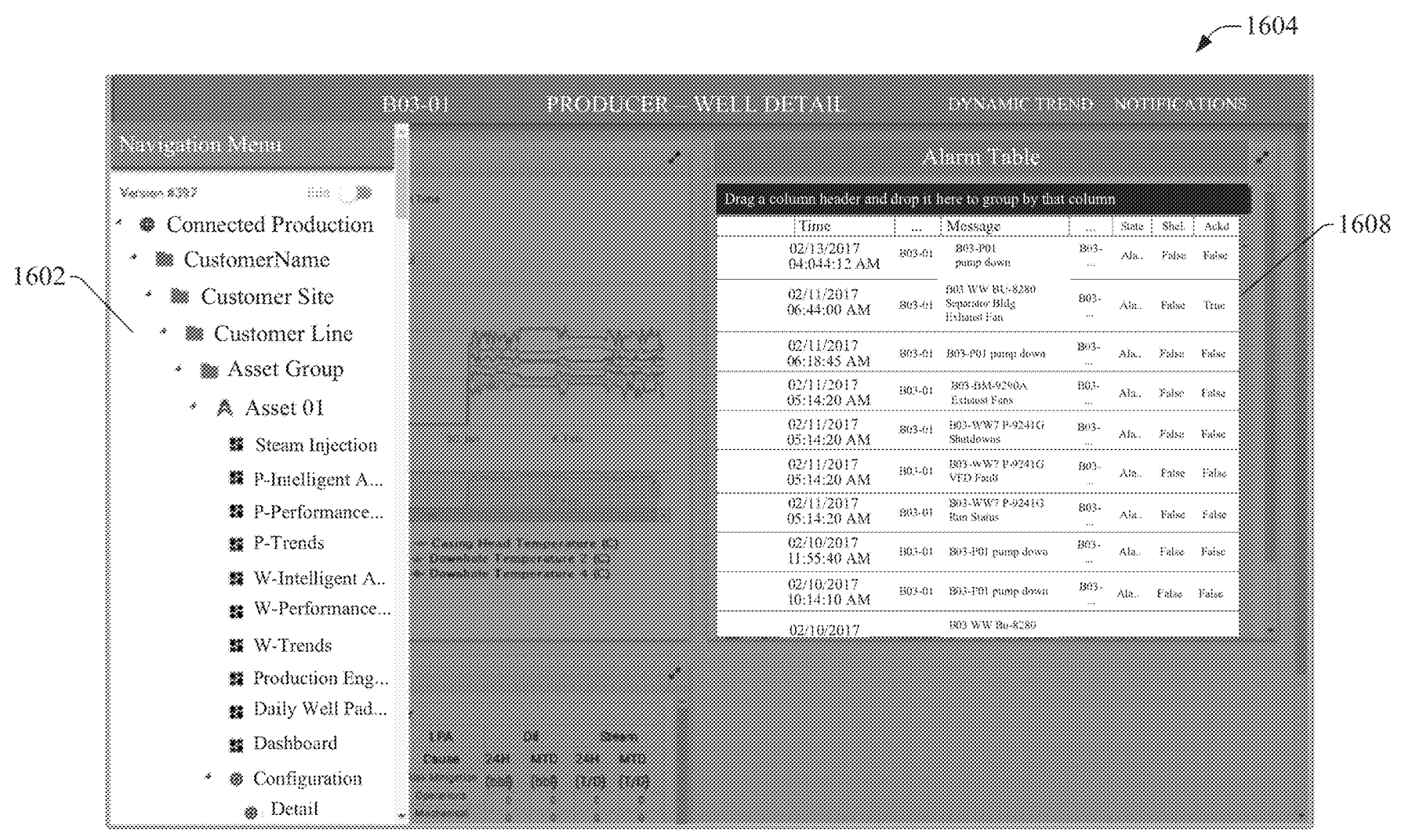

FIG. 16 is a screen shot of an example data presentation 1604 that can be generated by the presentation component 508 of application server system 502 based on the aggregated plant model 522. Example data presentation 1604 includes a navigation menu 1602 having a hierarchical structure that conforms to the hierarchical structure of plant model 522. For example, navigation menu comprises a hierarchical tree structure having nodes representing one or more plant facilities and associated production areas, production lines, industrial assets, and/or industrial devices, as defined by plant model 522. Selection of any of the nodes of the navigation menu invokes a corresponding data presentation on a data display area 1608 of the data presentation 1604. The data display area 1608 renders selected subsets of the BIDT data corresponding to the selected node (e.g., a node corresponding to a production area or production line, an industrial asset, an industrial device, etc.), formatted in accordance with a pre-defined visualization application, graphical widget, or collection of graphical widgets. The visualization application or widgets (e.g., widgets 524) can be stored on application server system 502 and selectively invoked by the presentation component 508 in response to selection of a node from the navigation menu 1602.

In some embodiments, the presentation component 508 of application server system 505 can support different graphical widgets corresponding to respective BIDT types. For example, an odometer widget may be defined for displaying data from an Odometer BIDT (e.g., an integer numerical display widget). Accordingly, when the user selects a node from navigation menu corresponding to a plant, production line, industrial asset, or industrial device having one or more associated odometer BIDT data tags (as defined by the asset model 422), the presentation component 508 can invoke the odometer widget to display the corresponding odometer data on the data display area 1608. The other BIDT data types can likewise be associated with one or more corresponding graphical widgets that can be invoked by the presentation component 508 to display those BIDT data items. Example graphical widgets that can be supported by application server system 502 for rendering of BIDT data can include, but are not limited to, integer or real numerical displays, state or event text displays, bar graphs, line graphs, animated state machine graphics, animated graphical representations of industrial assets whose visual state is dependent on a current state, event, or value reported by a BIDT data tag, or other such widgets.

In some embodiments, presentation component 508 can automatically design a data presentation for display in the data display area 1608 based on the type of industrial asset being viewed and the associated BIDT data types. For example, if a user selects a node corresponding to an industrial machine having an associated Odometer, State, Rate, and Event BIDTs (as defined by the plant model 522 to which the industrial machine belongs), the presentation component 508 can invoke and arrange a collection of graphical presentation widgets that render the associated BIDT data as well as any auxiliary data that may be appropriate. In an example implementation, the presentation component 508 can invoke an appropriate number of BIDT-specific widgets for rendering the state, rate, odometer, and event data, and organize these widgets into a suitable presentation, with each widget or data item appropriately labeled. The presentation component 508 can determine suitable labels for each data item based on one or both of the asset model definitions (e.g., the names assigned to the respective nodes of the asset model 422) or the BIDT metadata (e.g., event or state names, BIDT data tag names, etc.).

The presentation component 508 can also generate and display auxiliary data based on the BIDT data. For example, when a node of the navigation menu 1602 having an associated rate BIDT is selected, the presentation component 508 can display the current rate value using an appropriate graphical widget, as well as a time-based trend graph showing the value of the rate BIDT over time. Similarly, when rendering an event BIDT, the presentation component can render a current event specified by the event BIDT as well as a time-stamped list of most recent events associated with the event BIDT. In order to populate such auxiliary data displays, the application system server can store historical contextualized data 1312 from the BIDTs in a historian device 1306 during operation (see FIG. 13), where the historian device 1306 may be either an integrated storage area of the application server system 502 or a separate historical data storage device. The presentation component 508 can leverage this stored historical (e.g., time-stamped events generated by event BIDTs, historical trend data from rate BIDTs, etc.) in order to populate graphical trends or event logs.

In some embodiments, the application server system 502 can allow the user to customize the data presentations for any of the selectable nodes rendered in the navigation menu 1602. For example, the presentation component 508 can be configured to dynamically design and generate a default presentation for a given node (e.g., industrial asset) based on the types and numbers of BIDTs associated with that node. This can include selecting appropriate widgets for displaying the current values of the BIDTs, selecting additional widgets for displaying auxiliary information for the BIDTs (e.g., historical trends, event logs, etc.), and orienting these widgets on the data display area 1608. The presentation component 508 can also allow the user to modify or enhance these dynamically generated default presentations by moving selected widgets to preferred locations, adding or removing graphical widgets, relabeling data items, etc. These modified presentations can then be saved, such that the presentation component 508 will re-present these customized presentations each time the node is selected.

The format of the presentation generated by presentation component 508 will depend on the asset and/or plant models that are invoked. In some embodiments, different asset models 422 and/or plant models 522 can be associated with different user roles. For example, a production asset model (such as production model 1102 of FIG. 11) may be defined for use by plant operators, while a design asset model (such as design model 1202 of FIG. 12) can be defined for plant engineers or OEMs. When a user accesses application server system 502 to invoke a view of the system, the asset and/or plant models associated with the user can be invoked, and the presentation component 508 can construct the data presentation based on the user- or role-specific model. In an example embodiment, the appropriate asset model can be determined based on log-in credentials of the user. For example, after the user provides a user identifier and any security credentials (e.g., a password, biometric information, etc.) the user's identity can be cross-referenced with a role database maintained on the application server system, and the asset and/or plant model(s) associated with that user role (e.g., operator, engineer, plant manager, OEM, etc.) can be invoked and used as the basis for the data visualization.

It is to be appreciated that the example visualization display depicted in FIG. 16 is only intended to be exemplary, and that any suitable graphical arrangement and presentation of data is within the scope of one or more embodiments of this disclosure.

Also, while the examples described above in connection with FIGS. 14-16 depict the graphical presentations as being generated and delivered by application server system 502, some embodiments of gateway devices 402 can also be configured to generate graphical presentations of the BIDT data based on their stored asset models 422 (using presentation component 412).

Figure 17:
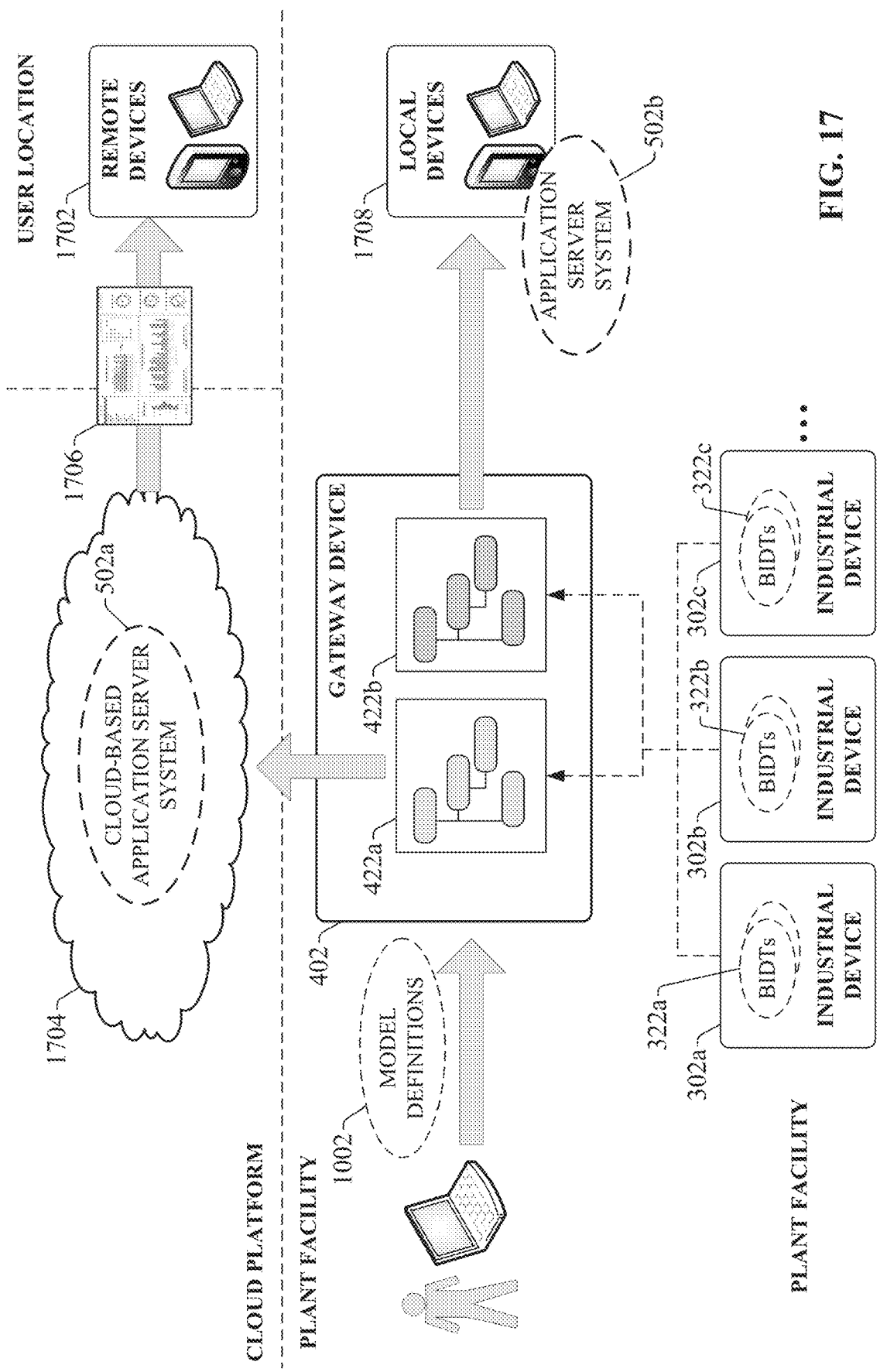
FIG. 17 is a diagram depicting a gateway device on which is defined a first asset model for delivery to a cloud-based application server system, and a second asset model for presentation of BIDT data to local on-premise client devices.

In addition to allowing creation of different asset models 422 that conform to respective presentations of BIDT data suitable for different types of viewers (e.g., operator, OEM, engineer, etc.), some embodiments can also allow different asset models 422 to be defined on a given gateway device 402 that are customized to respective different destination platforms. FIG. 17 is a diagram depicting a gateway device 402 on which is defined a first asset model 422a for delivery to a cloud-based application server system 502, and a second asset model 422b for presentation of BIDT data to local on-premise client devices 1702.

In this example, both asset models 422a and 422b are used to group and contextualize data from BIDTs 322a-322c defined on industrial devices 302a-302c. Asset model 422a is configured for delivery to cloud-based application server system 502a, which executes on a cloud platform 1704 having a remote communication channel to gateway device 402. Cloud-based application server system 502a performs functions similar to the application server systems described above; e.g., receiving asset model 422a and associated BIDT data and metadata from gateway device 402, integrating the asset model 422a into a larger plant or enterprise model (which may comprise asset models from multiple geographically diverse gateway devices 402), and presenting data presentations 1706 conforming to the aggregated plant model to authorized remote client devices 1702 having access to the cloud system serves.

Asset model 422b is configured for delivery to local devices 1708 (e.g., local client devices having integrated application server systems for generation of BIDT data presentations, or a local server device that executes an application server system that serves BIDT data presentations to multiple client devices). Each model 422a and 422b can have associated destination metadata defining the application server systems (which may include either or both of remote and local systems) to which the model is exposed. The gateway device 402 will expose and/or deliver each model 422a and 422b to the application server system (e.g., application server system 502a or 502b) defined by the metadata.

Figure 18:
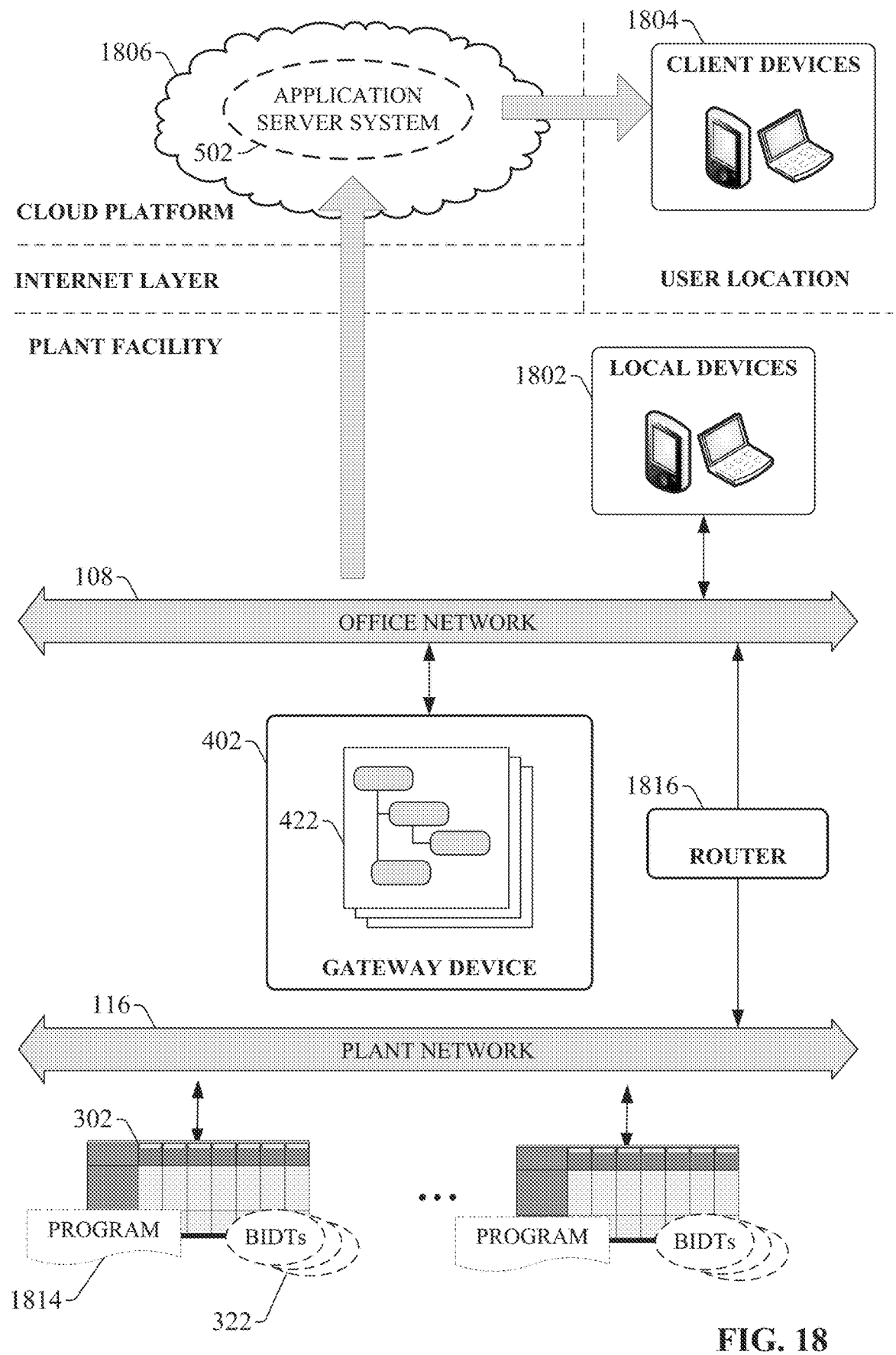
FIG. 18 is a diagram illustrating an example network architecture that includes industrial devices, a gateway device, and a cloud-based application server system.

FIG. 18 is a diagram illustrating an example network architecture that includes industrial devices 302, a gateway device 402, and a cloud-based application server system 502. In this example, industrial devices 302 are industrial controllers that each execute a control program 1814, where a number of BIDTs 322 have been configured on each controller. The industrial devices 302 are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, gateway device 402 resides on a separate office network 108 that is connected to the plant network 116 (e.g., through a router 1816 or other network infrastructure device). However, the gateway device 402 can also be installed directly on the plant network 116 in other implementations, or may connect to each industrial device 302 over a separate wired or wireless connection.

As described in previous examples, gateway device 402 can be configured with one or more asset models 422 that define groupings of BIDTs 322 within a user-defined hierarchical representation of a plant, a production area, and/or an industrial asset. The BIDT publishing component 310 of the industrial devices 302 expose the BIDTs 322 to the gateway device 402 over a communication channel that traverses the plant network 116 and the office network 108 (that is, the BIDT publishing component 310 renders the BIDTs 322 communicatively accessible to the discovery component 406 of the gateway device 402).

In this example, application server system 502 is a cloud-based system that resides on a cloud platform 1806 and executes as a cloud-based service that is accessible to authorized remote client devices 1804 as well as the gateway device 402. Cloud platform 1806 can be any infrastructure that allows shared computing services (such as application server system 502) to be accessed and utilized by cloud-capable devices. Cloud platform 1806 can be a public cloud accessible via the Internet by devices 1804 having Internet connectivity and appropriate authorizations to utilize the application server system 502. In some scenarios, cloud platform 1806 can be provided by a cloud provider as a platform-as-a-service (PaaS), and the application server system 502 can reside and execute on the cloud platform 1806 as a cloud-based service. In some such configurations, access to the cloud platform 1806 and associated application server system 502 can be provided to customers as a subscription service by an owner of the application server system 502. Alternatively, cloud platform 1806 can be a private cloud operated internally by the industrial enterprise (the owner of the plant facility). An example private cloud platform can comprise a set of servers hosting the application server system 502 and residing on a corporate network protected by a firewall.

If cloud platform 1806 is a web-based cloud, the application server interface component 410 of the gateway device 402 may interact with the application server system 502 via a secure Internet connection. In some embodiments, gateway device 402 can also be embodied as an integrated component of a network infrastructure device, such as a network switch, router, or hub. In such embodiments, the network infrastructure device performs the network connectivity functions of a network switch, hub, or router, as well as the functions of the gateway device 402 as described above.

Figure 19:
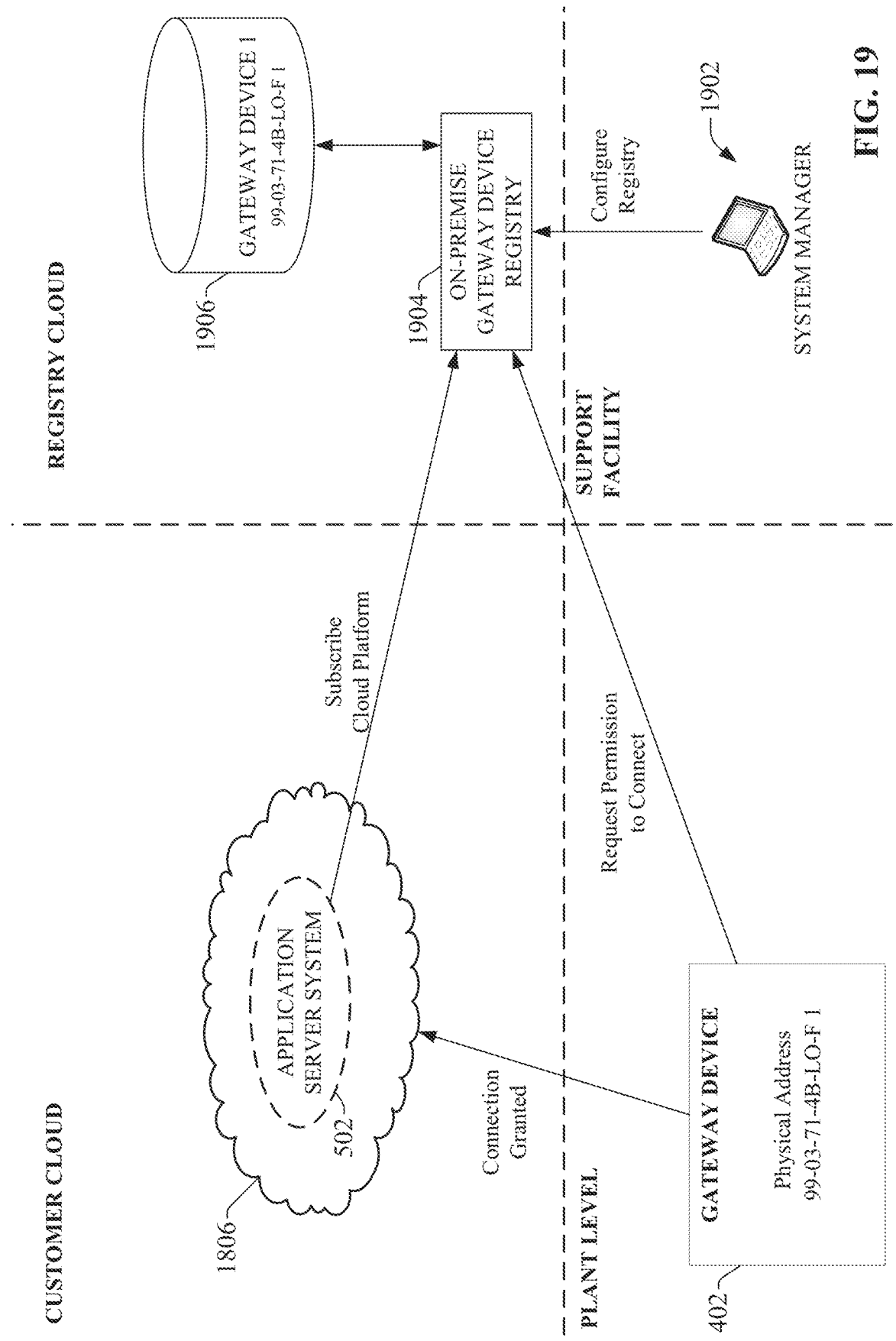
FIG. 19 is a block diagram of an example architecture that utilizes a gateway device registry to manage agent communication to a customer's cloud platform.

In one or more embodiments in which application server system 502 executes on a cloud platform 1806, communication channels between the application server system 502 on the cloud platform 1806 and the gateway device 402 can be managed by a gateway device registry that executes on the cloud platform. FIG. 19 is a block diagram of an example architecture that utilizes a gateway device registry to manage gateway communication to a customer's cloud platform 1806. In this example, an on-premise gateway device registry 1904 resides on the same cloud space as the customer cloud platform 1806, but on a separate registry cloud. The registry cloud and the gateway device registry 1904 may be managed by a service provider that offers the customer use of the customer cloud platform as a PaaS (platform as a service). The gateway device registry 1904 can enforce secure access to the customer cloud platform 1806 and ensure that the customer's collected data in the cloud platform 1806 is only accessed by authenticated devices and users. When a new customer cloud platform is established as part of a PaaS agreement, the new customer cloud platform can be subscribed to the gateway device registry 1904 so that gateway device communication with the new cloud platform can be regulated by the registry.

Gateway device 402 may be one of several gateway devices 402 distributed throughout the customer's industrial enterprise. In the example depicted in FIG. 19, gateway device 402 is identified as Gateway Device 1 to distinguish the gateway device 402 from other on-premise gateway devices. Gateway device 402 may have a physical address (e.g., a MAC address or other physical address) that uniquely identifies the gateway device 402. Gateway device registry 1904 stores a record of gateway device 402 in association with the physical address (99-03-71-4B-LO-F 1 in the present example), so that Gateway Device 1 and the physical hardware platform of the gateway device 402 executes are logically linked. This association between Gateway Device 1 and the physical address of the hardware platform of gateway device 402 may be entered into the gateway device registry 1904 by a system manager 1902 at a support facility associated with the cloud service provider. System manager 1902 may also enter other configuration parameters that will be used by the gateway device registry 1904 to manage secure connections to the customer's cloud platform 1806. Configuration information for managing the gateway device's connectivity to the cloud platform 1806 can be maintained in registry storage 1906 on the registry cloud.

When gateway device 402 has BIDT data available to send to the application server system 502, application server interface component 410 of gateway device 402 can send a request to gateway device registry 1904 for permission to create a cloud connector port that will serve as a communication channel between the gateway device 402 and the cloud platform 1806. The request can include, for example, an identification of Gateway Device 1, the physical address of gateway device 402, and an identification of the particular customer-specific cloud platform 1806 to which the connection is requested. The gateway device registry 1904 will grant or deny a certificate to the gateway device 402 for establishing the channel based on information provided in the request. For example, the gateway device registry 1904 may reference registry storage 1906 to confirm that the physical address of gateway device 402 from which the request was received is associated with the particular gateway device (Gateway Device 1) requesting the channel By confirming that the connection request for Gateway Device 1 has been received from the previously registered gateway device 404, the gateway device registry ensures that Gateway Device 1 cannot be used to establish connectivity to the cloud platform 1806 if improperly moved, or if the gateway device installation is copied to another physical hardware platform. If the gateway device configuration is moved from gateway device 402 to a different computing device without registering the new device with gateway device registry 1904, the registry will deny any communication requests originating from the new device on behalf of the gateway device 402.

When the gateway device registry 1904 determines that the connection request is valid (based on information received in the request and previously registered information for Gateway Device 1 in registry storage 1906), the gateway device registry 1904 grants a certificate to the gateway device 402 permitting the gateway device to open a temporary communication channel to the customer cloud platform 1806. Accordingly, a cloud application programming interface (API) managed by the application server interface component 410 of gateway device 402 establishes a communication channel to the cloud platform 1806 and sends the BIDT data and associated metadata to the application server system 502 on cloud platform 1806 as described above in previous examples. In some embodiments, the cloud API assigns an expiration time to the communication channel when the channel is created. The expiration time may be defined by the service providers via cloud device registry 1904 or by the end user via user interface component 414 on the customer end. Typically, the expiration time will be set to exceed an expected duration of time required to send the BIDT data and metadata. If the gateway device 402 has completed transfer of the BIDT data to the cloud platform before the expiration time for the channel has elapsed, the channel can automatically close upon completion of the data transfer or when the expiration time has elapsed. If the gateway device 402 has not completed transfer of the BIDT data and metadata to the cloud platform by the time the expiration time has elapsed, the gateway device 402 may perform additional handshaking with the gateway device registry 1904 requesting re-enablement of the channel to allow completion of the data transfer.

The example sequence described above in connection with FIG. 19 for ensuring secure communication and access to the cloud platform 1806 by authorized registered gateway devices is only intended to be exemplary, and it is to be appreciated that any suitable protocol or architecture for establishing secure communication and BIDT data transfer between the gateway device 402 and a cloud-based application server system 502 is within the scope of one or more embodiments of this disclosure.

The basic information data types and associated services described herein can simplify creation of customized industrial data visualization presentation using an elegant, adaptable, and scalable architecture. A given industrial asset, collection of assets, or industrial application can be described in terms of customized BIDTs at the controller level. Asset models can be created that define the industrial assets in terms of user-defined groupings of these BIDTs, where multiple different asset models can be defined that are customized for respective different user roles or views. These asset models, together with data and metadata associated with this BIDTs, are used to generate graphical presentations of the asset data that are structured in accordance with the models. An application server system can render the BIDT data on these presentations using suitable graphical widgets or other graphical elements, which may include widgets that are specific to a given type of BIDT (e.g., state, rate, odometer, event, etc.). As industrial assets are added, removed, or modified, the associated asset models can be reconfigured to add, remove, modify, or re-locate nodes, and the data presentations will be updated accordingly. The BIDTs are discoverable by a gateway device that maintains the asset models, so that newly added BIDTs instantiated on an industrial controller or other industrial device can be easily integrated into the asset models and associated graphical data presentations.

Figure 20:
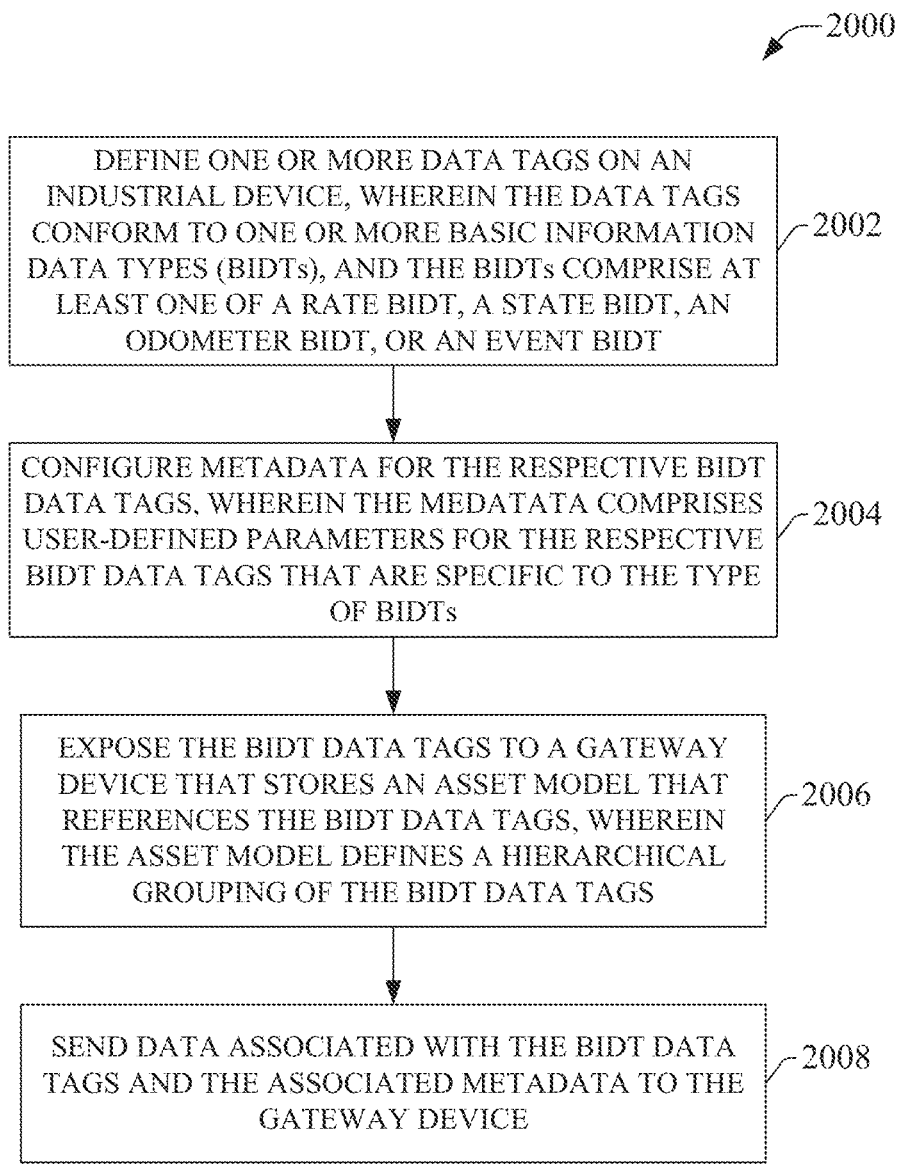
FIG. 20 is a flowchart of an example methodology for configuring and utilizing BIDT data tags in an industrial controller for delivery of industrial data to a visualization system.
Figure 21:
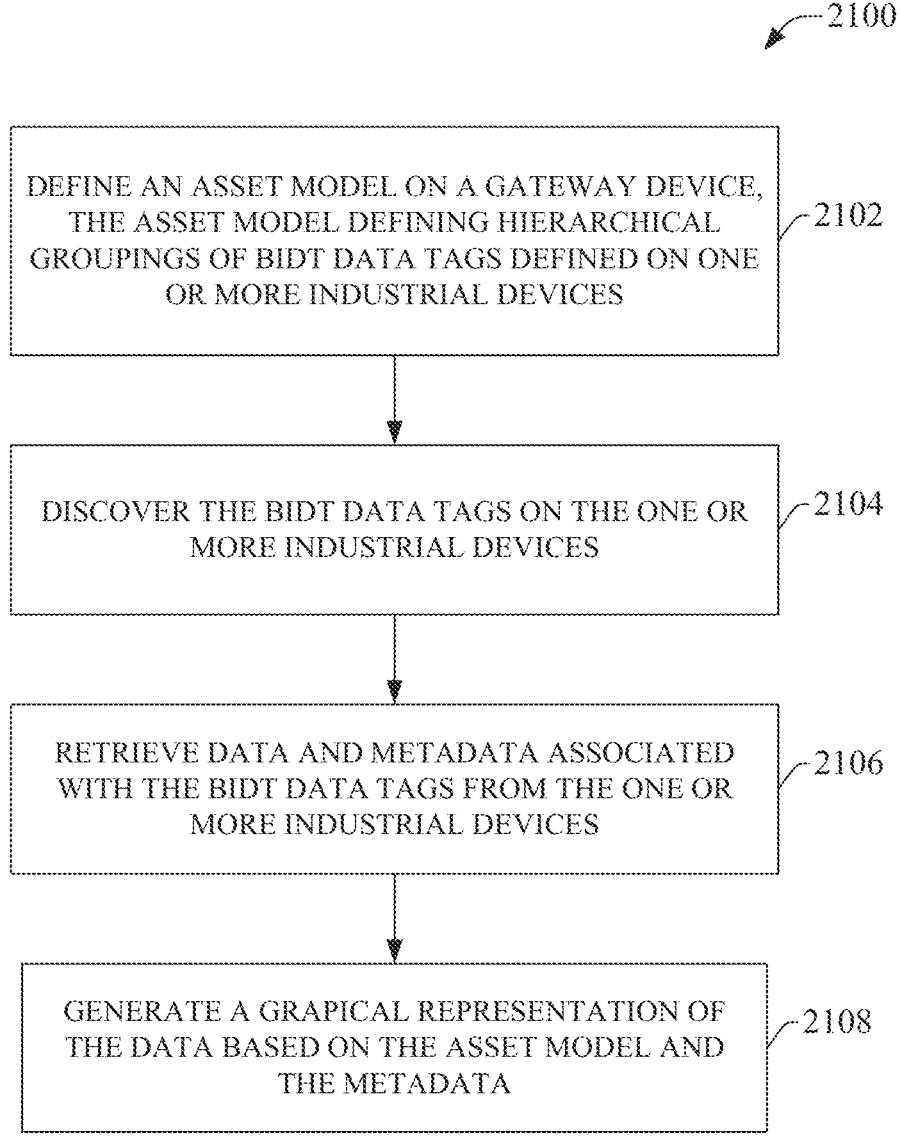
FIG. 21 is a flowchart of an example methodology for discovering and retrieving data from BIDT data tags in accordance with an asset model.
Figure 22:
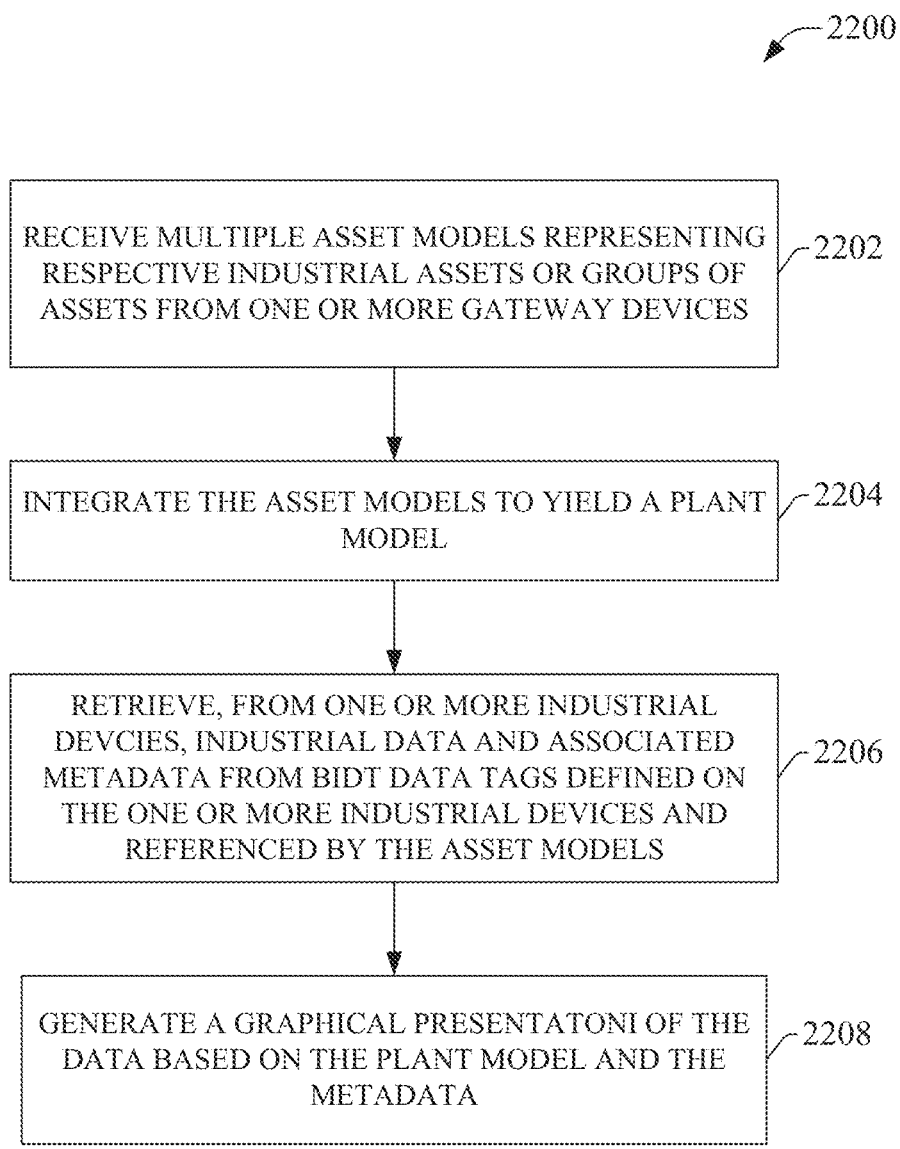
FIG. 22 is a flowchart of an example methodology for aggregating asset models and using the aggregated model to generate graphical presentations of industrial data.

FIGS. 20-22 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 20 illustrates an example methodology 2000 for configuring and utilizing BIDT data tags in an industrial controller for delivery of industrial data to a visualization system. Initially, at 2002, one or more data tags are defined on an industrial device, where the data tags conform to one or more basic information data types (BIDTs), and the BIDTs comprise at least one of a rate BIDT, a state BIDT, an odometer BIDT, or an event BIDT. Rate BIDT data tags can represent an integer or real value of a measured rate of a metric associated with the industrial asset or device. State BIDT data tags can represent a current state of an industrial asset or device (e.g., a machine, a production line, a motor drive, etc.). Odometer BIDT data tags can represent cumulative quantities associated with an industrial asset (e.g., a cumulative quantity with a rollover value, or a quantity over a defined time interval). Event BIDT data types can represent instantaneous or persistent event associated with an industrial asset (e.g., a push-button event, a sensor event, a safety device event, and alarm event, etc.).

At 2004, metadata is configured for the respective BIDT tags defined at step 2002. The metadata comprises user-defined parameters for the respective BIDT data tags, where the user-defined parameters are specific to the type of each BIDT data tag. For example, user-configurable metadata associated with a Rate BIDT data tag can include, but is not limited to, definitions of maximum and minimum values for the corresponding rate value, identities one or more other data tags or input addresses whose values are aggregated (e.g., summed, averaged, integrated, etc.) to yield the rate value, units of measure associated with the rate value, or other such metadata. Metadata for a state BIDT data tag can include, but is not limited to, definitions of the available states of an industrial asset to which the data tag is assigned, identities of one or more other data tags whose values determine the state, or other such metadata. Metadata associated with an odometer BIDT can include, but is not limited to, identities of one or more data sources that drive the odometer value, identities of two or more data tags whose values are to be aggregated or summed to yield the odometer value, units of measure associated with the odometer value (e.g., a product count, megawatt-hours consumed, etc.), or other such metadata. Metadata associated with an event BIDT data tag can include, but is not limited to, identities of other data tags or device input addresses whose states, in aggregation, determine the event to be represented by the Event BIDT data tag, names of the events represented by the event BIDT data tag, or other such metadata.

At 2006, the BIDT data tags are exposed to a gateway device networked to the industrial controller, where the gateway device stores an asset model that references the BIDT data tags, and the asset model defines a hierarchical grouping of the BIDT data tags. The asset model defined on the gateway device can correspond to a desired hierarchical organization of industrial asset or application data that can be used to generate customized graphical presentations of the asset data. At 2008, data associated with the BIDT data tags and the metadata defined for the BIDT data tags are sent to the gateway device, where the data and metadata are used to generate a graphical presentation of the BIDT data in accordance with the asset model.

FIG. 21 illustrates an example methodology 2100 for discovering and retrieving data from BIDT data tags in accordance with an asset model. Initially, at 2102, an asset model is defined on a gateway device, where the asset model defines hierarchical groupings of BIDT data tags defined on one or more industrial devices. The asset model can define a hierarchical arrangement of plant elements—e.g., plant facilities, production areas or lines, industrial assets, industrial equipment or devices that make up an industrial asset, etc.—and map selected BIDT data tags to respective elements of the hierarchy.

At 2104, the BIDT tags referenced by the asset model defined at step 2102 are discovered on the one or more industrial device by the gateway device. This can involve discovering the BIDT data tags over a network (e.g., a wired and/or wireless plant network, a public network such as the internet, etc.). At 2106, data from the BIDT data tags is retrieved by the gateway device from the one or more industrial devices, together with metadata associated with the BIDT data tags. At 2108, a graphical representation of the data retrieved at step 2106 is generated based on the asset model and the BIDT metadata. In some embodiments, the presentation can include a browsable navigation menu having a hierarchical structure similar to that defined by the asset model, where selecting of an element from the hierarchical navigation menu (e.g., a production line, an asset, an item of equipment, an industrial device, etc.) invokes and arranges one or more graphical widgets or other graphical elements for display of BIDT data associated with the selected element.

FIG. 22 illustrates an example methodology 2200 for aggregating asset models and using the aggregated model to generate graphical presentations of industrial data. Initially, at 2202, multiple asset models representing respective industrial assets or groups of assets are received from one or more gateway devices. As in previous examples, the asset models define groupings of BIDT data tags within hierarchical organizations of plant elements.

At 2204, the asset models are integrated (e.g., at an application server system) to yield a plant model, which defines a hierarchical plant or enterprise structure comprising multiple industrial assets. At 2206, industrial data and associated metadata is retrieved from BIDT tags defined on one or more industrial devices, where the BIDT tags from which the data is retrieved are referenced by the asset models that make up the plant model. In some embodiments, the BIDT data and metadata can be received from the gateway devices from which the asset models were received. At 2208, a graphical presentation of the data retrieved at step 2206 is generated based on the plant model and the metadata. The graphical presentation can organize the data in accordance with the hierarchical structure defined by the plant model.

Figure 23:
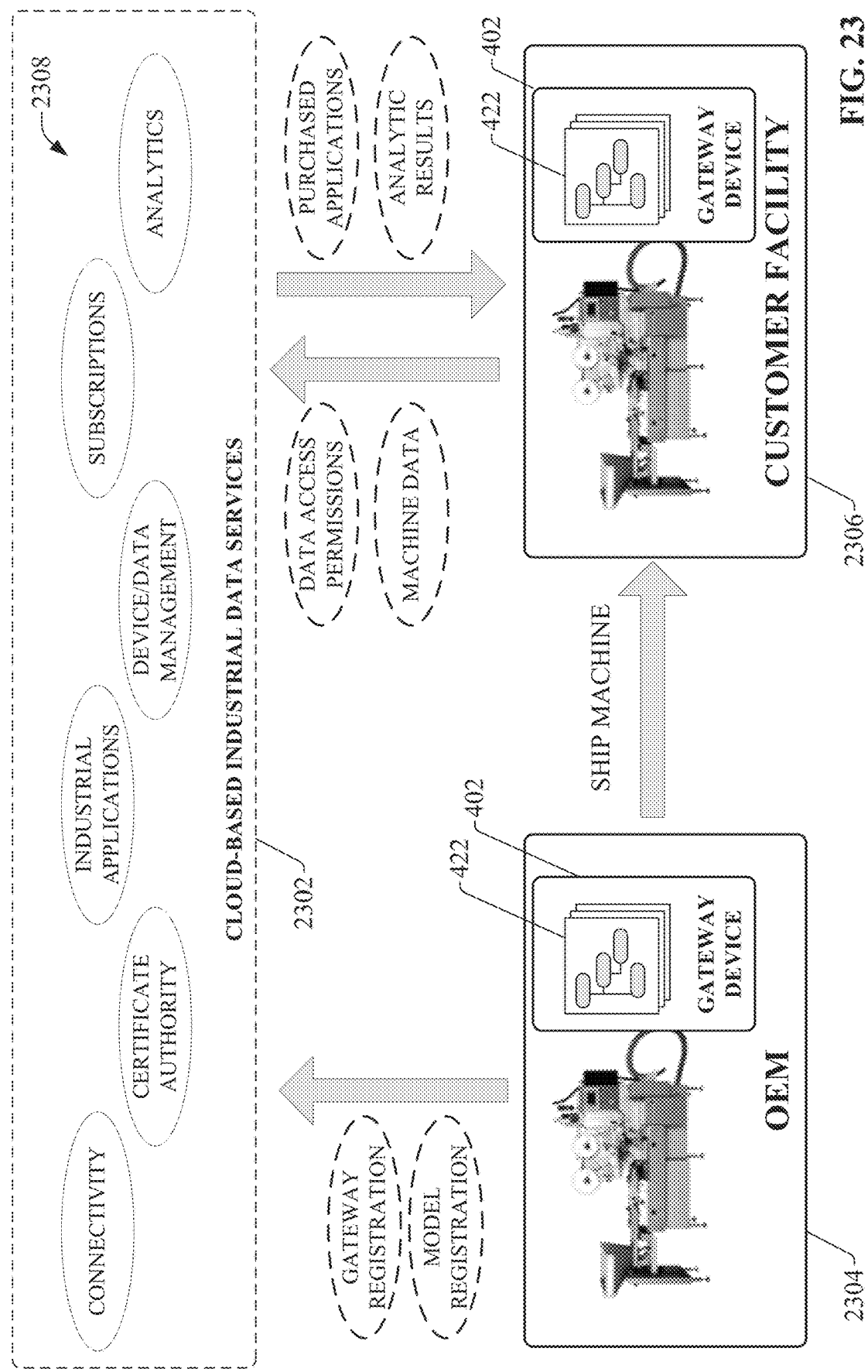
FIG. 23 is a diagram illustrating generalized data flows and services offered by a cloud-based industrial data services (IDS) platform.

The capabilities offered by industrial devices 302 that support BIDTs 322 (smart tags), together with those offered by gateway devices 402 that support creation of asset models 422 that reference these BIDTs 322, can serve as the basis for a cloud-based industrial data services (IDS) architecture. FIG. 23 is a diagram illustrating generalized data flows and services offered by such a cloud-based IDS platform 2302 according to one or more embodiments. In general, the IDS platform 2302 can leverage the BIDTs 322, asset models 422, and underlying industrial data described above to facilitate secure transaction and exchange of contextualized factory data between different parties (e.g., OEMs 2304 and end users at a customer facility 2306, as shown in the example depicted in FIG. 23) as part of a combined technology and commerce platform. The IDS platform 2302 can support a set of services 2308 that connect providers of smart industrial devices 302 (e.g., OEMs 2304) and providers of value-added analytics to plant floor and business systems owned by the end users of these devices 302 (e.g., users at customer facility 2306).

To these and other ends, the IDS platform 2302 can allow gateway devices 402 and their associated asset models 422 to be registered with the IDS platform 2302 in association with corresponding asset providers and end users. In an example scenario, an OEM 2304 may fabricate an industrial machine to be installed and operated at a customer facility 2306. As part of the machine's manufacture, an asset model 422 representing the machine can be created and stored on a gateway device 402 to be supplied with the machine. As described in previous examples, the asset model 422 can reference BIDTs 322 or other types of smart tags defined on industrial devices 302 that make up the machine. The asset model 422 can represent the machine in terms of hierarchical arrangements of devices (e.g., controllers, drives, sensors, safety devices, etc.) that make up the machine and/or a hierarchical organization of data produced by the devices 302 that make up the machine. Similar to previous examples, gateway device 402 may store multiple different asset models 422 that are customized to suit the information requirements of various types of information consumers (e.g., line operators, engineers, plant managers, etc.).

With the gateway device 402 and associated asset models 422 registered on the IDS platform 2302, the machine and associated gateway device 402 is shipped to the customer facility 2306, where the machine owners can use digital credentials included on, or otherwise provided with, the gateway device 402 to access the registered asset model 422, selectively enable applications and data services made available by the IDS platform 2302, control access to selected items of machine data by outside parties, or take advantage of other services supported by the IDS platform 2302. These services can be customized for the end user's particular machine by virtue of the machine-specific or system-specific asset models 422 associated with the machine. In some embodiments, access to customer-specific asset models 422 and associated data services can be offered to the end user on a subscription basis.

The services 2308 supported by IDS platform 2302 can also include authentication services that uniquely identify underlying industrial data generated by the machine and sent to the platform 2302 for distribution to relevant parties, verify the source of the data, allow access rights to be assigned for selected items of data, etc. IDS platform 2302 can also facilitate connection of smart industrial devices 302 to cloud-based on-premises business or analytic systems in a secure and transparent manner. These and other services offered by embodiments of the IDS platform 2302 are described in more detail below.

Figure 24:
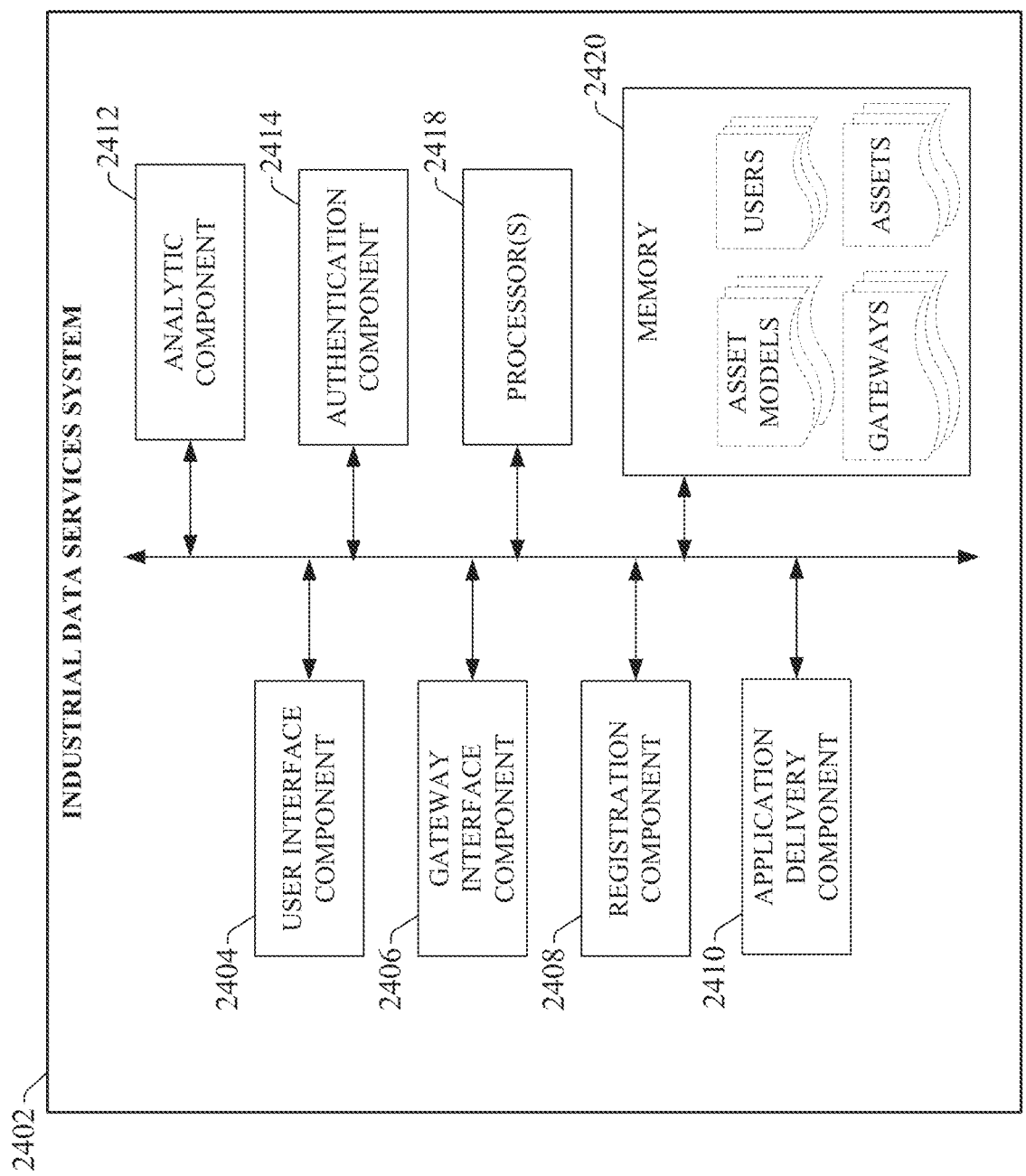
FIG. 24 is a block diagram of an example IDS system that can reside and execute on a cloud platform and provide brokered data and services connectivity between industrial asset owners and outside parties.

FIG. 24 is a block diagram of an example industrial data services system 2402 that can reside and execute on a cloud platform and provide brokered data and services connectivity between industrial asset owners and outside parties (e.g., OEMs, vendors, partners, etc.) according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial data services (IDS) system 2402 can include a user interface component 2404, a gateway interface component 2406, a registration component 2408, an application delivery component 2410, an analytic component 2412, an authentication component 2414, one or more processors 2418, and memory 2420. In various embodiments, one or more of the user interface component 2404, gateway interface component 2406, registration component 2408, application delivery component 2410, analytic component 2412, authentication component 2414, the one or more processors 2418, and memory 2420 can be electrically and/or communicatively coupled to one another to perform one or more of the functions of the industrial data services system 2402. In some embodiments, components 2404, 2406, 2408, 2410, 2412, and 2414 can comprise software instructions stored on memory 2420 and executed by processor(s) 2418. IDS system 2402 may also interact with other hardware and/or software components not depicted in FIG. 24. For example, processor(s) 2418 may interact with one or more external user interface devices, such as a keyboard, a mouse, a display monitor, a touchscreen, or other such interface devices.

User interface component 2404 can be configured to receive user input and to render output to the user in any suitable format (e.g., visual, audio, tactile, etc.). In some embodiments, user interface component 2404 can be configured to communicatively interface with a client device (e.g., a laptop computer, tablet computer, smart phone, etc.) that communicatively interfaces with the IDS system 2302 via a connection to the cloud platform on which the system 2402 executes. The user interface component 2404 can then receive user input data and render output data via the client device. In other embodiments, user interface component 2404 can be configured to generate and serve suitable graphical interface screens to a client device, and exchange data via these graphical interface screens.

Gateway interface component 2406 can be configured to exchange data with one or more gateway devices 402 at one or more plant facilities over a wired or wireless network (similar to gateway interface component 504). The gateway interface component 2406 can exchange data with the gateway devices 402 over a combination of a public network (e.g., an Internet layer) and a private network (e.g., a plant or office network at the industrial facility).

Registration component 2408 can be configured to manage registration of gateway devices, asset models, users (or user entities), and industrial assets (e.g., machines, industrial devices, automation systems, etc.) in memory 2420. Application delivery component 2410 can be configured to deliver or assign a selected data services application to a user or user entity. Analytic component 2412 can be configured to perform analytics on selected sets of industrial data (e.g., BIDT data) received from a gateway device 402 in accordance with one or more data services applications selected by an owner of the gateway device 402 and associated industrial assets. Authentication component 2414 can be configured to perform data authentication and validation services on data received from the gateway devices 402.

The one or more processors 2418 can perform one or more of the functions described herein with reference to the systems and/or methods disclosed. Memory 2420 can be a computer-readable storage medium storing computer-executable instructions and/or information for performing the functions described herein with reference to the systems and/or methods disclosed.

Figure 25:
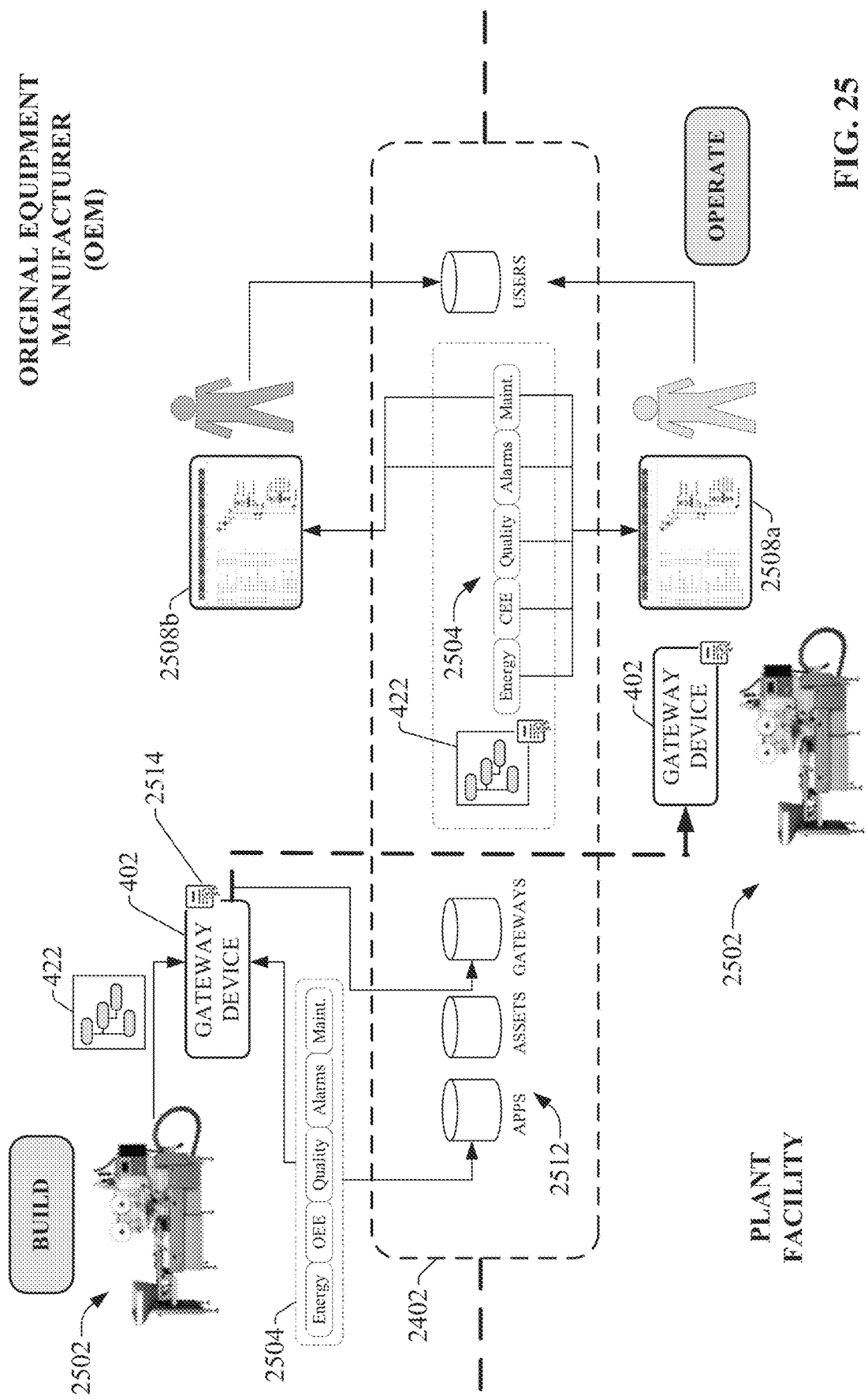
FIG. 25 is a diagram illustrating example high-level data flows associated with an IDS platform.

FIG. 25 is a diagram illustrating example high-level data flows associated with the IDS platform 2402 according to one or more embodiments. In general, the IDS platform 2402 creates recognizable, discoverable industrial data as part of an industrial asset (e.g., a machine 2502), and provides a layered services architecture between data producers and consumers. In an example scenario in which an OEM builds an industrial machine 2502 for an end user at a plant facility, the OEM may include a gateway device 402—provisioned with one or more asset models 422 for the machine 2502—as a deliverable with the machine. This gateway device 402 can serve as an intelligent interface to the IDS system 2402 and its associated brokered data services. Gateway device 402 may be a dedicated interface device included with the machine 2502, or alternatively may be another type of industrial device—e.g., an industrial controller, a motor drive, a safety relay, an HMI, etc.—on which is embedded a logical gateway construct that allows the industrial device to also serve as a data modeling and IDS gateway device. As will be described below, the cloud-based IDS system 2402 serves as an architecture through which the OEM can offer their own applications and data services to their end user customers.

In this example, it is assumed that machine 2502 comprises industrial devices 302—e.g., industrial controllers, drives, telemetry devices, etc.—on which BIDTs 322 or other types of data tags are defined. As discussed above, these BIDTs 322 serve as smart tags for storing industrial data and associated metadata generated by the devices 302. As part of the machine building process, the OEM can leverage these BIDTs 322 to create one or more asset models 422 for the machine 2502 and store these asset models 422 on the gateway device 402. In some implementations, the OEM can create an asset model 422 for the machine 2502 using the process described above in connection with FIG. 10, whereby a gateway configuration application 1006 is used to define an asset structure or model of the industrial machine 2502 being built. The asset model 422 defines hierarchical relationships between elements of the machine (e.g., industrial devices, workstations, production lines, etc.) and assigns corresponding BIDT data tags to these respective elements (see, e.g., the example asset model configurations illustrated in FIGS. 11 and 12). When creating asset model 422, the OEM developer can use the gateway configuration application 1006 to define the hierarchy of machine or process components, browse the machine's data sources (e.g., industrial devices such as industrial controllers, motor drives, etc.) for relevant data tags such as BIDTs or smart tags, and associate selected data tags with corresponding components of the hierarchical model 422. In some instances, some industrial devices that make up the machine 2502 may have stored thereon partial models representing a portion of an overall industrial process monitored and/or controlled by those devices. These device-level models can also be linked to the larger asset model 422 on the gateway device 402.

Figure 26:
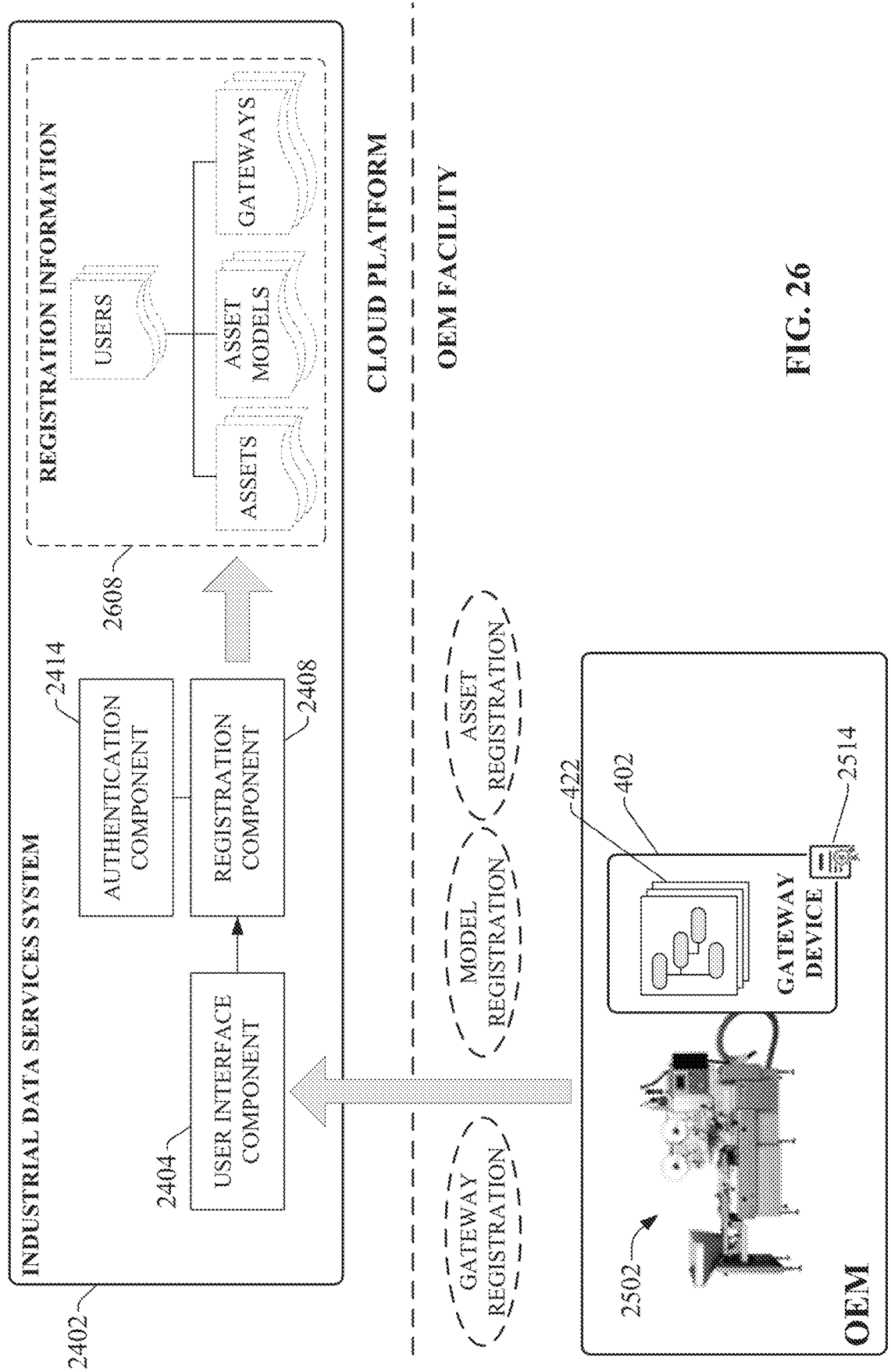
FIG. 26 is a diagram illustrating registration of an industrial asset with an IDS system.

Before shipping the machine 2502 to the plant facility at which the machine 2502 will be installed and operated, the OEM can access the cloud-based IDS system 2402 to register the machine 2502, the gateway device 402, and its associated asset model 422. FIG. 26 is a diagram illustrating registration of an industrial asset with the IDS system 2402. In some embodiments, the OEM can interface with the IDS system 2402 using a client device that remotely connects to the user interface component 2404 via the cloud platform on which the IDS system 2402 executes as set of services. Alternatively, registration information can be submitted to the IDS system 2402 by the gateway device 402 itself. The IDS system 2402 can execute on a cloud platform similar to cloud platform 1806 described above and can be made accessible to authorized entities (e.g., OEMs, plant personnel, vendors, etc.). In some implementations, access to the cloud platform and the IDS system 2402 can be provided to customers as a subscription service by an owner of the IDS system 2402.

Once connected to the IDS system 2402, the OEM's client device or the gateway device 402 itself can submit registration information for the machine 2502 (asset registration) and its associated gateway device and asset model 422. The registration component 2408 of the IDS system 2402 can store this information as registration information 2608 (e.g., on memory 2420). Additionally, registration component 2408 can allow user accounts to be defined and registered as part of registration information 2608. These user accounts can uniquely identify users or entities that are permitted to interact with the IDS system 2402, including but not limited to OEMs, end user customers, plant facilities, etc. The asset, gateway, and model registration information for the machine 2502 can then be registered in association with relevant user accounts. For example, the registration information for the machine 2502 can be stored by the IDS system 2402 in association with user registration information for the OEM that built the machine 2502 and the end user entity that will be operating the machine 2502. IDS system 2402 can use these associations to limit access to the machine's data to only those entities who are authorized to access data services relating to the machine 2502.

As part of this registration process, the IDS system's authentication component 2414 can generate authentication credential information for the gateway device 402 and its asset model 422. In some embodiments, this can involve creation of a digital certificate 2514 that includes a globally unique identifier (GUID) that uniquely identifies the gateway device 402 or its associated asset model 422. In this regard, the authentication component 2414 serves as a trusted certificate authority that verifies authenticity of data sources, asset models 422, and their underlying industrial data. For example, in some embodiments, authentication component 2414 can be configured to use a proprietary algorithm to create public and private keys that can be used to uniquely identify gateway devices 402 and information models 422. Other protocols for ensuring authenticity and security of devices and their corresponding data models are also within the scope of one or more embodiments.

According to an example registration process, as part of the procedure for registering the gateway device 402 and its corresponding model 422, the OEM can request and receive, from the authentication component 2414, a unique digital certificate 2514 to be securely stored on the gateway device 402. This digital certificate 2514 can both verify the authenticity of data that is sourced from the gateway device 402 as well as protect the gateway's underlying industrial data by only permitting parties having corresponding digital credentials (e.g. public keys) to access data associated with the asset model 422. In some embodiments, the OEM (or ultimately the end user of the machine) can assign different types of access permissions to respective different nodes of the asset model 422, allowing access to the underlying industrial data to be controlled in a highly granular manner.

Authentication component 2414 can also store, as part of the registration information 2608, information that uniquely identifies the combination of gateway device 402 and its corresponding asset model 422. This information may include, for example, information read from the gateway device 402 that uniquely identifies the gateway device 402 (e.g., the device's media access control (MAC) address) as well as properties of the asset model 422 (e.g., one or more fully qualified names, or FQNs, of the model 422). This additional registration information can also include properties of the entity (e.g., the OEM) that provided the gateway device 402. This collected information can be used by the IDS system 2402 to uniquely identify, and verify the authenticity of, the gateway device 402 and its asset model 422.

Returning briefly to FIG. 25, the OEM may also choose to offer customized model-based applications 2504 that can operate in conjunction with the asset model 422 and underlying industrial data generated by the machine 2502 to provide useful insights into the machine's operation. For example, the OEM may develop applications 2504 that process selected sets of BIDT data and associated metadata generated by the machine 2502 to generate reports on the machine's energy consumption, efficiency, part or product quality, overall equipment effectiveness (OEE), or other properties of the machine's operation or status. Some available applications 2504 may also be configured to monitor and report alarm conditions for the machine 2502, or to monitor the machine's data for potential maintenance issues and generate reports notifying of these issues. These applications 2504 can also be registered on the IDS system 2402 and made available for purchase and use by the end user customer. The applications 2504 may also be made available on a subscription basis for a recurring periodic cost.

Figure 27:
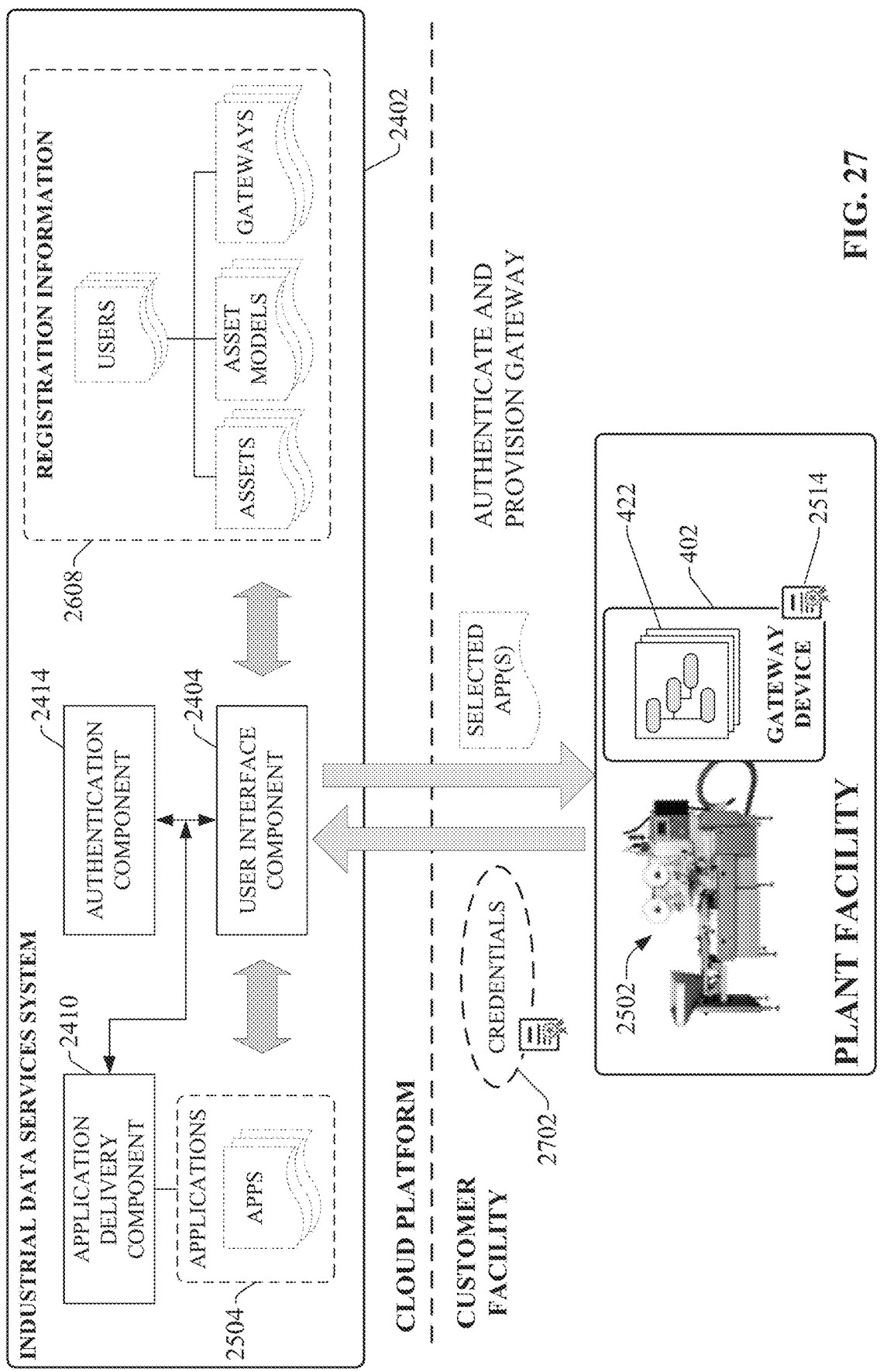
FIG. 27 is a diagram illustrating authentication and provisioning of a gateway device at an end user's plant facility.

Upon completion of the machine build and registration of the machine's gateway device 402, asset models 422, and any applications 2504 offered by the OEM, the machine 2502 can then be shipped to the OEM's customer at an industrial facility for installation and operation. If desired, the end user can then interface the gateway device 402 with the IDS system 2402 to authenticate and provision the gateway device 402. FIG. 27 is a diagram illustrating authentication and provisioning of the gateway device 402 at the end user's plant facility. As part of the machine installation process, gateway device 402 can be connected to the internet; e.g., via the local networks in the plant facility (e.g., plant network 116 and/or office network 108, as depicted in FIG. 18). Once connected, the gateway device 402 can automatically connect to the cloud platform on which the IDS system 2402 executes and begin exchanging data with the system 2402. Before allowing data exchange with the gateway device 402, the system's authentication component 2414 can first verify the authenticity of the gateway device 402 and only permit the gateway device 402 to connect to the system 2402 if the gateway device 402 is determined to be valid. To this end, the digital certificate 2514 installed on the gateway device 402 (or otherwise provided to the user and uniquely associated with the gateway device 402) can serve as a unique digital credential that authenticates the gateway device 402 to the IDS system 2402. The user can be granted access to the IDS system 2402 by submitting credential information 2702—which may include the digital certificate 2514—to the IDS system 2402 for verification.

In some cases, the end user may wish only to operate the machine 2502 without making use of the data services offered by the cloud-based IDS system 2402 (e.g., the OEM-specific applications 2504 or prepackaged data services offered by the IDS system 2402). In such scenarios, the user may operate the machine 2502 without connecting the gateway device 402 to the internet or the IDS system 2402, or may still permit the OEM to collect operational data from the machine 2502 by interfacing the gateway device 402 with the IDS system 2402 and sending the machine's data to the system 2402. In the latter case, the end user need not create a user account on the IDS system 2402. Instead, the industrial data generated by the machine 2502 will be logged anonymously in association with the OEM's account, where the data can be mined by the OEM collectively with data generated by other similar machines collected from other users. Alternatively, the user may choose to sign into the IDS system 2402 (using credentials associated with the end user's user account, which are defined as part of the registration information 2608) and browse applications 2504 and data services available for the machine 2502. With the machine's gateway device 402 and associated asset model 422 registered in the IDS system 2402, the IDS system 2402 can offer applications and data services that can be selectively leveraged by the user in connection with operation and maintenance of the machine 2502. In this regard, the IDS system 2402 facilitates a brokering scheme whereby the cloud-based data services platform presents data service offerings to customers and brokers secure and transparent data sharing between the end user and outside parties (including the OEM).

Once the IDS system 2402 has verified the user's access credentials, the user can access and browse the available applications 2504 via gateway device 402 (or using a client device communicatively connected to gateway device 402). To this end, an application delivery component 2410 can present information identifying a subset of available applications 2504 from which the user is permitted to select. As noted above, applications 2504 can comprise machine-specific applications developed by the OEM to provide insights into operation of a machine 2502 sold or leased to the end user. In general, applications 2504 are configured to monitor and process selected subsets of modeled and contextualized BIDT data (or other types of industrial data) provided by the gateway device 402 and generate customized reports, notifications, or visualizations relating to specific categories of machine operation. Example applications 2504 can include, for example, applications that report on the machine's historical, current, and/or predicted energy consumption; applications that calculate the machine's overall equipment effectiveness (OEE); applications that provide measures of the machine's output quality; alarm notification applications; maintenance applications that generate notifications of detected operational concerns; or other such applications.

Since the IDS system 2402 acts as a common platform that offers brokering services to many different entities (e.g., multiple OEMs, vendors, end users, etc.), the system 2402 may store applications 2504 developed by several different OEMs, including applications that are relevant only to certain types of machines or that are intended for use by certain types of end users. Accordingly, application delivery component 2410 can limit the set of applications 2504 that can be accessed by a given user based on, for example, the type of machine 2502 with which the gateway device 402 is associated, the identity of the user, the relationship between the user and the OEM (e.g., such that only applications developed by OEMs with which the user has a business relationship are accessible by the user), or other such criteria.

The application delivery component 2410 can determine the appropriate subset of available applications 2504 to be made accessible to the user based in part on the relationships defined in the registration information 2608. For example, the credential data 2702 may uniquely identify the gateway device 402 to the IDS system 2402, which can then reference the registration information 2608 to determine the asset (e.g., machine 2502) with which the gateway device 402 has been uniquely associated, the user account associated with the gateway device 402, the asset model 422 stored on the gateway device 402, etc. The application delivery component 2410 can use these relationships to determine the relevant set of applications 2504 that are to be presented to the user for selection. The user interface component 2404 can present these relevant applications via a suitable graphical interface displays rendered on the user's client device (e.g., via gateway device 402). In addition to OEM-developed applications, some embodiments of IDS system 2402 can also offer a set of global applications that are commonly applicable to different types of machines or users.

Through interaction with these interface displays, the user can select one or more of the available applications for purchase and use. In various embodiments, the application delivery component 2410 can allow the user to either purchase selected applications for a one-time charge or subscribe to the selected applications for a recurring fee (e.g., a monthly or yearly fee). When a user purchases or subscribes to an application, the application may either be downloaded to the gateway device 402 for local execution or may be registered on the IDS system 2402 in association with the gateway device 402 for execution on the cloud platform.

Figure 28:
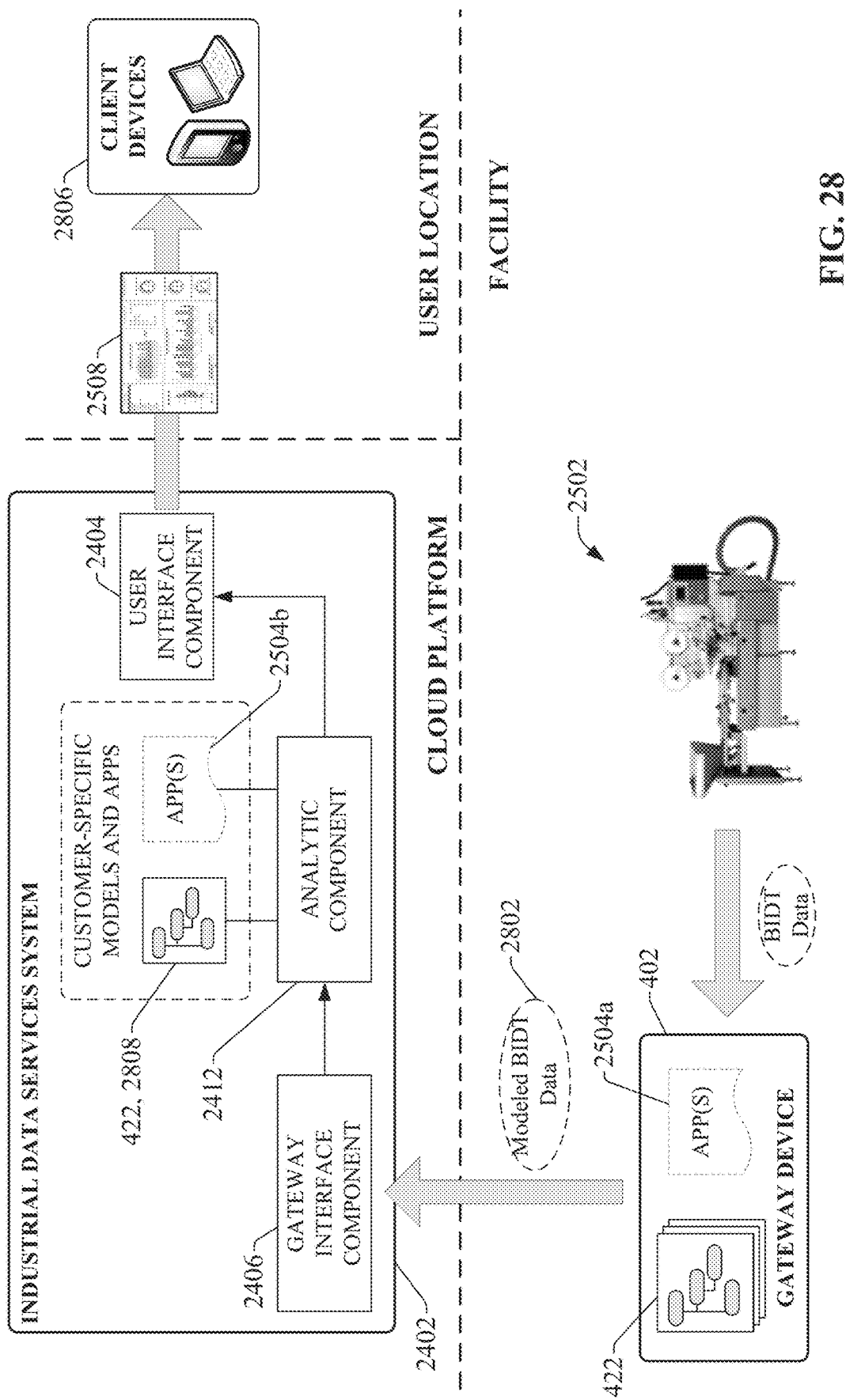
FIG. 28 is a diagram illustrating submission of modeled smart data generated by an industrial machine to an IDS system by a gateway device for processing and secure distribution.

FIG. 28 is a diagram illustrating submission of modeled smart data generated by the industrial machine 2502 to the IDS system 2402 by the gateway device 402 for processing and secure distribution. Once the gateway device 402 has been provisioned to participate in selected data services offered by the OEM via the IDS system 2402 (if desired), gateway device 2504 can begin submitting selected subsets of BIDT data 2802 generated by the machine 2502 to the IDS system 2402 (via gateway interface component 2406). Similar to the data submission process described above in connection with FIG. 13, industrial devices that make up the machine assembly can monitor and control the machine 2502 during runtime, and the BIDT publishing component 310 of each industrial device can expose the data and metadata associated with each configured BIDT 322 to the gateway device 402, rendering the BIDT data and metadata accessible and retrievable by the discovery component 406 of the gateway device 402. For each model 422 defined on gateway device 402, the model configuration component 408 of the gateway device 402 retrieves the data and metadata for each BIDT referenced by the model 422 (as specified by OEM during model development) and models the data based on the model 422 stored on the gateway device 402 to yield modeled BIDT data 2802. The modeled BIDT data 2802 is organized in accordance with the hierarchical asset models 422 stored on the gateway device 402. As described above, asset models 422 define the hierarchical organization of industrial assets that make up the machine 2502 and/or the underlying automation process carried out by the machine 2502. In addition to the data values retrieved from the BIDTs (smart tags), the modeled BIDT data 2802 also conveys relationships between the data values and other metadata relevant to the context in which the data was generated.

If a purchased application 2504 has been downloaded and installed on the gateway device 402 (as locally stored application 2504*a*), the modeled BIDT data 2802 may be further filtered, organized, or processed in accordance with the locally stored application 2504. For example, if the application 2504*a* (e.g., an energy monitoring application) requires only a selected subset of the available BIDT data to be monitored, the gateway device 402 may send only those necessary data values (corresponding to relevant nodes of the hierarchical asset model 422) in the modeled BIDT data 2802. Alternatively, in scenarios in which a purchased application 2504 is registered on the IDS system 2402 in association with the user account (as registered application 2504*b*) without being installed locally on the gateway device 402, the gateway device 402 can submit all available BIDT data referenced by the asset model 422 to the IDS system 2402, which can apply processing to selected sets of the data in accordance with the application 2504.

On the IDS system 2402, the modeled BIDT data 2802 can be processed in substantially real-time by the system's analytic component 2412 in accordance with one or more purchased applications 2504*b*, which define analytic processes to be performed on the modeled BIDT data 2802 to yield a desired insight into operation of the machine 2502 (e.g., energy consumption, alarms, maintenance issues, etc.). The user interface component 2404 can send results of these application-based analytics to authorized client devices 2806 as data presentations 2508. Client devices 2806 can be any suitable type of computing device (e.g., mobile device, laptop computer, tablet computer, wearable computer, etc.) that can communicatively connect to the IDS system 2402 via the cloud platform, and which includes display capabilities for rendering data presentations 2508.

Figure 29:
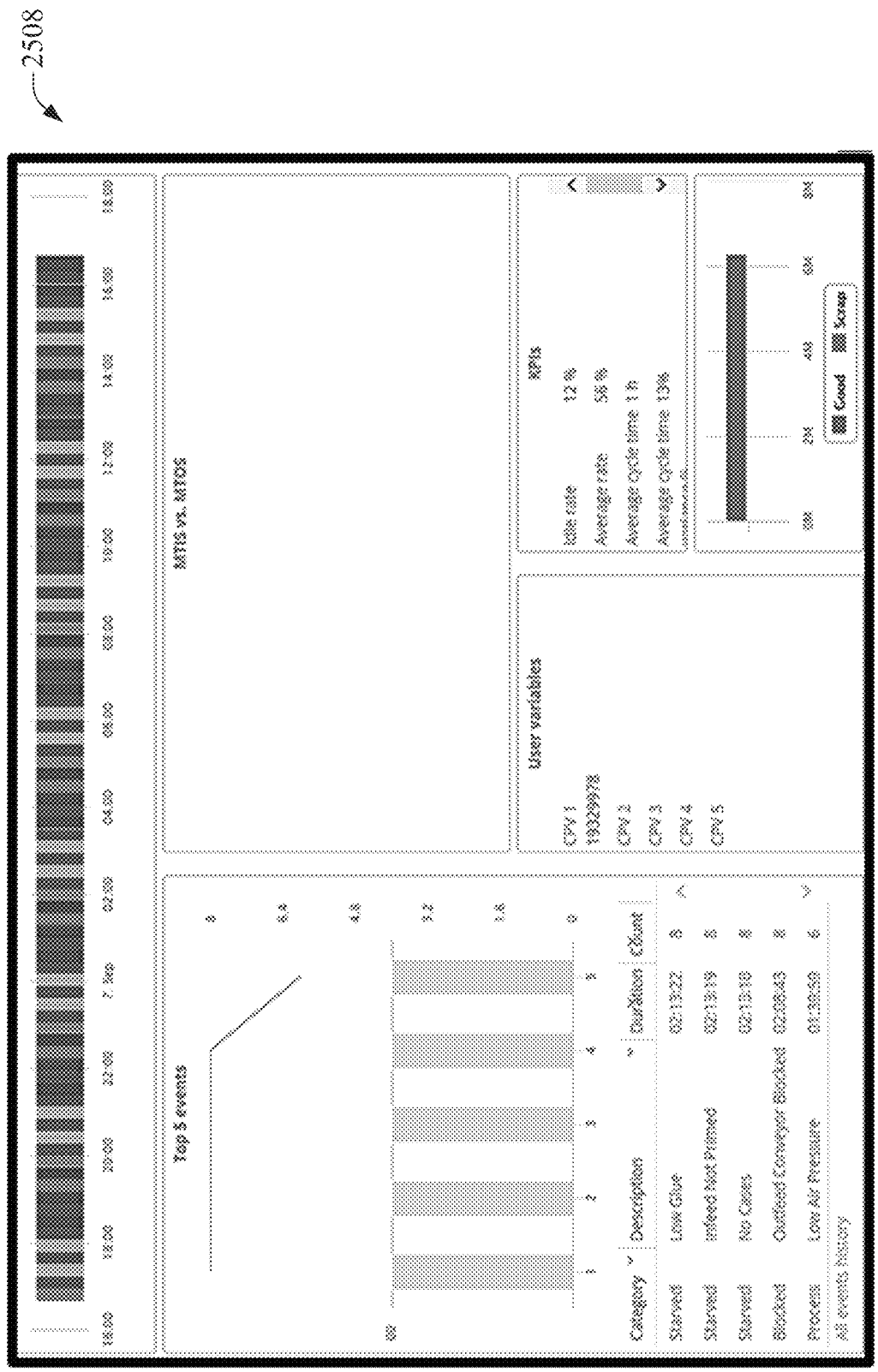
FIG. 29 is an example type of data presentation that can be generated and delivered by a user interface component of an IDS system.

Data presentations 2508 can conform to substantially any suitable format for conveying information regarding the machine's operation and status, including example formats described and depicted above (e.g., presentation 1604 depicted in FIG. 16). The format of data presentations 2508—and the information presented therein—is a function of the type of application 2504 purchased by the end user for processing the modeled BIDT data 2802. FIG. 29 is another example type of data presentation 2508 that can be generated and delivered by user interface component 2404. This example data presentation 2502 aggregates different types of information regarding the machine's current and historical operation onto a common presentation. Information that can be rendered by this example presentation includes, but is not limited to, a list of machine events (e.g., low glue, infeed not primed, outfeed conveyor blocked, etc.) including times and durations of each event, values of selected machine variables, values of the machine's key performance indicators (e.g., idle rate, average rate, average cycle time), and other such information. Information can be presented via a data presentation 2508 as either alphanumeric text or as graphical indications (e.g., bar charts, pie charts, line graphs, etc.).

Some data presentations 2508, such as those generated by maintenance applications, may be proactive such that detection of an operational or maintenance issue that may require attention by qualified personnel causes the user interface component 2404 to deliver notification information to one or more client devices 2806 associated with those personnel.

In addition to generating and delivering data presentations 2508, the IDS system 2402 can also log collected modeled BIDT data 2802—as well as results of analytics applied to the data 2802 by the analytic component 2412—on cloud-based storage in association with the appropriate registration information 2608 (e.g., the registered user account, gateway device, asset model, and/or industrial asset to which the data 2802 pertains). In connection with collection and ingestion of this customer data, the authentication component 2414 can generate and store digital certificate data in association with the stored data. This digital certificate data can verify the authenticity and sources of the stored data. These physical data storage services can vary depending on the type of storage services selected by the OEMs and end users. For example, depending on the selected data storage service, archived BIDT data 2802 or analytic results may be stored exclusively on the cloud-platform until requested for viewing, or may be stored on both cloud storage and on-premise storage at the plant facility (e.g., on the gateway device 402 or on other local storage devices networked to the gateway device 402).

The IDS system 2402 described above provides a cloud-based framework and associated services and tools that allow OEMs or other entities to register or publish their data models, data, and applications in a public or private marketplace, and to set pricing for their content. In this way, large OEMs can leverage the IDS system 2402 to create and propagate complex applications (e.g., reporting applications, dashboards, analytic applications, etc.) through a cloud-based architecture. The system 2402 also allows end users to discover and subscribe to these models, data, and applications, and can include billing services that manage billing and routing of subscription revenue between appropriate sources and destinations. IDS system 2402 can also manage the lifetimes of all currently active data service subscriptions across multiple customers, including generating notifications of pending expiration of access to data services or applications, without jeopardizing operation of the end users' industrial assets. Since the IDS system 2402 leverages the smart tags (e.g., BIDTs) and asset models described above, workflows for creating cloud-based data service applications, offering these applications to end users for sale or on a subscription basis, implementing these applications as part of a cloud-based data services offering, and sharing information between parties can be implemented using simple configuration of data and applications without the need for advanced programming on the part of OEMs or end users.

The examples described above considered a single machine 2502 having a corresponding asset model 422 stored on a gateway device 402 delivered with the machine 2502. However, in scenarios in which the end user integrates the machine 2502 into a larger industrial automation system at the plant facility, the user may wish to link the asset model 422 for the machine 2502 to other existing data models defined for other industrial assets that make up the larger automation system. This integration of a machine-specific asset model 422 into the context of a larger system model can be similar to the process described above in connection with FIG. 14 for aggregating asset models 422 into an overall plant model 522. That is, the functionality described above for aggregating separate asset models into an aggregate plant model 522—ascribed to the application server system 502 in the examples described in connection with FIG. 14—can be implemented by the IDS system 2402. To this end, the gateway device 402 and IDS system 2402 can facilitate discovery and linkage of information models, or portions of such models, across multiple logical devices to yield an aggregate system model.

Figure 30:
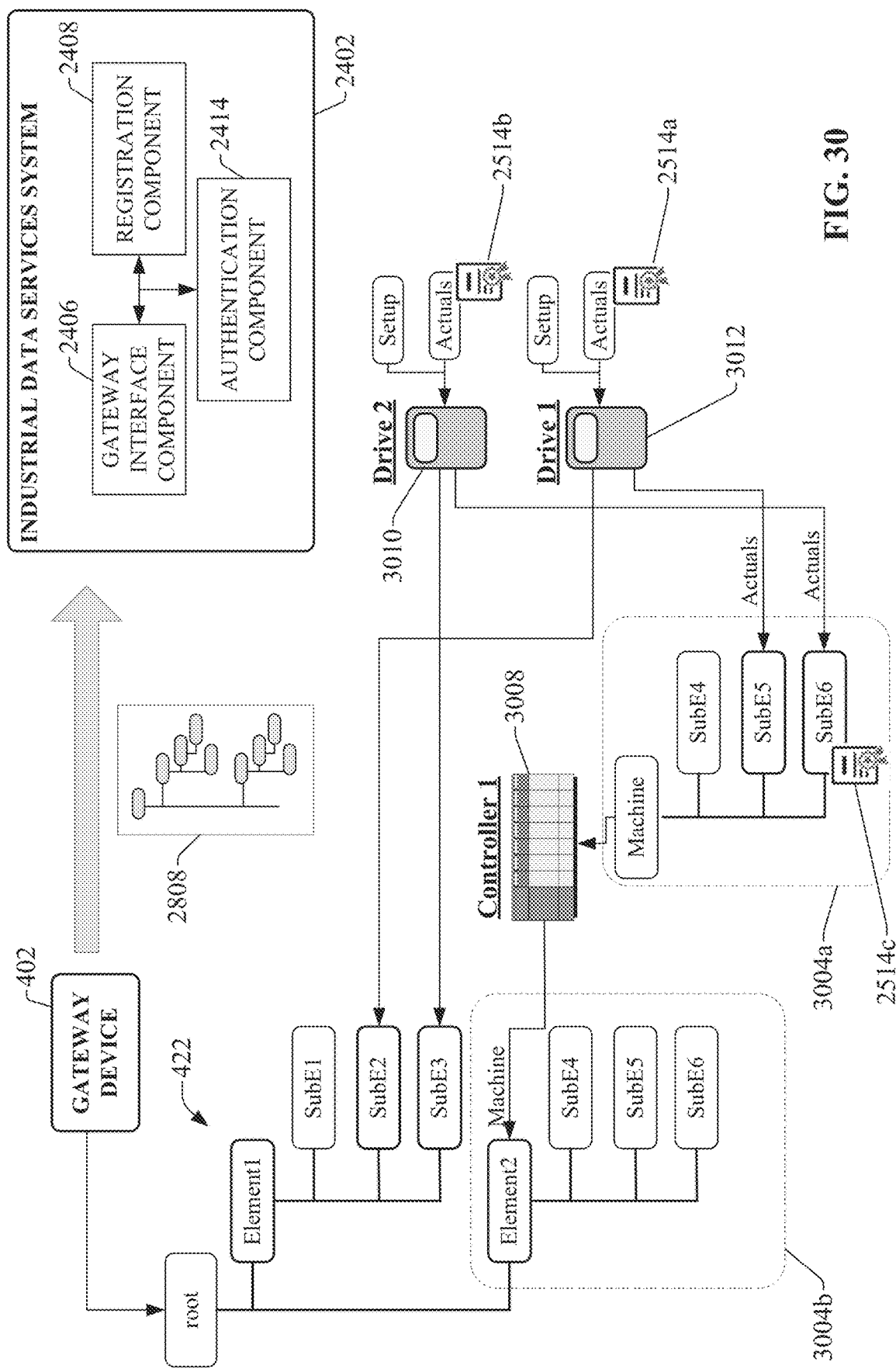
FIG. 30 is an illustration of an example aggregate system model.

FIG. 30 is an illustration of an example aggregate system model 3002. In this illustrated example, an industrial controller 3008 has a hierarchical data model 3004a stored thereon. This model 3004a represents a machine that is monitored and controlled by the industrial controller 3008 (Controller 1), and which includes two motor drives 3010 and 3012. The definition of data model 3004a stored on the industrial controller 3008 includes a reference or link to a first partial model SubE5 stored on motor drive 3012 (Drive 1) and another reference to a second partial model SubE6 stored on motor drive 3010 (Drive 2). The definitions of these links (e.g., linkage data) stored on the industrial controller 3008 can comprise, for example, an identity of the logical devices (Drive 1 and Drive 2) on which the referenced partial models reside, as well as indications of the points or nodes within model 3004a at which these partial models connect to yield the aggregate model 3004a (e.g., in the example depicted in FIG. 30, drive models SubE5 and SubE6 are specified as child models underneath the parent Machine node).

In addition, the gateway device 402 contains an asset model 422 that includes links—SubE2 and SubE3—to the partial models stored on motor drives 3012 and 3010, as well as a link (Element 2) to the model 3004a stored on the industrial controller 3008. In this configuration, Element2 of asset model 422 represents the machine that is controlled by the industrial controller 3008. Accordingly, the model definitions on gateway device 402 include a reference to the Machine model 3004a, specifying that the Element2 node of asset model 422 corresponds to the Machine node of Machine model 3004a. This reference to model 3004a essentially expands the asset model 422 to include an instance 3004b of the Machine model 3004a.

According to this example configuration, the gateway device 402 depicted in FIG. 30 defines a direct linkage to the partial models stored on the industrial controller 3008 (Element2), motor drive 3012 (SubE2), and motor drive 3010 (SubE3), as well as indirect linkages—via industrial controller 3008—to the partial models stored on the motor drives 3012 and 3012 by virtue of the reference to Machine model 3004a (which itself includes links SubE5 and SubE6 to the partial models on the motor drives 3012 and 3010).

Linking the gateway device's asset model 422 to other data models stored on other logical devices in this manner yields a distributed aggregate system model representing the larger industrial system context within which the machine 2502 operates. When gateway device 402 is interfaced with the IDS system 2402, the gateway device 402 conveys model reference information defining these links to the system 2402, and the registration component 2408 registers the resulting aggregate model 2808 in association with the user account of the asset owner. With these links defined, gateway device 402 can provide to the IDS system 2402 data generated not only by its own machine (that is, data modeled by asset model 422), but also data associated with any linked models (e.g., model 3004a) connected to the asset model 422. The integrity of the aggregate system model 2808 is maintained even if one of the devices on which a portion of the system model 2808 is stored goes offline or is disconnected.

Linking or cross-referencing data models stored across different industrial devices in this manner can enable the IDS system 2402 to manage the life cycle of the underlying automation system data, as well as maintain a consistent naming and organization of the data. The aggregate system model 2808 registered on the IDS system 2402 can also be referenced by the analytic component 2412 and user interface component 2404 in connection with performing analytics on the modeled BIDT data 2802 and/or generating and delivering data presentations 2508 to authorized client devices (see FIG. 28). To ensure consistency of data organization and naming across data producers and consumers, nodes that make up the aggregate system model 2808 are not replicated between logical devices and the IDS system 2402. Instead, each node of the system model 2808 has a single original source hosted on its host logical device, and the model linkage definitions expose the properties and underlying data of that node to the other devices and to the IDS system 2402. When an aggregate system model 2808—e.g., the asset model 422 of the gateway device 402 together with references to other data models linked to the asset model 422—is registered by the IDS system 2402, the registration component 2408 creates a logical link to any source devices on which the referenced data models reside (e.g., industrial controller 3008, motor drives 3010 and 3012) and registers an ownership relationship that associates the source devices with the user account (e.g., a unique identifier of the owner of the industrial assets). Thus, the IDS system 2402 can link to the original data models on the source devices without replicating those data models locally on the IDS system 2402. Likewise, gateway device 402 can be linked to models on other devices (e.g., model 3004a) without replicating those models locally on the gateway device 402.

In some embodiments, IDS system 2402 can allow authorized consumers of a given system model 2808 (that is, users who are authorized to view modeled data associated with the system represented by the model 2808) to rename nodes or elements of the model 2808 according to their own naming preferences (e.g., changing the name of a production line, plant facility, machine name, or other elements that may have a corresponding node in the model 2808). If an element of a model 2808 is changed in this manner, registration component 2408 can register the new name in association with the consumer that renamed the model element, while retaining a record of the original name as part of the model linkage information. This can prevent unique naming conflicts that would otherwise arise with sibling model elements.

In some implementations, the same model or model portion may be referenced by multiple other models (or model portions) and their associated logical devices, resulting in multiple ownerships for the model being referenced. The IDS system 2402 can independently manage these multiple ownerships for the same system or asset model. Referencing a model in a first device from a second device does not preclude a level of network ownership. For example, in the scenario depicted in FIG. 30, industrial controller 3008 may include a reference to gateway device 402 in its I/O tree, but there may be aspects of the information modeling whereby the gateway device 402 owns a model or partial model contained in the industrial controller 3008.

If data points are added to or removed from an existing data model (or partial model) stored on a logical device, either by a user interaction or by an automated process such as a firmware upgrade, the logical device can maintain the previous data presentation and connectivity while sending a notification of the update to all relevant owners of the modified model, including gateway device 402, IDS system 2402, and any industrial devices containing data models linked to the modified model. These notified entities can then update their references to the model accordingly. In the case of a partial model, the model owner may choose to provide consistent information with the state of the model prior to the modification until a provisioning process updates the model at all participating devices affected by the modification (that is, devices or systems that reference the partial model). Since multiple independent ownerships may exist within a model, provisioning may be required against each ownership independently.

As part of the registration process for registering the asset model 422 and any extended data models linked to the asset model 422 by reference, the authentication component 2414 can certify the data source devices (e.g., industrial controller 3002, motor drives 3010 and 3012, etc.) and their associated data models (e.g., model 3004a). This may involve assigning a digital certificate 2514 to the devices and their associated models. In some embodiments, the authentication component 2414 can generate and securely store a unique digital certificate 2514 for a model (e.g., asset model 422 or other data models to which asset model 422 is linked) on the appropriate host device on which the model is stored. The digital certificate 2514 assigned to a model (or an element thereof, such as nodes, data points, or organizational entities) can include a globally unique identifier that acts as a certificate of origin. In the case of linked models (as illustrated in the example depicted in FIG. 30), the IDS system 2402 or other industrial devices can verify the authenticity of a data source device and its associated data by referencing the digital certificate 2514 stored on that data source device via the gateway device 402.

These digital certificates 2514 can verify the authenticity of the industrial data and their source devices to consumers of the data (e.g., owners of client devices 2806). For example, when user interface component 2404 delivers a data presentation 2508 to a client device 2806, the presentation 2508 may include supplemental information indicating that the underlying data presented on, or used to generate, the presentation 2508 has been authenticated as being from an expected data source device based on the digital certificate 2514 associated with the asset model 422, the system model 2808, or nodes thereof. In another example scenario, a user viewing a data presentation 2508 via a client device 2804 may send a request to the IDS system 2402 for verification of the authenticity of one or more items of data being presented. This can include verifying the source device, verifying the owner of the data (e.g., the plant entity), or verifying other aspects of the information being presented. In response, the authentication component 2414 can deliver authentication information via the data presentation 2508 based on the presence or absence of the digital certification 2514 at the source device. The authentication information may include the hierarchical path information defining the path to the data source, which may be determined based in part on the system model 2808.

In addition to or as an alternative to the digital certificates 2514, some embodiments of authentication component 2414 can create a unique identifier for a host device and its associated data model and securely register this identifier as part of a public and private key configuration. In some embodiments, authentication component 2414 can leverage properties of the source device on which the model is stored in connection with generating the unique identifier. Properties used to generate the unique device identifier can include, but are not limited to, the device's MAC address, fully qualified name, firmware version, or other device attributes.

If user ownership of a model or its corresponding logical device is changed, authentication component 2414 can also update properties of the model's digital certificate 2514 (e.g., the MAC address, account name, fully qualified name, etc.). This update process can require verification from the owner of the model in some embodiments. For example, an account owner having ownership rights to a model associated with an industrial device can transfer access to the model/device to a different account, as in scenarios in which the industrial device or its associated industrial system transfers ownership. In some scenarios, after an automation system and associated data models have transferred ownership to a new user, some specified data models may remain unique to the original creator (e.g., if certain data elements are considered intellectual property). In a related aspect, some embodiments of authentication component 2414 can be configured to generate and maintain an immutable chain of ownership for all model and data logs, such that the ownership of a model and its underlying data can be traced to the originator (e.g., if required to verify authenticity).

The IDS system 2402 and gateway device 402 can also allow authorized owners of the industrial assets to selectively assign access rights to portions of the industrial data generated by these assets. These access rights can be controlled at a highly granular level by allowing users to define access privileges at the node level. In this way, the industrial data service ecosystem enabled by the IDS system 2402, asset models 422, and BIDTs 322 can allow equipment owners to define how their proprietary data is shared with outside parties, including OEMs, service providers (e.g., maintenance entities), equipment vendors, etc.

Figure 31:
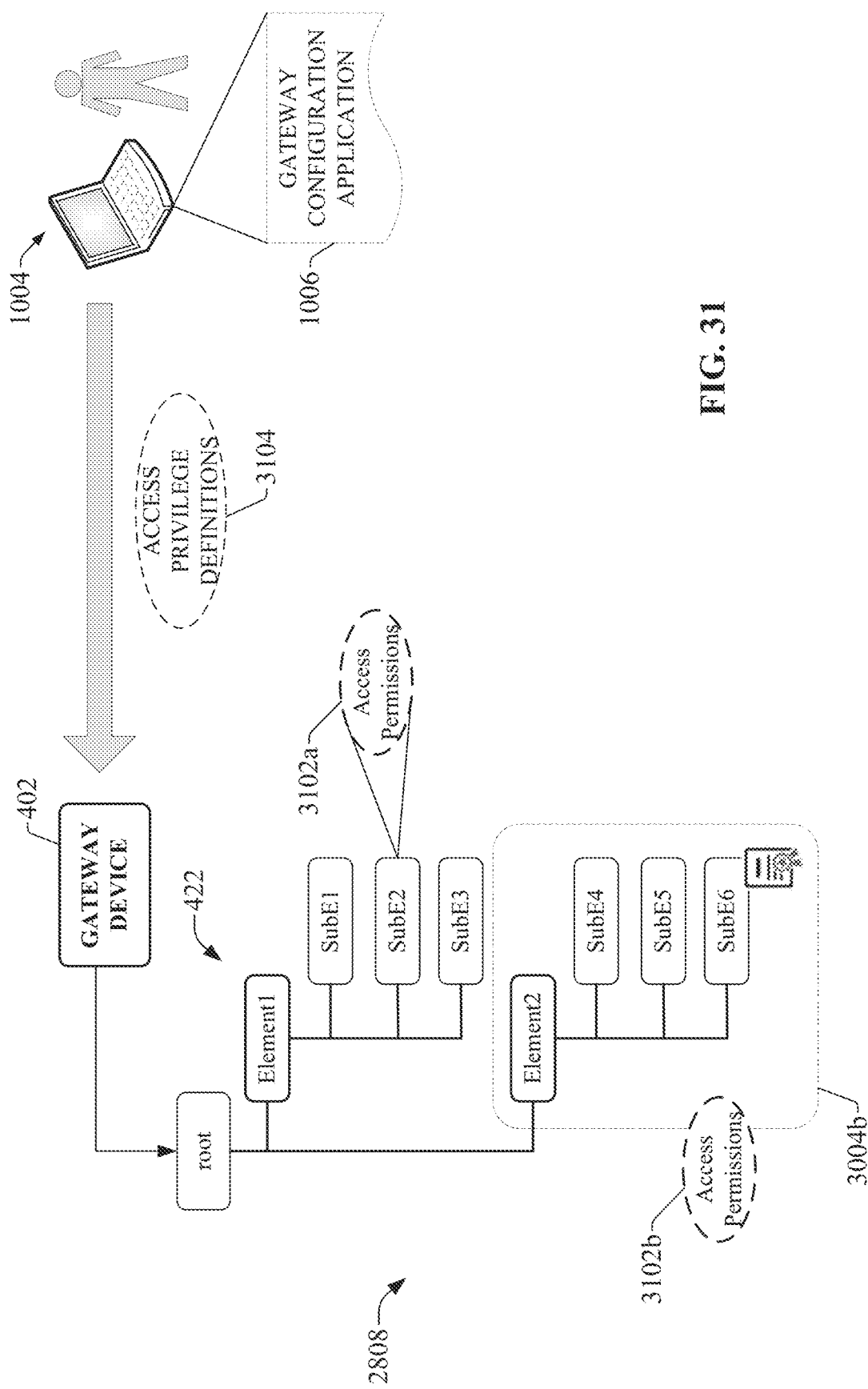
FIG. 31 is a diagram illustrating an example approach for configuring data access permission via a gateway device.

To these ends, owners of the industrial assets—e.g., machine 2502 and related industrial assets, as well as the industrial devices (e.g., industrial controllers, motor drives, HMIs, etc.) associated with these assets—can interact with the model definitions defined on these assets to define data access permissions for selected portions or nodes of the models. This can include configuring which areas or nodes of the asset models 422 and related models can be accessed by outside entities via the IDS platform, and which entities, users, or user roles are permitted to access these selected nodes. FIG. 31 is a diagram illustrating an example approach for configuring data access permission via the gateway device 402. In some embodiments, data access permissions can be configured by communicatively connecting to the gateway device 402 using a client device 1004 that executes the gateway configuration application 1006 (see FIG. 10). In such embodiments, the gateway configuration application 1006 can include configuration tools that allow access privilege definitions 3104 to be defined for the asset model 422—or the extended system model 2808—as part of the model definition. The access privilege definitions 3104 can applied to the entire model (e.g., the asset model 422 stored on the gateway device 402 or the entire extended system model 2808), selected portions of the model (e.g., model 3004—or a portion thereof—stored on the industrial controller 3008 and referenced by the asset model 422), or individual nodes of the model. In the example depicted in FIG. 31, access permissions 3102a have been applied to node SubE2 of the asset model 422, and define access permissions to the data values associated with that node, while access permissions 3102b have been applied to sub-model 3004b and define access permissions to the data values associated with all the nodes defined in that sub-model. The access permissions 3102 can specify which entities registered with the IDS system 2402 (e.g., OEMs, suppliers, service providers, partners, equipment vendors, etc.) are permitted to view the underlying industrial data associated with the indicated portions or nodes of the model.

At the IDS system 2402, the registration component 2408 can read these access privilege definitions from the gateway device 402 and register the access privilege definitions in association with the model registration. Subsequently, during operation of the industrial assets, authentication component 2414 can reference these registered access privileges to control which registered entities are permitted to receive data presentations 2508 containing the regulated industrial data (see FIG. 28). That is, when an entity submits a request for a data presentation 2508 containing modeled BIDT data 2802 associated with portions of the system model 2808 for which access privileges have been defined, user interface component 2404 will only send such presentations 2508 to the requesting entity if the entity's user account has been granted access privileges to those portions of the system model 2808.

In addition to or as an alternative to configuring these access privileges locally at the gateway device 402 (or on the industrial device that hosts a portion of the system model 2808), access privileges can be defined for portions or nodes of the system model 2808 via the IDS system 2402. For example, the user interface component 2404 may provide tools (e.g., configuration display interfaces) that allow an authorized user to remotely configure model-based data access privileges for the system model 2808 via a client device 2506.

Figure 32:
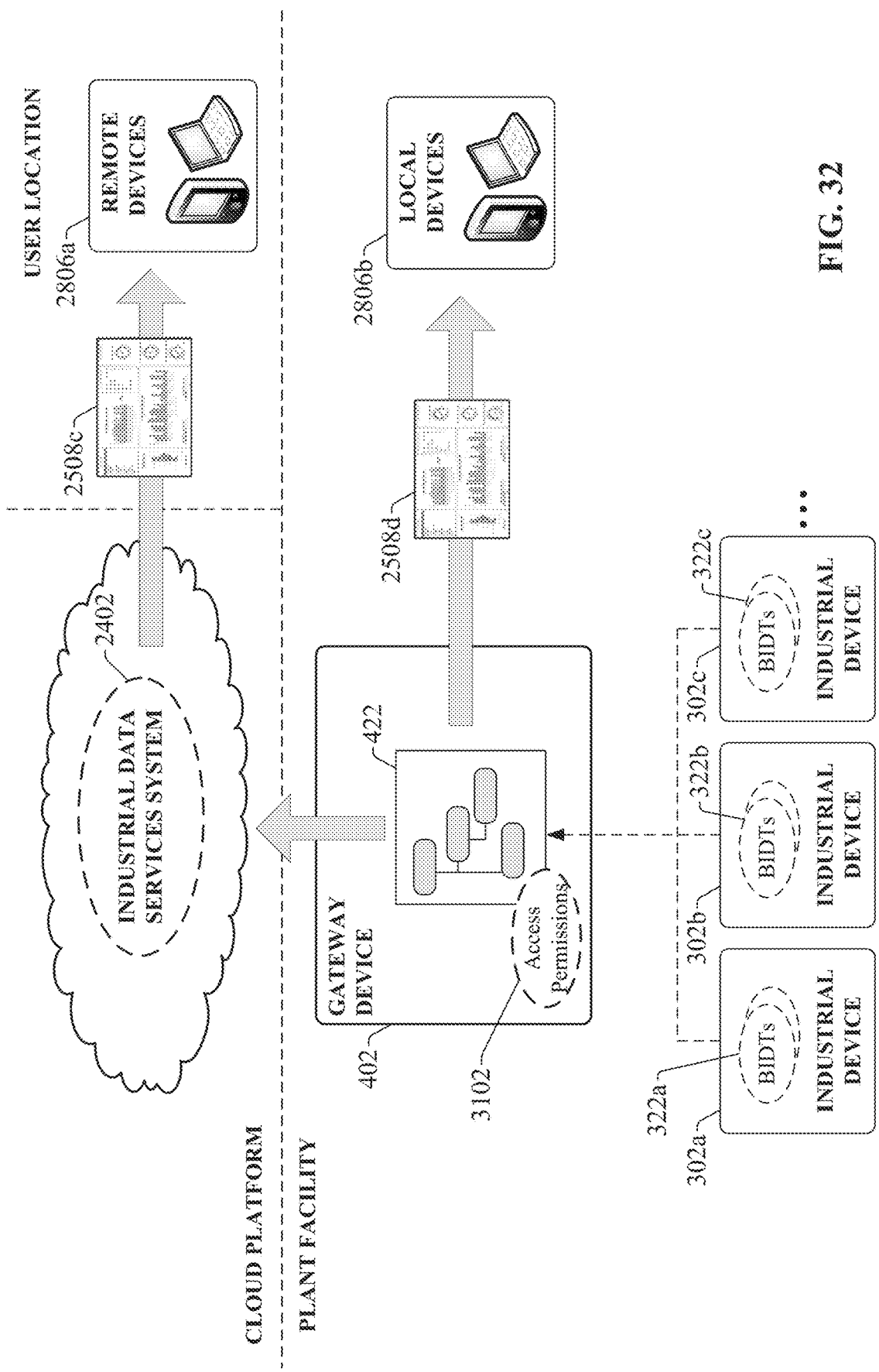
FIG. 32 is a diagram illustrating an example architecture in which underlying BIDT data generated by industrial devices is accessed both via direct connection to a gateway device as well as via remote access through a cloud-based IDS system.

In some embodiments, the access permissions 3102 can be defined to be context-specific, such that the degree of data security applied to items of data depends on whether the data is being accessed locally at the plant facility (e.g., via the gateway device 402) or remotely via the IDS system 2402. For example, the gateway device 402 and the IDS system 2402 can allow two or more sets of access permissions to be defined for the same node or portion of the system model 2808, where a first permission definition is applied to local access at the plant facility, and a second permission definition is applied to remote access via the IDS system 2402. FIG. 32 is a diagram illustrating an example architecture in which underlying BIDT data generated by industrial devices 302 is accessed both via direct—or locally networked— connection to the gateway device 402 as well as via remote access through the cloud-based IDS system 2402. During operation, requests for a selected subset of the BIDT data received from a local client device 2806b within the plant facility—which may be received via a local wired or wireless connection to the gateway device 402—are subject to a first set of access permissions defined for that subset of data (e.g., access permissions 3102 applied to the model nodes corresponding to the requested data items). Gateway device 402 will deliver this requested data via a suitable data presentation 2508d only if the local access permissions indicate that the user is permitted to view the data. Similarly, requests for selected BIDT data received from a remote device 2806a via the IDS system 2402 are subject to a second set of access permissions defined for the selected data, such that the IDS system 2402 will only deliver the requested BIDT data (e.g., via data presentation 2508c) if the second set of access permissions indicate that the remote user is permitted access to the data. By allowing the user to define different sets of context-based access permissions for the same data, the IDS ecosystem can allow asset owners to apply more rigorous access control to data when being accessed remotely via the cloud, where the data would otherwise be more vulnerable to access unauthorized outside entities.

Within the context of a relationship between an OEM and an end user who purchases a machine 2502 from the OEM, the IDS ecosystem and its associated data security and sharing functions described above can facilitate controlled ongoing data sharing between the two entities after the machine 2502 has been deployed at the end user's plant facility. This data sharing may be part of a service agreement in place between the OEM and the end user. For example, after the OEM's machine 2502 has been shipped to the end user's facility and placed into service, the end user may choose to purchase or subscribe to cloud-based data services or applications 2504 offered by the OEM, as described above. Additionally, the end user may define access permissions 3102 that allow the OEM to access selected subsets of the machine's data via the IDS system 2402 for the purpose of remotely assessing the machine's performance as part of a service agreement between the OEM and the end user. The subset of shared data may be selected such that the OEM receives relevant performance data necessary to assess performance while prohibiting access to more sensitive proprietary operating data generated by the machine 2502.

Returning briefly to FIG. 25, if the user has also opted to purchase or subscribe to a set of available data service applications 2504 (e.g., energy consumption reports, OEE reports, quality reports, alarm and maintenance monitoring and notification applications, etc.), the user may also opt to share the outputs of one or more of these applications 2504 with the OEM. In the example depicted in FIG. 25, the user at the plant facility has opted to share reports generated by the Alarms and Maintenance applications with the OEM, allowing the OEM to receive data presentations 2508b generated by these applications. The end user can set the data access permissions 3102 to facilitate secure data sharing with other outside entities as well, including but not limited to equipment vendors, systems integrators, or their own customers.

The IDS system 2402 can include a transaction architecture that facilitates monetization of the diverse commercial interactions associated with the industrial data services and brokerages services described above. For example, OEMs who offer their asset models 422 and data applications 2504 on a subscription basis can collect fees from end users in exchange for use of their data models and application-based data services. Although example scenarios described above assume that the end user purchases the machine 2502 for which data services are rendered, in some scenarios this type of subscription-based data service may be implemented in connection with a machine-as-a-service business model whereby the end user pays a recurring, periodic subscription fee in exchange for leased on-premises usage of the OEM's machine 2502.

Embodiments of the IDS system 2402 can provide data management services that are catered to the unique needs of specific OEMs, end users, and/or the business relationships between these entities. For example, some industries or geographies are governed by rules for custody of models and data, including rules directed to data integrity, security, and transport. For entities that operate in such industries and geographies, the IDS system 2402 can customize the data services described above to comply with these data integrity, security, and transportation rules. In another example, some machines or industrial assets may be required to maintain a minimum amount of data storage capacity to ensure reliable operation. Accordingly, the IDS system 2402 can implement methods for automatically segmenting models and data across devices in order to comply with operational conditions, regulations, or other restrictions.

The IDS system 2402 described above can serve as a central marketplace through which owners of industrial assets can discover commercial offerings—enabled by data models, data, applications, hardware, and services—offered by asset suppliers. This marketplace can offer suppliers options for both private and public marketplaces. That is, some embodiments of the IDS system 2402 can allow OEMs or other types of industrial service providers to publish data service offerings that are viewable only to selected customers within the context of a private marketplace, while also providing a private marketplace in which applications and services can be made discoverable to any third-party commercial search engines (subject to fees).

Since the IDS marketplace is implemented by an architecture of a cloud-based IDS system 2402 in conjunction with gateway devices 402 and their associate asset models 422, the data services ecosystem can be viewed as a distributed marketplace whereby OEMs or other industrial provider entities can embed an IDS offering on their equipment (e.g., in the form of an asset model 422, application 2504, etc.) prior to shipping the equipment to an end user. These distributed IDS marketplace offerings need not be limited only to the OEM's content. An OEM can select what services to offer in this embedded marketplace based on the models, data, applications, and services that are available. Moreover, the OEM may choose to publish new data service offerings via the marketplace after the equipment has been installed at the end user's facility and connected to the IDS system 2402. In such scenarios, the IDS system 2402 can proactively notify end users of these new offerings if applicable to the particular industrial assets currently being operated by the user. Alternatively, the end user may access the gateway device 402 (e.g., through a browser or another type of interface application) in order to view asset-specific data service offerings available for the user's equipment, and subscribe to or purchase selected services through this interface.

FIGS. 33-35*b* illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 33:
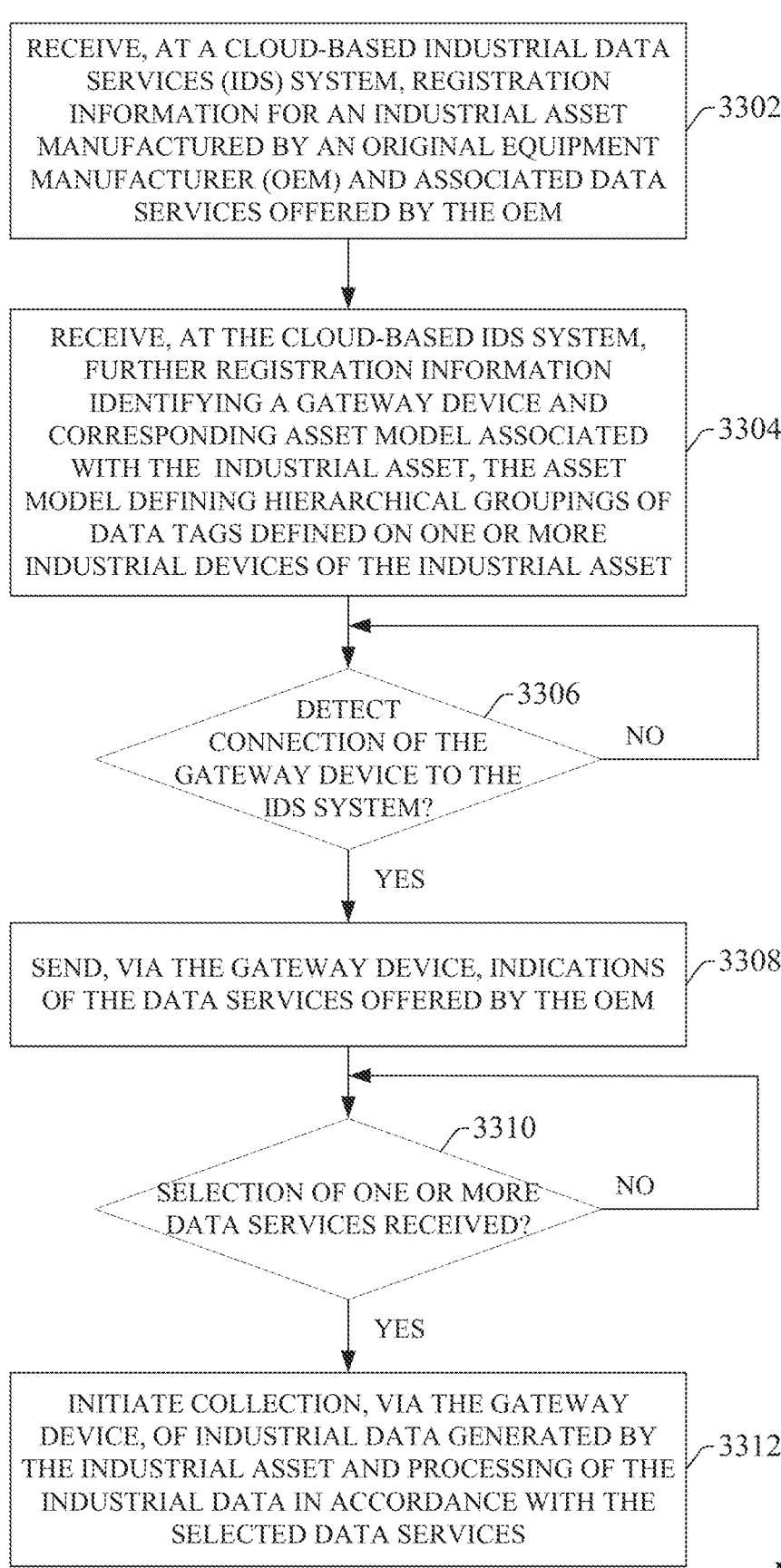
FIG. 33 is a flowchart of an example methodology for offering and implementing industrial data services via a cloud-based industrial data services platform.

FIG. 33 illustrates an example methodology 3300 for offering and implementing industrial data services via a cloud-based industrial data services platform. Initially, at 3302, registration information for an industrial asset manufactured by an original equipment manufacturer (OEM), as well as associated data services offered by the OEM, is received at a cloud-based industrial data services (IDS) system. The registration information can include such information as a unique identifier for the industrial asset, a type of the industrial asset, identities of one or more end users who will be operating the asset (e.g., end users who will be purchasing or leasing the asset), or other such information. With regard to available data services, the registration information may also include registered data service applications that can be applied to data generated by the industrial asset to yield insights into the asset's operation (e.g., energy consumption applications, product quality applications, overall equipment effectiveness (OEE) applications, alarm detection and notification applications, maintenance applications, etc.).

At 3304, further registration information can be received at the cloud-based IDS system identifying a gateway device and a corresponding asset model associated with the industrial asset. The asset model can define hierarchical groupings of data tags (e.g., BIDTs or other types of smart tags) defined on one or more industrial devices that make up the industrial asset (e.g., industrial controllers, motor drives, safety relays or other safety devices, HMIs, etc.), and can be used to organize and/or contextualize the data (e.g., by appending contextualization metadata to the data) to facilitate meaningful analysis and presentation of the data by data service applications.

At 3306, a determination is made as to whether the IDS system detects a connection to the gateway device registered at step 3304. In an example scenario, the gateway device may be interfaced to the cloud-based IDS system from the end user's plant facility after the industrial asset has been shipped to the end user. If such a connection is detected (YES at step 3306), the methodology proceeds to step 3308, where indications of the data services offered by the OEM (and registered at step 3302) as being relevant to the industrial asset is sent via the gateway device. In an example implementation, the end user may connect a client device to the gateway device either directly or via a network connection in order to view the available data service offerings. Alternatively, the user may access the IDS system via a web browser and log onto the system under a recognized user account in order to view the relevant data offerings available to that user (e.g., based on a determination of which industrial assets are registered in association with the user account and what data services are available for those assets).

At 3310, a determination is made as to whether a selection of one or more of the available data services has been received. In this regard, the user may opt to operate the industrial asset without making use of the available data services, or may select one or more of the data services in order to glean insights into the asset's operation, to configure automated remote notifications of the asset's behavior, or to initiate other such services. If a selection of one or more data services is received (YES at step 3310), the methodology proceeds to step 3312, where collection of industrial data generated by the industrial asset is initiated, and the industrial data is processed in accordance with the data services selected at step 3310. The industrial data generated by the industrial asset can be collected by the gateway device, which then models or organizes the data according to the asset model and delivers the modeled data to the IDS system for processing in accordance with the selected data services.

Figure 34:
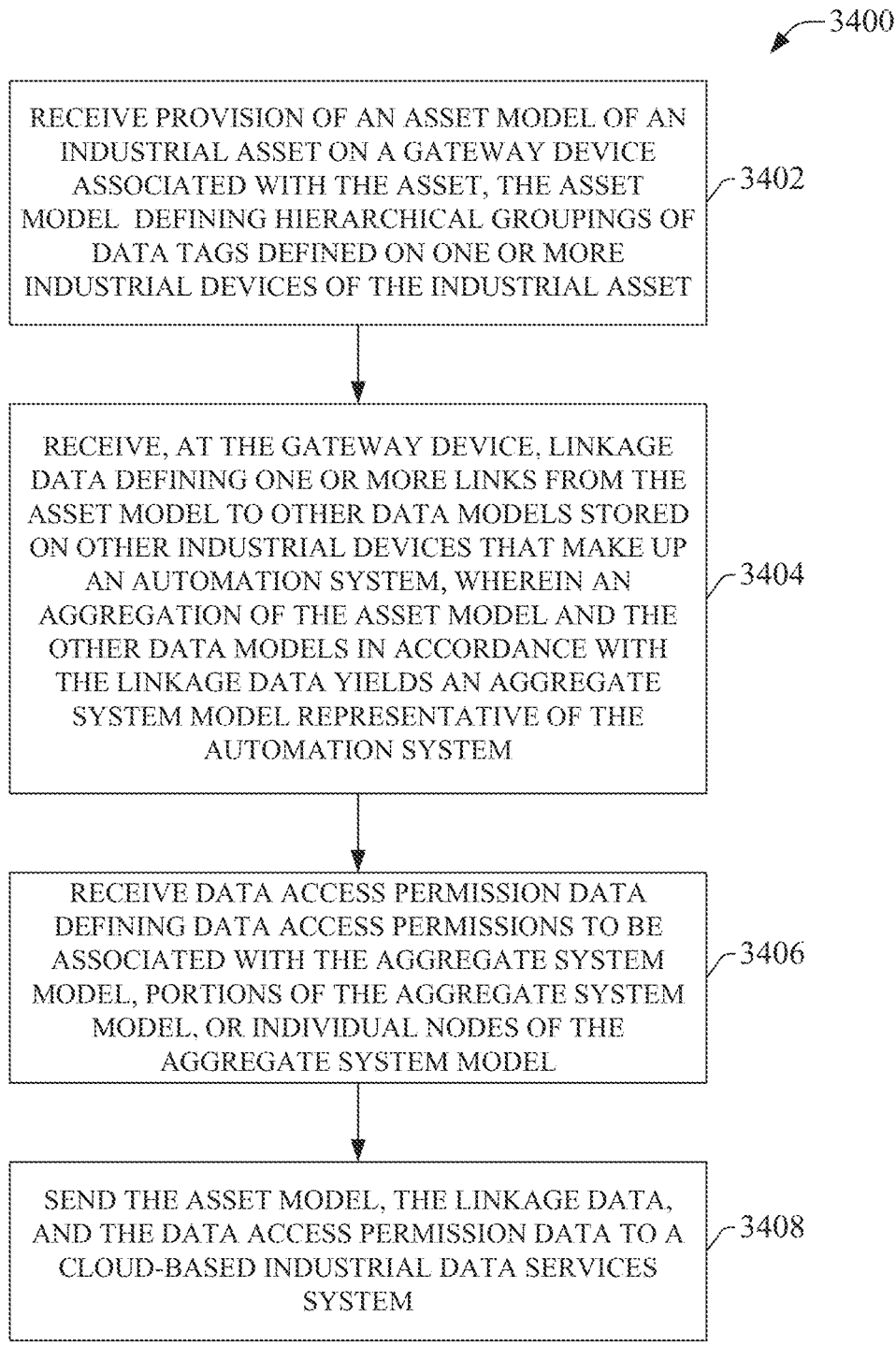
FIG. 34 is a flowchart of an example methodology for defining data models and associated data access permissions for consumption and processing by a cloud-based IDS system.

FIG. 34 illustrates an example methodology 3400 for defining data models and associated data access permissions for consumption and processing by a cloud-based IDS system. Initially, at 3402, provision of an asset model of an industrial asset is received on a gateway device associated with the industrial asset. The asset model can define hierarchical groupings of data tags (e.g., BIDTs or other types of data tags) defined on one or more industrial devices that make up the industrial asset. At 3404, linkage data is received at the gateway device, the linkage data defining one or more links from the asset model to other data models stored on other industrial devices that make up an automation system. The linkage data can specify, for example, an identity of the industrial device on which another data model being referenced is stored as well as a point on the asset model at which the other data model connects. This connection will typically reflect the hierarchical arrangements of industrial assets, devices, and/or data represented by the asset model and the other model. The aggregation of the asset model and the other data models in accordance with the linkage data yields an aggregate system model definition representative of the relationships between components of the larger automation system.

At 3406, data access permission data is received at the gateway device. The data access permission data defines data access permissions to be associated with the aggregated system model as a whole, selected portions of the aggregated system model, or individual nodes of the aggregated system model. The data access permissions can define, for example, external entities, individual users, or user roles who are permitted to remotely access the data associated with the portions of the model to which the data permissions are applied.

At 3408, the asset model, linkage data, and data access permission data is sent to a cloud-based IDS system, which can configure collection, processing, and sharing of the underlying industrial data generated by the automation system in accordance with the model and permission data. In some scenarios, the asset model associated with the gateway device may already be registered on the IDS system (e.g., by a manufacturer of the industrial asset), and as such the gateway device may only send the linkage data and data access permission data to the IDS system to be registered in association with the asset model.

Figure 35A:
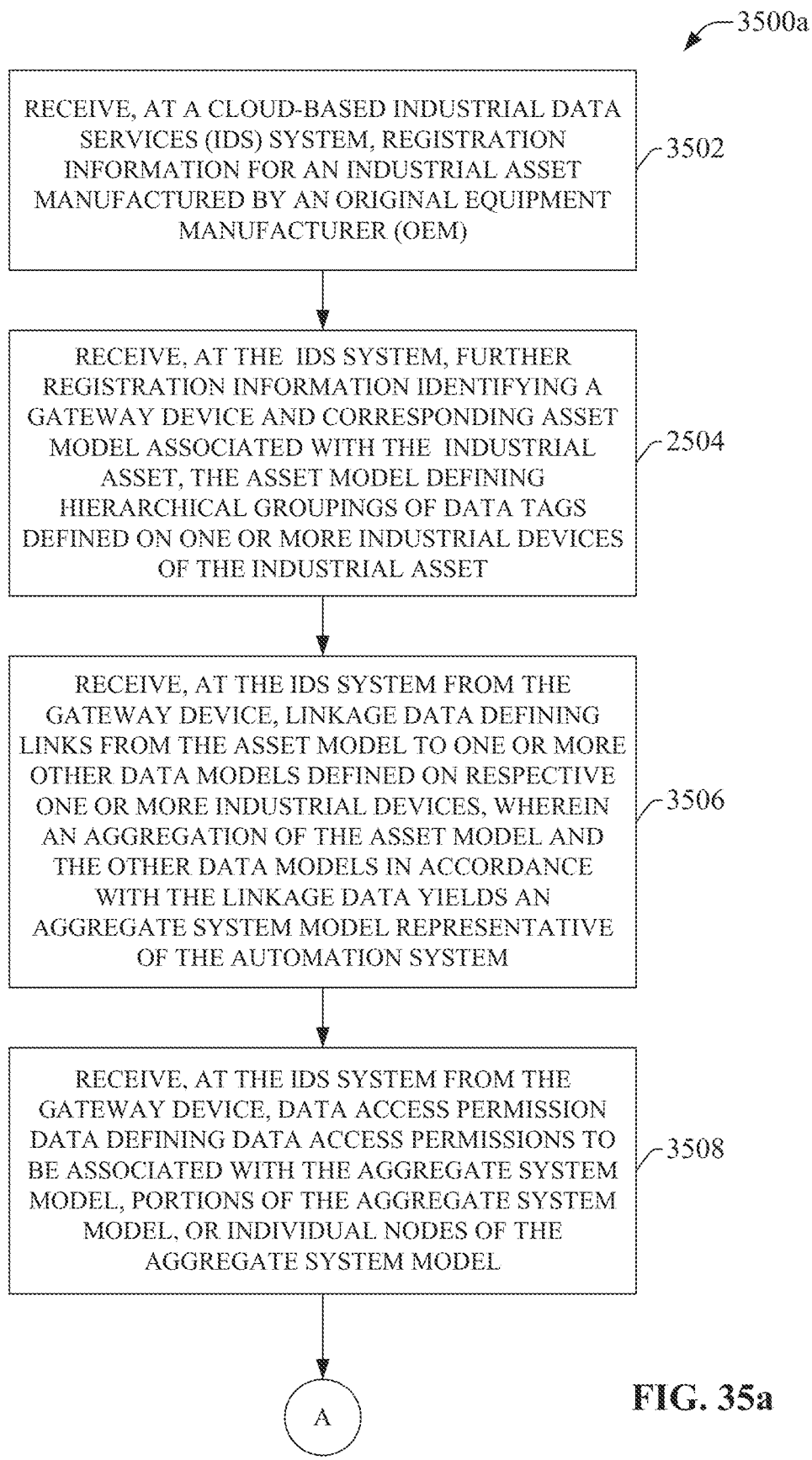
FIG. 35a is a first part of a flowchart of an example methodology for configuring a cloud-based data IDS system for data collection and sharing.

FIG. 35*a* illustrates a first part of an example methodology 3500*a* for configuring a cloud-based data IDS system for data collection and sharing. Initially, at 3502, registration information for an industrial asset manufactured by an original equipment manufacturer (OEM) is received at a cloud-based IDS system. In an example scenario, this registration information can be submitted by the OEM and may uniquely identify the industrial asset as well as indicate a type of the industrial asset (e.g., a type of machine offered for sale or lease by the OEM). The registration information may also register an ownership of the industrial asset by specifying an end user entity to whom the industrial asset is being sold or leased. At 3504, further registration information identifying a gateway device and a corresponding asset model associated with the industrial asset is received at the IDS system. The asset model resides on the gateway device and defines hierarchical groupings of data tags defined on one or more industrial devices of the industrial asset, as described in foregoing examples. The gateway device can be installed as part of the industrial asset and configured to collect data from the industrial devices that make up the asset. In particular, the gateway device is configured to collect data and any associated metadata from the data tags defined by the asset model.

At 3506, linkage data defining links from the asset model to one or more other data models defined on respective one or more industrial devices is received at the IDS system from the gateway device. In an example scenario, this linkage data may be received after the industrial asset and associated gateway device has been shipped to the end user facility at which the asset will be operated. The linkage data can specify, for example, an identity of an industrial device on which a referenced data model is stored as well as a location or point on the asset model at which the referenced data model connects (e.g., a parent node of the asset model under which the referenced data model connects as a sub-model). This connection will typically reflect the hierarchical arrangements of industrial assets, devices, and/or data that make up a larger industrial automation system within which the industrial asset operates. The aggregation of the asset model and the other data models in accordance with the linkage data yields an aggregate system model definition representative of the relationships between components of the larger automation system.

At 3508, data access permission data defining data access permissions to be associated with the aggregate system model, selected portions of the aggregate system model, or individual nodes of the aggregate system model is received at the IDS system from the gateway device. The data access permissions can define, for example, external entities, individual users, or user roles who are permitted to remotely access the data associated with the portions of the model to which the data permissions are applied. These data access permissions can be applied to selected portions or nodes of the aggregate system model by the end user; e.g., via configuration data submitted to the gateway device.

Figure 35B:
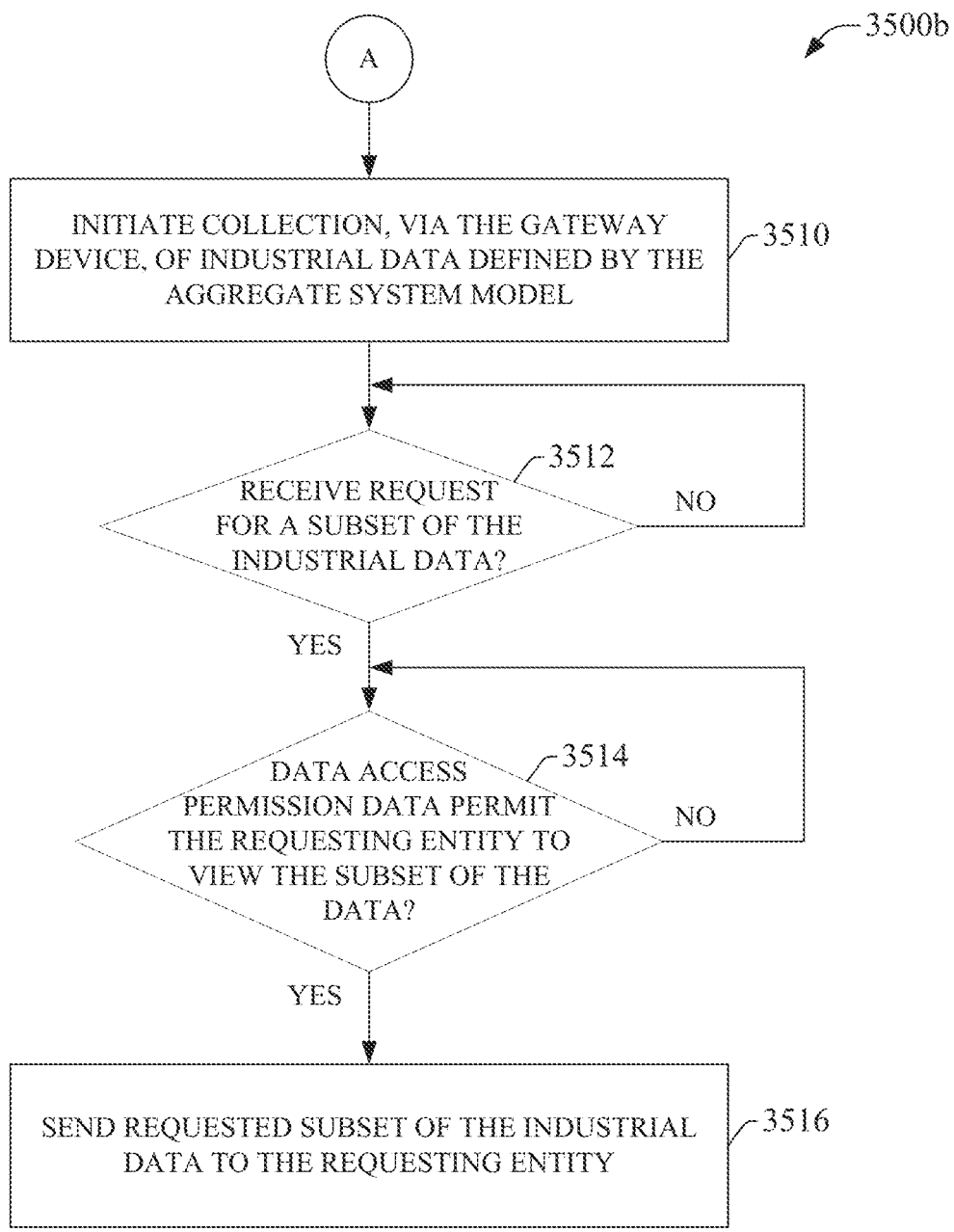
FIG. 35b is a second part of the flowchart of the example methodology for configuring a cloud-based data IDS system for data collection and sharing.

The methodology continues with the second part 3500*b* illustrated in FIG. 35*b*. At 3510, collection of industrial data defined by the aggregate system model is initiated. The data is collected at the IDS system via the gateway device, which collects data from the specified data tags on the industrial devices that make up the industrial asset and the larger industrial system within which the asset operates. At 3512, a request for a subset of the industrial data is received at the IDS system. The request may be received, for example, from a remote client device associated with a user, user role, or registered entity recognized by the IDS system. If such a request is received (YES at step 3512), the methodology proceeds to step 3514, where a determination is made as to whether the data access permission data received at step 3508 permits the requesting entity to view the subset of the data. This determination can be made by identifying the nodes of the aggregated system model corresponding to the subset of the data being requested and referencing the access permission defined for those nodes. If the data access permission data permits the requesting entity to access the requested subset of data (YES at step 3514), the methodology proceeds to step 3516, where the requested subset of the industrial data is sent to the requesting entity.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 36:
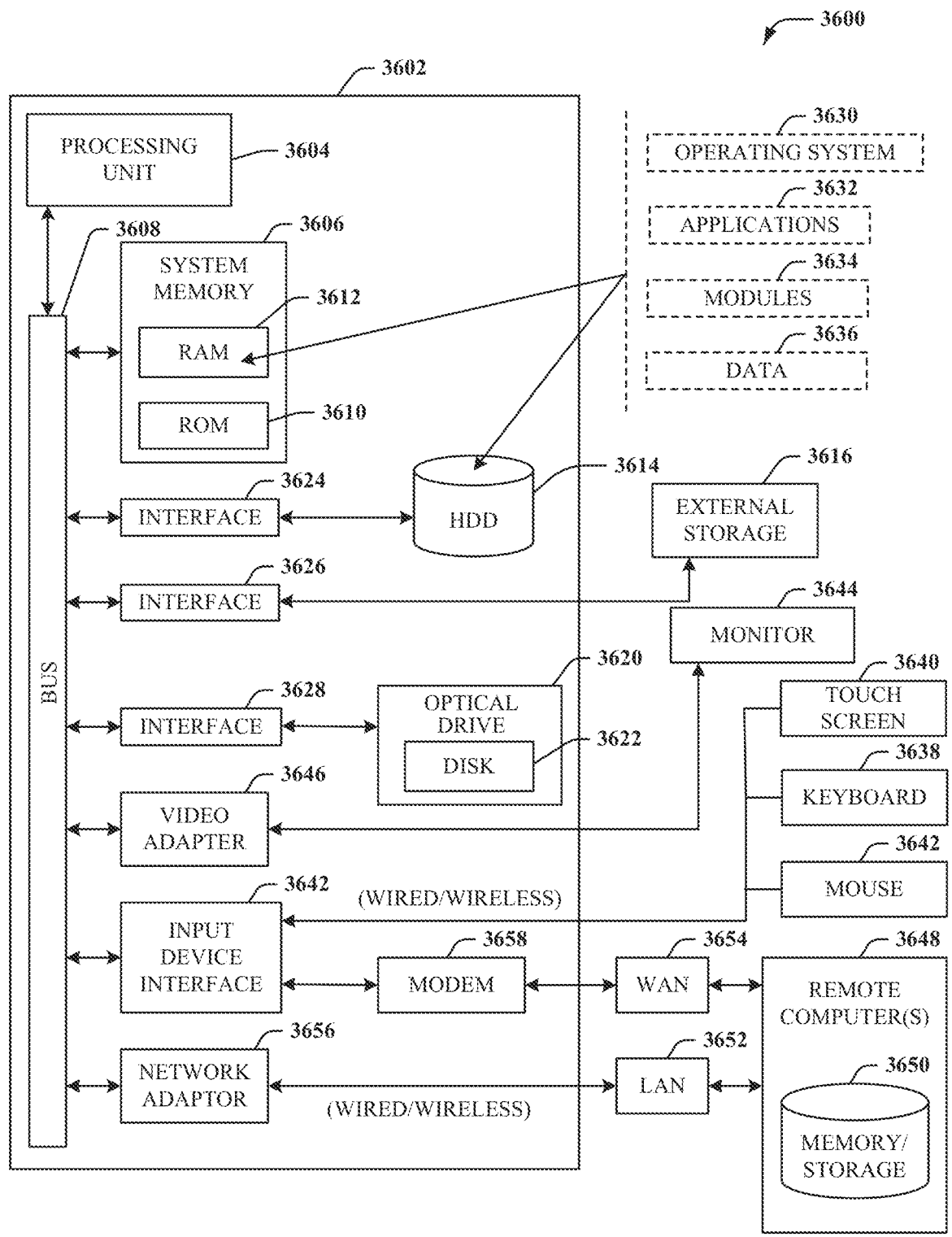
FIG. 36 is an example computing environment.
Figure 37:
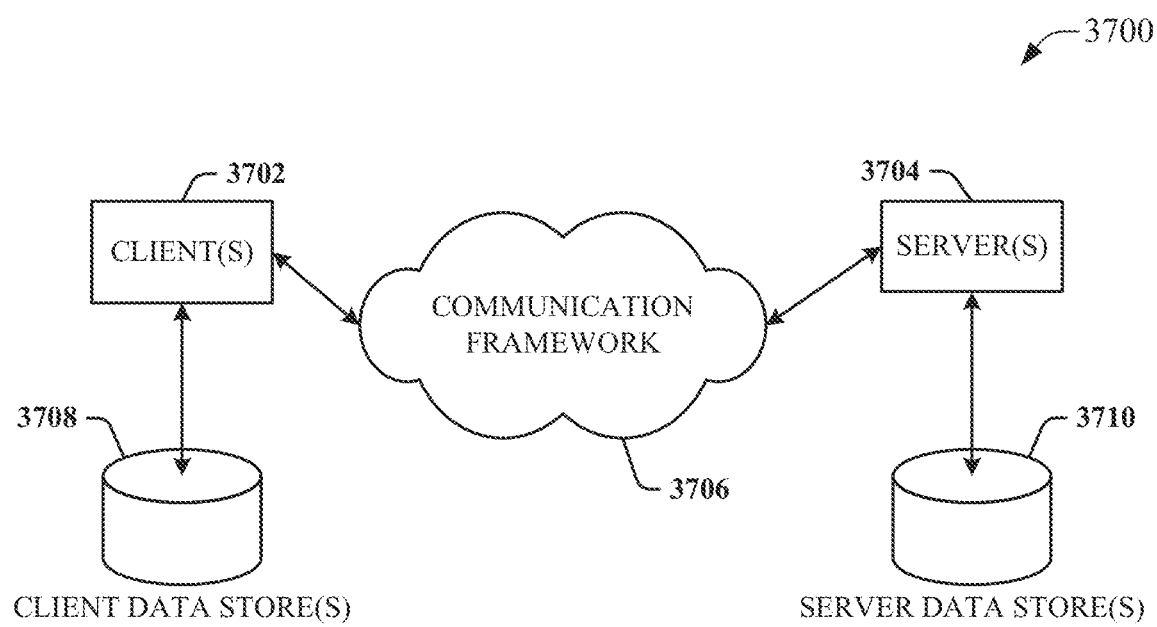
FIG. 37 is an example networking environment.

In order to provide a context for the various aspects of the disclosed subject matter, FIGS. 36 and 37 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 36, the example environment 3600 for implementing various embodiments of the aspects described herein includes a computer 3602, the computer 3602 including a processing unit 3604, a system memory 3606 and a system bus 3608. The system bus 3608 couples system components including, but not limited to, the system memory 3606 to the processing unit 3604. The processing unit 3604 can be any of various commercially available processors. Dual microprocessors and other multi-processor architectures can also be employed as the processing unit 3604.

The system bus 3608 can be any of several types of bus structure that can further interconnect to a memory bus (with or without a memory controller), a peripheral bus, and a local bus using any of a variety of commercially available bus architectures. The system memory 3606 includes ROM 3610 and RAM 3612. A basic input/output system (BIOS) can be stored in a non-volatile memory such as ROM, erasable programmable read only memory (EPROM), EEPROM, which BIOS contains the basic routines that help to transfer information between elements within the computer 3602, such as during startup. The RAM 3612 can also include a high-speed RAM such as static RAM for caching data.

The computer 3602 further includes an internal hard disk drive (HDD) 3614 (e.g., EIDE, SATA), one or more external storage devices 3616 (e.g., a magnetic floppy disk drive (FDD) 3616, a memory stick or flash drive reader, a memory card reader, etc.) and an optical disk drive 3620 (e.g., which can read or write from a CD-ROM disc, a DVD, a BD, etc.). While the internal HDD 3614 is illustrated as located within the computer 3602, the internal HDD 3614 can also be configured for external use in a suitable chassis (not shown). Additionally, while not shown in environment 3600, a solid state drive (SSD) could be used in addition to, or in place of, an HDD 3614. The HDD 3614, external storage device(s) 3616 and optical disk drive 3620 can be connected to the system bus 3608 by an HDD interface 3624, an external storage interface 3626 and an optical drive interface 3628, respectively. The interface 3624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3612, including an operating system 3630, one or more application programs 3632, other program modules 3634 and program data 3636. All or portions of the operating system, applications, modules, and/or data can also be cached in the RAM 3612. The systems and methods described herein can be implemented utilizing various commercially available operating systems or combinations of operating systems.

Computer 3602 can optionally comprise emulation technologies. For example, a hypervisor (not shown) or other intermediary can emulate a hardware environment for operating system 3630, and the emulated hardware can optionally be different from the hardware illustrated in FIG. 36. In such an embodiment, operating system 3630 can comprise one virtual machine (VM) of multiple VMs hosted at computer 3602. Furthermore, operating system 3630 can provide runtime environments, such as the Java runtime environment or the .NET framework, for application programs 3632. Runtime environments are consistent execution environments that allow application programs 3632 to run on any operating system that includes the runtime environment. Similarly, operating system 3630 can support containers, and application programs 3632 can be in the form of containers, which are lightweight, standalone, executable packages of software that include, e.g., code, runtime, system tools, system libraries and settings for an application.

Further, computer 3602 can be enable with a security module, such as a trusted processing module (TPM). For instance with a TPM, boot components hash next in time boot components, and wait for a match of results to secured values, before loading a next boot component. This process can take place at any layer in the code execution stack of computer 3602, e.g., applied at the application execution level or at the operating system (OS) kernel level, thereby enabling security at any level of code execution.

A user can enter commands and information into the computer 3602 through one or more wired/wireless input devices, e.g., a keyboard 3638, a touch screen 3640, and a pointing device, such as a mouse 3642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3604 through an input device interface 3644 that can be coupled to the system bus 3608, but can be connected by other interfaces, such as a parallel port, an IEEE 1394 serial port, a game port, a USB port, an IR interface, a BLUETOOTH® interface, etc.

A monitor 3644 or other type of display device can be also connected to the system bus 3608 via an interface, such as a video adapter 3646. In addition to the monitor 3644, a computer typically includes other peripheral output devices (not shown), such as speakers, printers, etc.

The computer 3602 can operate in a networked environment using logical connections via wired and/or wireless communications to one or more remote computers, such as a remote computer(s) 3648. The remote computer(s) 3648 can be a workstation, a server computer, a router, a personal computer, portable computer, microprocessor-based entertainment appliance, a peer device or other common network node, and typically includes many or all of the elements described relative to the computer 3602, although, for purposes of brevity, only a memory/storage device 3650 is illustrated. The logical connections depicted include wired/wireless connectivity to a local area network (LAN) 3652 and/or larger networks, e.g., a wide area network (WAN) 3654. Such LAN and WAN networking environments are commonplace in offices and companies, and facilitate enterprise-wide computer networks, such as intranets, all of which can connect to a global communications network, e.g., the Internet.

When used in a LAN networking environment, the computer 3602 can be connected to the local network 3652 through a wired and/or wireless communication network interface or adapter 3656. The adapter 3656 can facilitate wired or wireless communication to the LAN 3652, which can also include a wireless access point (AP) disposed thereon for communicating with the adapter 3656 in a wireless mode.

When used in a WAN networking environment, the computer 3602 can include a modem 3658 or can be connected to a communications server on the WAN 3654 via other means for establishing communications over the WAN 3654, such as by way of the Internet. The modem 3658, which can be internal or external and a wired or wireless device, can be connected to the system bus 3608 via the input device interface 3642. In a networked environment, program modules depicted relative to the computer 3602 or portions thereof, can be stored in the remote memory/storage device 3650. It will be appreciated that the network connections shown are example and other means of establishing a communications link between the computers can be used.

When used in either a LAN or WAN networking environment, the computer 3602 can access cloud storage systems or other network-based storage systems in addition to, or in place of, external storage devices 3616 as described above. Generally, a connection between the computer 3602 and a cloud storage system can be established over a LAN 3652 or WAN 3654 e.g., by the adapter 3656 or modem 3658, respectively. Upon connecting the computer 3602 to an associated cloud storage system, the external storage interface 3626 can, with the aid of the adapter 3656 and/or modem 3658, manage storage provided by the cloud storage system as it would other types of external storage. For instance, the external storage interface 3626 can be configured to provide access to cloud storage sources as if those sources were physically connected to the computer 3602.

The computer 3602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 37 is a schematic block diagram of a sample computing environment 3700 with which the disclosed subject matter can interact. The sample computing environment 3700 includes one or more client(s) 3702. The client(s) 3702 can be hardware and/or software (e.g., threads, processes, computing devices). The sample computing environment 3700 also includes one or more server(s) 3704. The server(s) 3704 can also be hardware and/or software (e.g., threads, processes, computing devices). The servers 3704 can house threads to perform transformations by employing one or more embodiments as described herein, for example. One possible communication between a client 3702 and servers 3704 can be in the form of a data packet adapted to be transmitted between two or more computer processes. The sample computing environment 3700 includes a communication framework 3706 that can be employed to facilitate communications between the client(s) 3702 and the server(s) 3704. The client(s) 3702 are operably connected to one or more client data store(s) 3708 that can be employed to store information local to the client(s) 3702. Similarly, the server(s) 3704 are operably connected to one or more server data store(s) 1610 that can be employed to store information local to the servers 3704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:
1. A system, comprising:
 a memory that stores executable components; and
 a processor, operatively coupled to the memory, that executes the executable components, the executable components comprising:

a registration component configured to store, on a cloud platform, registration information relating to an industrial asset, the registration information comprising at least an identity of the industrial asset, an asset model defined for the industrial asset, and one or more data service applications available for the industrial asset, wherein the asset model models the industrial asset in terms of hierarchical elements, and the asset model references data tags defined on one or more industrial devices of the industrial asset;

an application delivery component configured to receive, from a client device associated with an end user entity registered as an owner of the industrial asset, selection of a data service application, of the one or more data service applications, to be used to process industrial data generated by the industrial asset;

a gateway interface component configured to collect, from a gateway device, industrial data collected by the gateway device from the data tags defined by the asset model; and an analytic component configured to apply processing to the industrial data in accordance with the data service application, wherein the one or more data service applications comprise at least one of an energy consumption application that calculates and monitors energy consumption by the industrial asset, an overall equipment effectiveness application that calculates an overall equipment effectiveness of the industrial asset, a quality application configured to calculate and monitor a quality metric of a product produced by the industrial asset, an alarms application configured to monitor the industrial data for alarm events that occur at the industrial asset and to generate notifications of the alarm events, or a maintenance application configured to generate maintenance notifications in response to detection of performance issues experience by the industrial asset.

2. The system of claim 1, wherein the executable components further comprise a user interface component configured to render, via a graphical data presentation, results of the processing on the client device or another client device connected to the cloud platform.

3. The system of claim 2, wherein
the asset model comprises access permission data associated with at least a portion of the asset model,
the access permission data defines permissions to access a subset of the industrial data corresponding to the portion of the asset model, and
the user interface component is configured to deny access to the subset of the industrial data to an entity that does not satisfy the permissions.

4. The system of claim 3, wherein the access permission data defines a first permission to access the subset of the industrial data applicable to local requests for the subset of the industrial data received via the gateway device and a second permission to access the subset of the industrial data applicable to remote requests for the subset of the industrial data received via the cloud platform.

5. The system of claim 1, wherein the registration component is configured to receive at least one data service application, of the one or more data service applications, from a first entity registered as a manufacturer of the industrial asset, and the application delivery component is configured to render the at least one data service application available for purchase by second entities registered as owners of the industrial asset.

6. The system of claim 1, wherein the data tags referenced by the asset model respectively conform to one of a set of basic information data types, the set of basic information data types comprising at least a state data type, a rate data type, an odometer data type, and an event data type.

7. The system of claim 1, further comprising an authentication component configured to associate digital certificates with respective portions of the asset model, wherein the digital certificates authenticate sources of the industrial data represented by the portions of the asset model.

8. The system of claim 1, wherein
the registration component is further configured to store, as part of the registration information, linkage data defining references from the asset model to another data model stored on an industrial device, and
the gateway interface component is configured to collect, from the gateway device based on the linkage data, additional industrial data collected by the gateway device from other data tags of the industrial device referenced by the other data model.

9. The system of claim 1, wherein the analytic component is configured to apply the processing to the industrial data based on an organization and a contextualization of the industrial data defined by the asset model.

10. A method, comprising:
registering, by a system comprising a processor on a cloud-based industrial data services platform, an identity of an industrial asset, an asset model defined for the industrial asset, and one or more data service applications available for the industrial asset, wherein
the asset model models the industrial asset in terms of hierarchical elements, and the asset model references data tags defined on one or more industrial devices of the industrial asset, and
the one or more data service applications comprise at least one of an energy consumption application that calculates and monitors energy consumption by the industrial asset, an overall equipment effectiveness application that calculates an overall equipment effectiveness of the industrial asset, a quality application configured to calculate and monitor a quality metric of a product produced by the industrial asset, an alarms application configured to monitor the industrial data for alarm events that occur at the industrial asset and to generate notifications of the alarm events, or a maintenance application configured to generate maintenance notifications in response to detection of performance issues experience by the industrial asset;
rendering, by the system on a client device associated with an end user entity registered as an owner of the industrial asset, an indication of the one or more data service applications available for the industrial asset;
receiving, by the system from the client device, selection of a data service application, of the one or more data service applications, to be used to process industrial data generated by the industrial asset;
initiating, by the system in accordance with the data service application, collection of industrial data from a gateway device, wherein the industrial data is obtained from the data tags defined by the asset model; and
processing, by the system, the industrial data in accordance with the data service application.

11. The method of claim 10, further comprising rendering, by the system via a graphical data presentation, results of the processing on the client device or another client device connected to the cloud-based industrial data services platform.

12. The method of claim 11, wherein the registering comprises registering access permission data associated with at least a portion of the asset model,
the access permission data defines permissions to access a subset of the industrial data corresponding to the portion of the asset model, and
the rendering the results of the processing on the client device comprises rendering the results in response to determining that the permissions allow the end user entity to access the subset of the industrial data.

13. The method of claim 12, wherein the registering comprises registering, as the access permission data, first permission data applicable to local requests for the subset of the industrial data received via the gateway device and second permission data applicable to remote requests for the subset of the industrial data received via the cloud-based industrial data services platform.

14. The method of claim 10, wherein
the registering comprises receiving at least one data service application, of the one or more data service applications, from a first entity registered as a manufacturer of the industrial asset, and
the rendering comprises rendering the at least one data service application available for purchase by second entities registered as owners of the industrial asset.

15. The method of claim 10, further comprising generating, by the system, digital certificates associated with respective portions of the asset model, wherein the digital certificates authenticate sources of the industrial data represented by the portions of the asset model.

16. The method of claim 10, wherein
the registering comprises registering linkage data defining references from the asset model to another data model stored on an industrial device, and
the initiating the collection of the industrial data comprises initiating collection, from the gateway device based on the linkage data, additional industrial data collected by the gateway device from other data tags of the industrial device referenced by the other data model.

17. A non-transitory computer-readable medium having stored thereon instructions that, in response to execution, cause a system comprising a processor to perform operations, the operations comprising:
registering, on a cloud-based industrial data services platform, an identity of an industrial asset, an asset model defined for the industrial asset, and one or more data service applications available for the industrial asset, wherein
the asset model defines hierarchical groupings of data tags defined on one or more industrial devices of the industrial asset, and
the one or more data service applications comprise at least one of an energy consumption application that calculates and monitors energy consumption by the industrial asset, an overall equipment effectiveness application that calculates an overall equipment effectiveness of the industrial asset, a quality application configured to calculate and monitor a quality metric of a product produced by the industrial asset, an alarms application configured to monitor the industrial data for alarm events that occur at the industrial asset and to generate notifications of the alarm events, or a maintenance application configured to generate maintenance notifications in response to detection of performance issues experience by the industrial asset;
rendering, on a client device associated with an end user entity registered on the cloud-based industrial data services platform as an owner of the industrial asset, an indication of the one or more data service applications;
receiving, from the client device, selection of a data service application, of the one or more data service applications, to be used to process industrial data generated by the industrial asset;
collecting, in accordance with the data service application, industrial data from a gateway device, wherein the industrial data is collected by the gateway device from the data tags defined by the asset model; and
processing the industrial data in accordance with the data service application.

18. The non-transitory computer-readable medium of claim 17, wherein
the registering comprises receiving at least one data service application, of the one or more data service applications, from a first entity registered as a manufacturer of the industrial asset, and
the rendering comprises rendering the at least one data service application available for purchase by second entities registered as owners of the industrial asset.

19. The non-transitory computer-readable medium of claim 17, wherein the operations further comprise generating digital certificates associated with respective portions of the asset model, wherein the digital certificates authenticate sources of the industrial data represented by the portions of the asset model.

20. The non-transitory computer-readable medium of claim 17, wherein the registering comprises registering access permission data associated with at least a portion of the asset model,
the access permission data defines permissions to access a subset of the industrial data corresponding to the portion of the asset model, and
the operations further comprise rendering results of the processing on the client device in response to determining that the permissions allow the end user entity to access the subset of the industrial data.

* * * * *